(12) United States Patent
Zhang et al.

(10) Patent No.: US 12,207,034 B2
(45) Date of Patent: Jan. 21, 2025

(54) ACOUSTIC DEVICE

(71) Applicant: SHENZHEN SHOKZ CO., LTD., Guangdong (CN)

(72) Inventors: Lei Zhang, Shenzhen (CN); Junjiang Fu, Shenzhen (CN); Bingyan Yan, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/594,004

(22) Filed: Mar. 4, 2024

(65) Prior Publication Data
US 2024/0205582 A1  Jun. 20, 2024

Related U.S. Application Data

(63) Continuation of application No. 18/064,249, filed on Dec. 9, 2022, now Pat. No. 11,930,314, which is a
(Continued)

(30) Foreign Application Priority Data

Apr. 30, 2019 (CN) .......................... 201910364346.2
Sep. 19, 2019 (CN) .......................... 201910888067.6
Sep. 19, 2019 (CN) .......................... 201910888762.2

(51) Int. Cl.
*H04R 1/10* (2006.01)
*G02C 11/00* (2006.01)
(Continued)

(52) U.S. Cl.
CPC ........... *H04R 1/1016* (2013.01); *G02C 11/00* (2013.01); *G02C 11/10* (2013.01); *G06F 3/16* (2013.01);
(Continued)

(58) Field of Classification Search
CPC ........ H04R 1/105; H04R 1/1075; H04R 1/20; H04R 1/26; H04R 1/32; H04R 1/323; H04R 1/34; H04R 1/345; H04R 1/347
See application file for complete search history.

(56) References Cited

U.S. PATENT DOCUMENTS

| 9,985,596 B1 | 5/2018 | Litovsky et al. |
| 2015/0003623 A1 | 1/2015 | Rasmussen |
| 2017/0347192 A1 | 11/2017 | Seo et al. |

FOREIGN PATENT DOCUMENTS

| CN | 107105363 A | 8/2017 |
| WO | 2005053351 A1 | 6/2005 |
| WO | 2020220970 A1 | 11/2020 |

OTHER PUBLICATIONS

International Search Report in PCT/CN2020/087034 mailed on Jul. 22, 2020, 4 pages.
(Continued)

*Primary Examiner* — Kile O Blair
(74) *Attorney, Agent, or Firm* — METIS IP LLC

(57) ABSTRACT

The present disclosure may provide an acoustic device. The acoustic device may include a housing, at least one low-frequency acoustic driver, at least one high-frequency acoustic driver, and a noise reduction assembly. The housing may be configured to be rested on a shoulder of a user. The at least one low-frequency acoustic driver may be carried by the housing and configured to output first sound from at least two first sound guiding holes. The at least one high-frequency acoustic driver may be carried by the housing and configured to output second sound from at least two second sound guiding holes. The noise reduction assembly may be configured to receive third sound and reduce noise of the third sound.

20 Claims, 30 Drawing Sheets

Related U.S. Application Data continuation of application No. 17/169,468, filed on Feb. 7, 2021, now Pat. No. 11,540,038, which is a continuation of application No. PCT/CN2020/087034, filed on Apr. 26, 2020.

(51) Int. Cl.
| | |
|---|---|
| *G06F 3/16* | (2006.01) |
| *G10L 21/0208* | (2013.01) |
| *G10L 21/038* | (2013.01) |
| *H04M 1/03* | (2006.01) |
| *H04M 1/78* | (2006.01) |
| *H04R 1/02* | (2006.01) |
| *H04R 1/22* | (2006.01) |
| *H04R 1/24* | (2006.01) |
| *H04R 1/26* | (2006.01) |
| *H04R 1/28* | (2006.01) |
| *H04R 1/34* | (2006.01) |
| *H04R 1/38* | (2006.01) |
| *H04R 1/44* | (2006.01) |
| *H04R 3/00* | (2006.01) |
| *H04R 3/02* | (2006.01) |
| *H04R 5/02* | (2006.01) |
| *H04R 5/033* | (2006.01) |
| *H04R 9/06* | (2006.01) |
| *H04S 7/00* | (2006.01) |
| *H04W 4/80* | (2018.01) |
| *G02C 11/06* | (2006.01) |
| *G10L 21/0216* | (2013.01) |

(52) U.S. Cl.
CPC .............. *G06F 3/162* (2013.01); *G06F 3/165* (2013.01); *G10L 21/0208* (2013.01); *G10L 21/038* (2013.01); *H04M 1/03* (2013.01); *H04M 1/035* (2013.01); *H04M 1/78* (2013.01); *H04R 1/02* (2013.01); *H04R 1/026* (2013.01); *H04R 1/028* (2013.01); *H04R 1/10* (2013.01); *H04R 1/1008* (2013.01); *H04R 1/1025* (2013.01); *H04R 1/1041* (2013.01); *H04R 1/105* (2013.01); *H04R 1/1075* (2013.01); *H04R 1/1083* (2013.01); *H04R 1/22* (2013.01); *H04R 1/24* (2013.01); *H04R 1/245* (2013.01); *H04R 1/26* (2013.01); *H04R 1/28* (2013.01); *H04R 1/2803* (2013.01); *H04R 1/2807* (2013.01); *H04R 1/2811* (2013.01); *H04R 1/2896* (2013.01); *H04R 1/34* (2013.01); *H04R 1/342* (2013.01); *H04R 1/345* (2013.01); *H04R 1/347* (2013.01); *H04R 1/38* (2013.01); *H04R 1/44* (2013.01); *H04R 3/00* (2013.01); *H04R 3/005* (2013.01); *H04R 3/02* (2013.01); *H04R 5/02* (2013.01); *H04R 5/033* (2013.01); *H04R 5/0335* (2013.01); *H04R 9/06* (2013.01); *H04S 7/304* (2013.01); *H04W 4/80* (2018.02); *G02C 11/06* (2013.01); *G10L 2021/02166* (2013.01); *H04R 2201/103* (2013.01); *H04R 2410/05* (2013.01); *H04R 2420/07* (2013.01); *H04S 2400/11* (2013.01)

(56) References Cited

OTHER PUBLICATIONS

Written Opinion in PCT/CN2020/087034 mailed on Jul. 22, 2020, 5 pages.

4300

ACOUSTIC DEVICE

CROSS-REFERENCE TO RELATED APPLICATIONS

This application is a continuation of U.S. application Ser. No. 18/064,249, filed on Dec. 9, 2022, which is a continuation of U.S. application Ser. No. 17/169,468 (now U.S. Pat. No. 11,540,038), filed on Feb. 7, 2021, which is a Continuation of International Application No. PCT/CN2020/087034, filed on Apr. 26, 2020, which claims priority of Chinese Patent Application No. 201910888067.6 filed on Sep. 19, 2019, Chinese Patent Application No. 201910888762.2 filed on Sep. 19, 2019, and Chinese Patent Application No. 201910364346.2 filed on Apr. 30, 2019, the contents of each of which are hereby incorporated by reference in its entirety.

TECHNICAL FIELD

The present disclosure generally relates to an acoustic device, and more specifically relates to a wearable acoustic device rested on the shoulder of a user.

BACKGROUND

Currently, an acoustic device (e.g., earphone) is typically located in, on or over the ears of a user, outside sound cannot reach the ears of the user while using the acoustic device. This has an effect on the user's environmental or situational awareness. Thus, it is desirable to design an acoustic device to allow outside sound to reach the ears of a user while using the acoustic device.

SUMMARY

The present disclosure may provide an acoustic device. The acoustic device may include a housing, at least one low-frequency acoustic driver, at least one high-frequency acoustic driver, and a noise reduction assembly. The housing may be configured to be rested on a shoulder of a user. The at least one low-frequency acoustic driver may be carried by the housing and configured to output first sound from at least two first sound guiding holes. The at least one high-frequency acoustic driver may be carried by the housing and configured to output second sound from at least two second sound guiding holes. The noise reduction assembly may be configured to receive third sound and reduce noise of the third sound.

In some embodiments, the housing may include an intermediate portion. A first leg portion and a second leg portion may be connected to the intermediated portion, respectively. The at least one low-frequency acoustic driver and the at least one high-frequency acoustic driver may be carried by the first leg portion and the second leg portion.

In some embodiments, the intermediate portion may be configured to allow relative movement of the first leg portion and the second leg portion.

In some embodiments, the acoustic device may further include an active noise reduction component configured to reduce noise heard by the user.

In some embodiments, a first distance between two of the at least two first sound guiding holes may be larger than a second distance between two of the at least two second sound guiding holes.

In some embodiments, the first distance may range from 20 mm to 40 mm. The second distance may range from 3 mm to 7 mm.

In some embodiments, the first distance may be at least twice of the second distance.

In some embodiments, a first frequency range of the first sound may be smaller than 650 HZ. A second frequency range of the second sound may be larger than 1000 HZ.

In some embodiments, a first frequency range of the first sound and a second frequency range of the second sound may partially overlap.

In some embodiments, the at least one low-frequency acoustic driver may include a first transducer. The at least one high-frequency acoustic driver may include a second transducer. The first transducer and the second transducer may have different frequency response characteristics.

In some embodiments, the first transducer may include a low-frequency loudspeaker. The second transducer may include a high-frequency loudspeaker.

In some embodiments, the at least one low-frequency acoustic driver and the at least two first sound guiding holes may form a first acoustic route. The at least one high-frequency acoustic driver and the at least two second sound guiding holes may form a second acoustic route. The first acoustic route and the second acoustic route may have different frequency selection characteristics.

In some embodiments, the first acoustic route or the second acoustic route may be filled with an acoustic impedance material. An acoustic impedance of the acoustic impedance material may range from 5MKS Rayleigh to 500MKS Rayleigh.

In some embodiments, the at least two first sound guiding holes and the at least two second sound guiding holes may be located off ears of the user.

In some embodiments, the at least two first sound guiding holes may be nearer to the ears of the user than the at least second first sound guiding holes.

In some embodiments, the at least one low-frequency acoustic driver may be enclosed by a first shell. The first shell may define a front chamber and a rear chamber of the at least one low-frequency acoustic driver.

In some embodiments, the front chamber of the at least one low-frequency acoustic driver may be acoustically coupled to one of the at least two first sound guiding holes. The rear chamber of the at least one low-frequency acoustic driver may be acoustically coupled to another of the at least two first sound guiding holes.

In some embodiments, the at least one high-frequency acoustic driver may be enclosed by a second shell. The second shell may define a front chamber and a rear chamber of the at least one high-frequency acoustic driver.

In some embodiments, the front chamber of the at least one high-frequency acoustic driver may be acoustically coupled to one of the at least two second sound guiding holes. The rear chamber of the at least one high-frequency acoustic driver may be acoustically coupled to another of the at least two second sound guiding holes.

In some embodiments, the first sound output by the at least two first sound guiding holes may have opposite phases.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
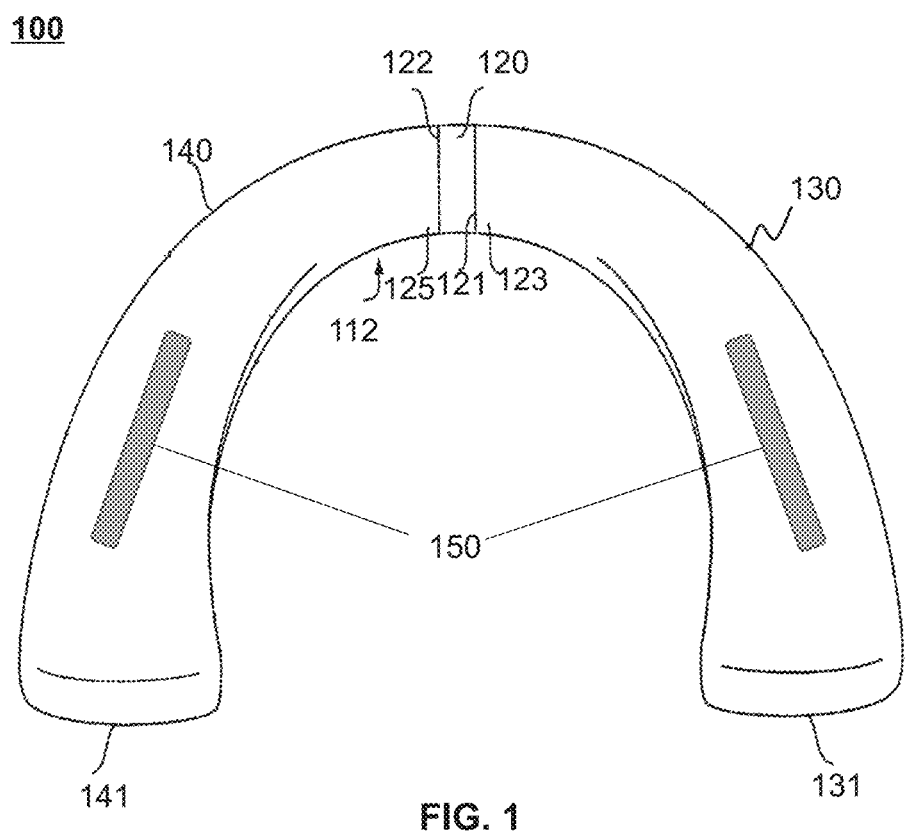
FIG. 1 is a schematic diagram illustrating an exemplary acoustic device according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

An aspect of the present disclosure may relate to an acoustic device. The acoustic device may include a housing, an acoustic output assembly, and a noise reduction assembly. The housing may be configured to carry the acoustic output device and the noise reduction assembly and be rested on a shoulder of a user. The acoustic output assembly may be configured to generate sound. The acoustic output assembly may include at least one low-frequency acoustic driver and at least one high-frequency acoustic driver. The at least one low-frequency acoustic driver may be configured to output first sound from at least two first sound guiding holes. The at least one high-frequency acoustic driver may be configured to output second sound from at least two second sound guiding holes. The noise reduction assembly configured to receive third sound (e.g., the voice of a user) and reduce noise of the third sound.

Figure 2:
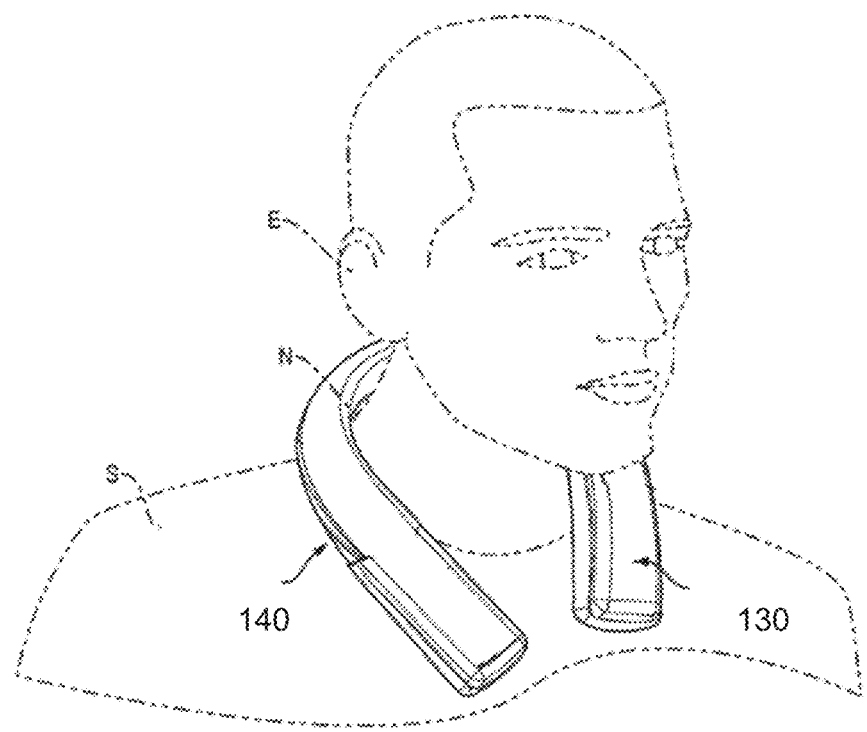
FIG. 2 is a schematic diagram illustrating the acoustic device worn on the body of a user.

FIG. 1 is a schematic diagram illustrating an exemplary acoustic device 100 according to some embodiments of the present disclosure. FIG. 2 is a schematic diagram illustrating the acoustic device 100 worn on the body of a user.

As shown in FIG. 1, the acoustic device 100 may include a housing 112 and an acoustic output assembly 150 (also referred to as "output assembly). In some embodiments, the housing 112 may include an intermediate portion 120, a first leg portion 130, and a second leg portion 140. The intermediate portion 120 may have a first end 121 and a second end 122 opposed to the first end 121. The first leg portion 130 may have a proximal end 123 coupled to the intermediate portion 120. The first leg portion 130 may extend from the first end 121 of the intermediate portion 120. Similar to the first leg portion 130, the second leg portion 140 may have a proximal end 125 coupled to the intermediate portion 120. The second leg portion 140 may extend from the second end 122 of the intermediate portion 120. The first leg portion 130 may have a distal end 131. The second leg portion 140 may have a distal end 141. The distal end 131 and the distal end 141 may be spaced farthest from the intermediate portion 120.

As shown in FIG. 2, the housing 112 may be rested on the body of a user. The user may have a head H with ear E, a neck N, and a shoulder S. In some embodiments, the housing 112 may include a neck loop having a "horseshoe"-like shape, a "U" shape, etc., and be rested around the neck and on the shoulder. The first leg portion 130 and the second leg portions 140 may sit over or near the clavicles and the intermediate portion 120 may sit behind the neck.

In some embodiments, housing portions (e.g., the intermediate portion 120, the first leg portions 130, the second leg portions 140) may be separate portions that are coupled together, for example, using fasteners, adhesives, etc. It should be noted that the housing portions may be not necessarily physically separate portions of the housing 112. For example, the intermediate portion 120, the first leg portions 130, and the second leg portions may be a unitary structure.

The acoustic output assembly 150 may be configured to output sound to the user. In some embodiments, the acoustic output assembly 150 may include at least one low-frequency acoustic driver and/or at least one high-frequency acoustic driver. The at least one low-frequency acoustic driver may be configured to output first sound in a low-frequency band from at least two first sound guiding holes. The at least one high-frequency acoustic driver may be configured to output second sound in a high-frequency band from at least two second sound guiding holes. It shall be noted that the outputted sound may be transmitted to the ears of the user and thus form the heard sound in the near field, and also may be transmitted into the environment around the user and thus be regarded as sound leakage in the far field (also referred to as sound spillage). In some embodiments, the optimization goal may be to increase the volume of the heard sound of the user and/or reduce the sound leakage to the environment. By adjusting the parameters of the low-frequency acoustic driver(s) and/or the first sound guiding holes, it may be possible to achieve the effect that the volume of the heard sound in the low-frequency band increases significantly while the volume of the leaked sound in the low-frequency is suppressed (e.g., the increase in volume of the heard sound is greater than the increase in leakage volume). Additionally, by adjusting the parameters of the high-frequency acoustic driver(s) and/or the second sound guiding holes, it may be possible to enhance the heard sound in the high-frequency band while suppressing the sound leakage in the high-frequency. For example, a first distance between two of the at least two first sound guiding holes may be set to be larger than a second distance between two of the at least two second sound guiding holes. As such, the sound in the low-frequency band heard by the user may be enhanced and the sound leakage in the high-frequency band may be suppressed. More descriptions of setting the acoustic driver(s) and the sound guiding hole(s) may be found elsewhere in the present disclosure, for example, FIGS. 5-39 and the descriptions thereof.

In some embodiments, the acoustic device 100 may also include a noise reduction assembly (not shown in FIG. 1). The noise reduction assembly may be configured to receive third sound (e.g., voice of the user wearing the acoustic device 100) and reduce noise of the third sound. In some embodiments, the noise may include background noise, sound that is not intended to be collected when a user wears the acoustic device 100, for example, a traffic noise, a wind noise, etc.

In some embodiments, the noise reduction assembly may include a microphone array, a noise reduction component, and a synthesis component. The microphone array may include at least one low-frequency microphone and at least one high-frequency microphone. The at least one low-frequency microphone may be used to collect low-frequency sound signal(s). The at least one high-frequency microphone may be used to collect high-frequency sound signal(s). The noise reduction component may be configured to perform noise reduction on the sound signals collected by the microphone array. In some embodiments, the noise reduction component may perform noise estimation, adaptive filtering, sound enhancement, etc., on the sound signals, thereby implementing the noise reduction on the sound. The synthesis component may be configured to combine the processed sound signals to generate a target signal corresponding to the sound. More descriptions of the noise reduction assembly may be found elsewhere in the present disclosure, for example, FIGS. 40-44, and the descriptions thereof.

In some embodiments, the acoustic device 100 may also include an active noise reduction component (not shown in FIGS. 1-2). The active noise reduction component may reduce noise (e.g., environmental noise) heard by the user by generating a noise reduction signal (e.g., a signal that has an opposite phase to the noise).

In some embodiments, the housing 112 may be a hollow structure, for example, an elongated hollow tube. The acoustic output assembly 150 and the noise reduction assembly may be accommodated inside the housing 112. In some embodiments, the acoustic device 100 may be bilaterally symmetric about the intermediate portion 120. Thus, the construction and arrangement of the second leg portion 140 may be essentially identical to that of the first leg portion 130. Since the construction of the first leg portion 130 and the second leg portion 140 is the same except possibly for them being mirror images of one another, the tooling and manufacturing process for the two leg portions may be essentially identical, which simplifies the production and reduces the production costs. In some embodiments, any relative movement between the two leg portions (e.g., relative movement that is desired or needed to allow the user to don and doff the audio device 100) may be implemented by, e.g., making the intermediate portion 120 flexible. Thus, the two leg portions do not need to be designed or constructed to have flexibility, which further simplifies the production and reduces the production costs as compared to similar audio devices in which the leg portions are designed and constructed so that they can be flexed or bent.

In some embodiments, the housing 112 may be stiff enough such that the sound is not substantially degraded as it travels through the acoustic output assembly 150. The housing 112 may also be sufficiently flexible such that the distal ends 131 and 141 may be separated apart and return to its resting shape shown in FIGS. 1 and 2 when the acoustic device 100 is donned and doffed. For example, the housing 112 may be made of polyurethane. In some embodiments, the intermediate portion 120 may have some flexibility to allow relative movement between the leg portions 130 and 140 so that the acoustic device 100 may be comfortably placed around the neck and over the shoulders.

In some embodiments, the acoustic device may also include a cover (e.g., an ergonomic cover) (not shown in FIGS. 1-2), for example, a stretch fabric cover. The cover may be used to protect components (e.g., the housing 112, the acoustic output assembly 150, the noise reduction assembly) of the acoustic device 100. The cover may also have a particular appearance or color.

It should be noted that the acoustic device 100 described above is a wearable audio device rested on the shoulder of a user that is adapted to convey the sound to the user's ears while minimizing the sound spilled to others nearby the user. However, the present disclosure may be not limited to the wearable audio device and include other audio devices such as on-ear, in-ear, and off-ear headphones and other portable devices with at least two drivers.

Figure 3A:
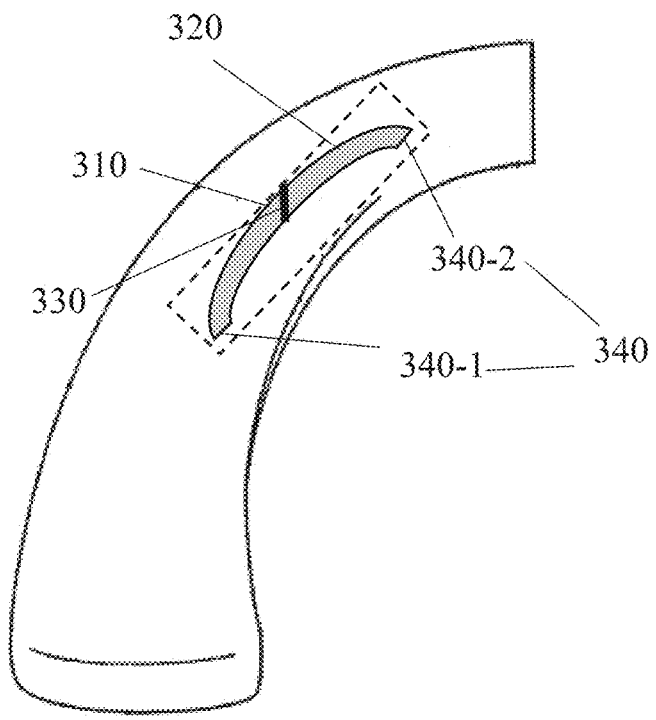
FIGS. 3A-3B are schematic diagrams illustrating exemplary leg portions according to some embodiments of the present disclosure.
Figure 3B:
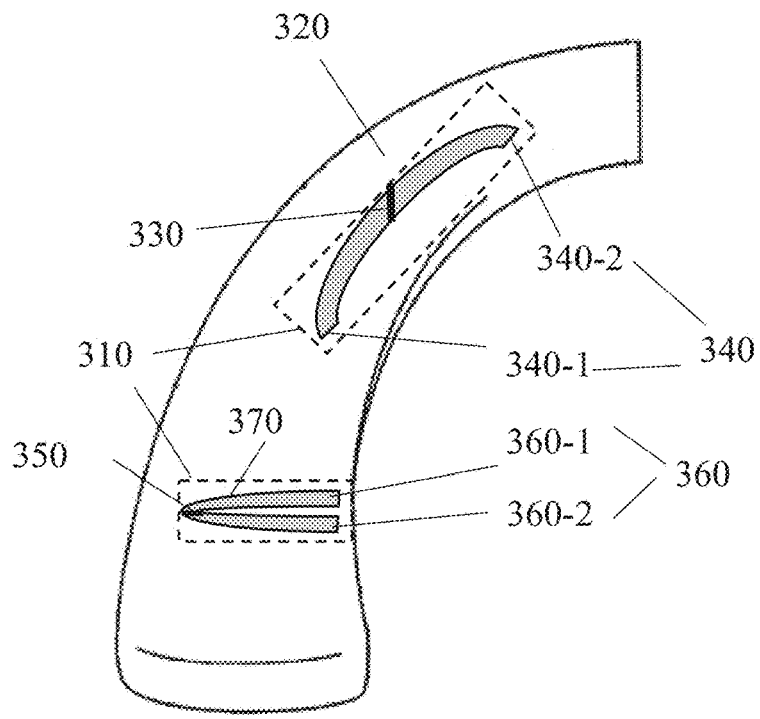

FIGS. 3A-3B are schematic diagrams illustrating exemplary leg portions 300A and 300B according to some embodiments of the present disclosure. The leg portions 300A and 300B may be examples of second leg portions 140 illustrated in FIGS. 1-2.

As shown in FIG. 3A, the leg portion 300A may include an acoustic output assembly 310. The acoustic output assembly 310 may include an acoustic route 320 and an acoustic driver 330 disposed within the acoustic route 320. In some embodiments, the acoustic route 320 may be a shell structure of various shapes, such as a circular ring, a rectangle, an oval, a polygon (regular or irregular), a U-shape, a V-shape, a semi-circle, or the like. In some embodiments, the acoustic route 320 may be part of or physically connected to the leg portion 300A. In some embodiments, the acoustic route 320 may be constituted by a sound pipe, a sound cavity, a resonance cavity, a sound hole, a sound slit, a tuning net, or the like, or any combination thereof. More descriptions of the acoustic output assembly 310 may be found elsewhere in the present disclosure, for example, FIGS. 5-39, and the descriptions thereof.

In some embodiments, the acoustic route 320 may be a sound tube and have a certain size. The size may be expressed by parameters such as a tube radius, a length, an aspect ratio, etc. In some embodiments, the tube radius of the acoustic route 320 may remain the same, or change along the length of the acoustic route 320. In some embodiments, for example, the tube radius of the acoustic route 320 may be not less than 5.0 mm. As another example, the tube radius of the acoustic route 320 may be not less than 4.5 mm. As a further example, the tube radius of the acoustic route 320 may be not less than 4.0 mm. As a further example, the tube radius of the acoustic route 320 may be not less than 3.5 mm. As a further example, the tube radius of the acoustic route 320 may be not less than 3.0 mm. As a further example, the tube radius of the acoustic route 320 may be not less than 2.5 mm. As a further example, the tube radius of the acoustic route 320 may be not less than 2.0 mm. As a further example, the tube radius of the acoustic route 320 may be not less than 1.5 mm. As a further example, the tube radius of the acoustic route 320 may be not less than 1.0 mm. As a further example, the tube radius of the acoustic route 320 may be not less than 0.5 mm.

In some embodiments, for example, the tube radius of the acoustic route 320 may be not more than 9.0 mm. As another example, the tube radius of the acoustic route 320 may be not more than 8.5 mm. As a further example, the tube radius of the acoustic route 320 may be not more than 8.0 mm. As a further example, the tube radius of the acoustic route 320 may be not more than 7.5 mm. As a further example, the tube radius of the acoustic route 320 may be not more than 7.0 mm. As a further example, the tube radius of the acoustic route 320 may be not more than 6.5 mm. As a further example, the tube radius of the acoustic route 320 may be not more than 6.0 mm. As a further example, the tube radius of the acoustic route 320 may be not more than 5.5 mm.

In some embodiments, for example, the length of the acoustic route 320 may be not more than 500 mm. As another example, the length of the acoustic route 320 may be not more than 450 mm. As a further example, the length of the acoustic route 320 may be not more than 400 mm. As a further example, the length of the acoustic route 320 may be not more than 350 mm. As a further example, the length of the acoustic route 320 may be not more than 300 mm. As a further example, the length of the acoustic route 320 may be not more than 250 mm. As a further example, the length of the acoustic route 320 may be not more than 200 mm. As a further example, the length of the acoustic route 320 may be not more than 150 mm. As a further example, the length of the acoustic route 320 may be not more than 100 mm. As a further example, the length of the acoustic route 320 may be not more than 50 mm. As a further example, the length of the acoustic route 320 may be not more than 30 mm. As a further example, the length of the acoustic route 320 may be not more than 10 mm.

In some embodiments, for example, the aspect ratio of the acoustic route 320 may be no larger than 200. As another example, the aspect ratio of the acoustic route 320 may be no larger than 150. As a further example, the aspect ratio of the acoustic route 320 may be no larger than 100. As a further example, the aspect ratio of the acoustic route 320 may be no larger than 50. More descriptions of the present disclosure may be found elsewhere in the present disclosure, for example, FIGS. 5-39, and the descriptions thereof.

The acoustic route 320 may further be provided with at least one sound guiding hole 340, for example, a sound guiding hole 340-1, a sound guiding hole 340-2, for transmitting the sound. The acoustic driver 330 may pass through the sound guiding hole 340-1 and the sound guiding hole 340-2 to output the sound outwardly. In some embodiments, the sound guiding holes 340-1 and 340-2 may be respectively located on the surface of the leg portion 300A and directly communicate with the outside environment. When the user wears the acoustic device, the sound guiding hole(s) 340 may be close to but not block the ear canal, so that the user's ear remains open while the user hears the sound output by the acoustic output assembly 310, and the user may also obtain the sound of the external environment.

In some embodiments, the sound guiding hole(s) 340 may have various shapes, such as a circle, a circular ring, a rectangle, an oval, a polygon (regular or irregular), a U-shape, a V-shape, a semi-circle, or the like. The shape of the sound guiding hole 340-1 and the sound guiding hole 340-2 may be the same or different. For example, the sound guiding hole 340-1 and the sound guiding hole 340-2 may be circular. As another example, one of the sound guiding hole 340-1 and the sound guiding hole 340-2 may be circular and another one may be oval. In some embodiments, each of the sound guiding hole(s) 340 may have a certain size. The sizes of the sound guiding holes 3840-1 and 3840-2 may be the same or different.

In some embodiments, each of the sound guiding hole(s) 340 may be referred to as a sound source. One sound guiding hole 340 may be regarded as a point source (or a single point source). A pair of the sound guiding hole(s) 340 (e.g., the sound guiding holes 3840-1 and sound guiding holes 3840-2) corresponding to the acoustic driver 330 may be regarded as a pair of two point sources. In some embodiments, the area of each of the sound guiding hole(s) 340 may be not larger than 0.2 cm2. As a further example, the area of each of the sound guiding hole(s) 340 may be not larger than 0.1 cm2. As a further example, the area of each of the sound guiding hole(s) 340 may be not larger than 0.05 cm2. As a further example, the area of each of the sound guiding hole(s) 340 may be not larger than 0.01 cm2. As a further example, the area of each of the sound guiding hole(s) 340 may be not larger than 0.005 cm2.

In some embodiments, the acoustic route 320 may carry one or more acoustic drivers 330. The acoustic driver(s) 330 may be located inside the acoustic route 320. The acoustic driver(s) 330 may be configured to receive electrical signal(s) and convert them into sound signal(s) for output. For example, the type of the acoustic driver(s) 330 may include a low-frequency acoustic driver, a high-frequency acoustic driver, a full-frequency acoustic driver, etc. As another example, the acoustic driver 330 may include a moving coil driver, a moving iron driver, a piezoelectric driver, an electrostatic driver, a magnetostrictive driver, etc. More descriptions of the acoustic driver(s) 330 may be found elsewhere in the present disclosure, for example, FIGS. 5-39 and the descriptions thereof.

In some embodiments, the acoustic driver 330 may include a transducer. The transducer may generate a vibration under the driving of an electrical signal, and generate a pair of sounds having equal amplitude, equal frequency, and opposite phases (i.e., a phase difference is 180 degrees). For example, the transducer may include an air conduction speaker, a bone conduction speaker, a hydroacoustic transducer, an ultrasonic transducer, etc. As another example, the transducer may include a moving coil transducer, a moving iron transducer, a piezoelectric transducer, an electrostatic transducer, a magnetostrictive transducer, etc. More descriptions may be found elsewhere in the present disclosure, for example, FIGS. 5-39 and the descriptions thereof.

In some embodiments, the transducer may include a diaphragm. The diaphragm may be driven by the electrical signal to generate the vibration. The front side and the back side of the diaphragm may simultaneously output a normal-phase sound and a reverse-phase sound. In some embodiments, the front side of the diaphragm may be provided with a front chamber (e.g., a first part of the acoustic route 320) for transmitting the sound. The front chamber may be acoustically coupled to the sound guiding hole(s) 340-1. The sound on the front side of the diaphragm may be emitted from the sound guiding hole(s) 340-1 through the front chamber. The rear side of the diaphragm may be provided with a rear chamber (e.g., a second part of the acoustic route 320) for transmitting the sound. The rear chamber may be acoustically coupled with the sound guiding hole(s) 340-2. The sound on the rear side of the diaphragm may be emitted from the sound guiding hole(s) 340-2 through the rear chamber. When the diaphragm is vibrating, the front and rear sides of the diaphragm may simultaneously generate a set of sounds with opposite phases. When the sounds pass through the front and rear chambers respectively, the sounds may propagate outward from the positions of the sound guiding holes 3840-1 and 3840-2. In some embodiments, the structure of the front chamber and the rear chamber may be designed so that the sound output by the acoustic driver 330 at the sound guiding holes 3840-1 and 3840-2 may satisfy a condition. For example, the length of the front and rear chambers may be designed so that the sound holes 3840-1 and 3840-2 may output a set of sounds with a specific phase relationship (for example, opposite phases). The problems that the volume of the heard sound outputted by the acoustic output assembly 310 in the near field is small and the sound leakage in the far field may be effectively alleviated. More descriptions of the leakage reduction based on the two point sources may be found elsewhere in the present disclosure, for example, FIGS. 5-39 and the descriptions thereof.

In some embodiments, the front side of the diaphragm may be provided with multiple front chambers for transmitting the sound. Each of the multiple front chambers may be coupled with one sound guiding hole 340-1 corresponding thereto. The rear side of the diaphragm may also be provided with multiple rear chambers for transmitting the sound. Each of the multiple rear chambers may also be coupled with one sound guiding hole 340-2 corresponding thereto. For example, two front chambers may be provided on the front side of the diaphragm. When the diaphragm is vibrating, the sound generated on the front side of the diaphragm may be transmitted through the two front chambers to two sound guiding holes 340-1 corresponding thereto, respectively. At this time, two sound guiding holes 340-1 corresponding to the front side of the diaphragm and the sound guiding hole 340-2 corresponding to the rear chamber of the diaphragm may constitute three point sources.

In some embodiments, the acoustic driver 330 may also include multiple diaphragms (e.g., two diaphragms). The multiple diaphragms may respectively vibrate to generate the sound. The sound may be respectively emitted from corresponding sound guiding hole(s) 340 through the multiple chambers. The multiple diaphragms may be controlled by the same or different controllers, respectively, and generate the sounds that satisfy a phase and amplitude condition. For example, the sounds may have the same amplitude and opposite phases. As another example, the sounds may have different amplitudes and opposite phases. More descriptions of the diaphragm may be found elsewhere in the present disclosure, for example, FIGS. 5-39, and the descriptions thereof.

In some embodiments, the sound generated by the vibration of the diaphragm may be divided into two or more components with different frequencies, for example, a high-frequency component, a low-frequency component, etc. The one or more components may be further transmitted to corresponding sound guiding hole(s) 340. For example, the high-frequency component may be transmitted to sound guiding holes 340-1 and 340-2 and transmitted outwardly therethrough. The low-frequency component may be transmitted to corresponding sound guiding holes and transmitted outwardly therethrough. More descriptions of the frequency division may be found elsewhere in the present disclosure, for example, FIGS. 5-39 and the descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the interior of the acoustic route 320 may also be provided with a sound-adjusting net and/or a sound-adjusting cotton to adjust the sound emitted by the acoustic driver 330. As another example, each sound guiding hole 340 may be further provided with a sound-transmission and dustproof net and/or a waterproof net to protect the components inside the leg portion 300A. The dust net and/or the waterproof net may be a high-density mesh cover material.

Figure 4:
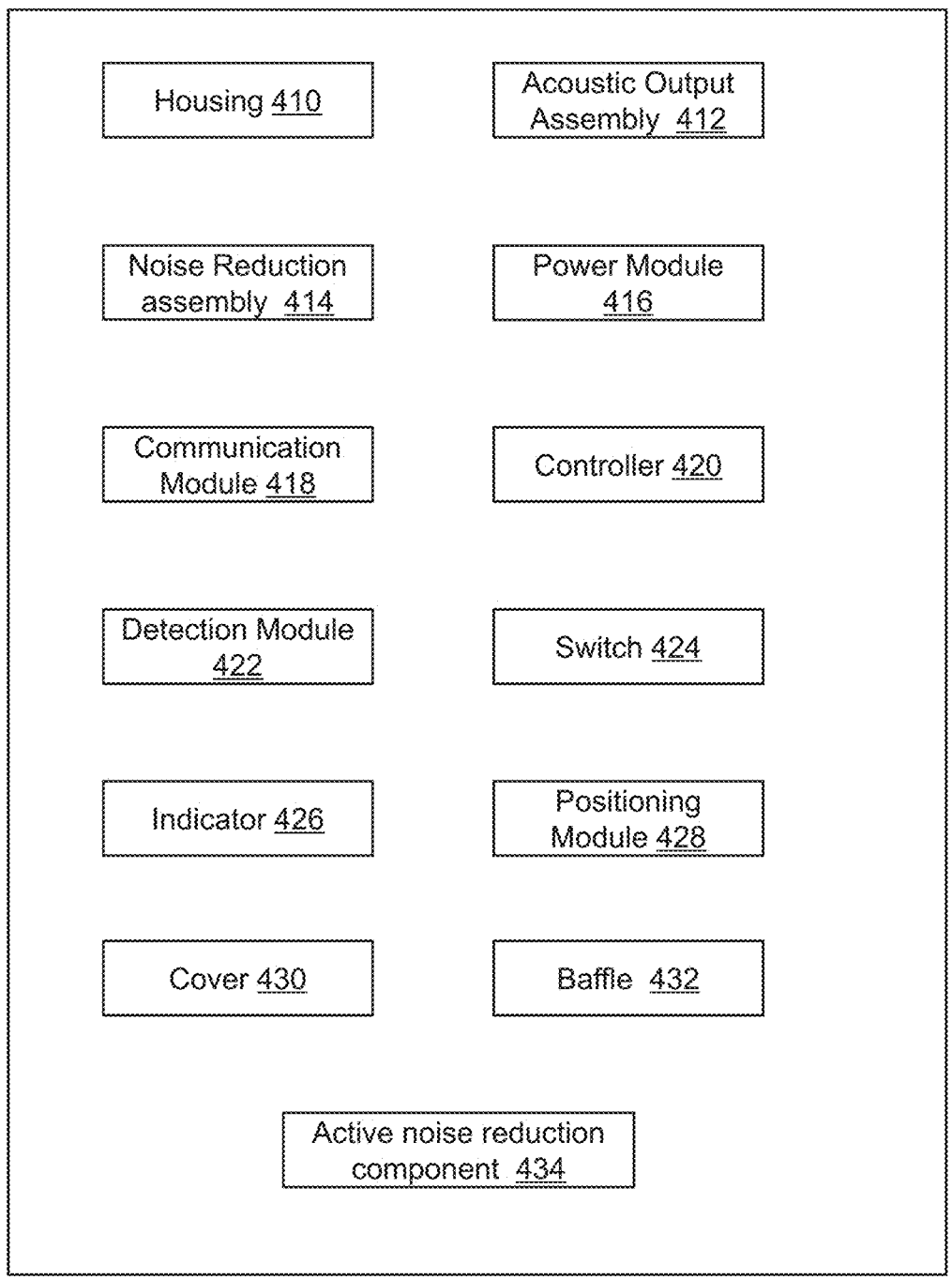
FIG. 4 is a schematic diagram illustrating an acoustic device according to some embodiments of the present disclosure.

As shown in FIG. 3B, the acoustic output assembly 310 may further include an acoustic driver 350. The acoustic driver 350 may output sound(s) from one or more sound guiding hole(s), for example, sound guiding holes 360-1 and 360-2. In some embodiments, the acoustic driver 350 and the acoustic driver 330 may output sounds with different frequencies, respectively. In some embodiments, the acoustic output assembly 310 may further include a controller (e.g., a controller 420 as illustrated in FIG. 4). The controller may be configured to control the acoustic driver 330 to output first sound in a first frequency range, and the acoustic driver 350 to output second sound in a second frequency range. In some embodiments, the second frequency range may include frequencies higher than the first frequency range. For example, the first frequency range may be from 100 Hz to 1000 Hz, and the second frequency range may be from 1000 Hz to 10000 Hz. In some embodiments, the controller may be further configured to control the acoustic driver 330 to output sounds of multiple frequency bands, for example, a low-frequency band, a low- and medium-frequency band, a medium- and high-frequency band, a high-frequency band, etc. More descriptions of the controller may be found elsewhere in the present disclosure, for example, FIGS. 5-39 and the descriptions thereof.

In some embodiments, the acoustic driver 330 may be a low-frequency acoustic driver, and the acoustic driver 350 may be a high-frequency acoustic driver. For example, the acoustic driver 330 may be a low-frequency speaker (e.g., a moving coil driver), and the acoustic driver 350 may be a high-frequency speaker (e.g., a moving iron driver). Due to different frequency response characteristics of the low-frequency speaker and the high-frequency speaker, frequency bands of the output sounds may also be different. For example, the acoustic driver 330 may provide the two point sources for outputting low-frequency sounds through the sound guiding hole(s) 340-1 and the sound guiding hole(s) 340-2. The acoustic driver 350 may provide the high-frequency two point sources for outputting high-frequency sound(s) through the sound guiding hole 360-1 and the sound guiding hole 360-2. In some embodiments, the low-frequency two point sources may be closer to the auricle to increase the volume near the near-field ear.

In some embodiments, the acoustic driver 350 may be provided with a two point sources that outputs full-frequency sounds through the sound guiding holes 360-1 and 360-2, thereby further increasing the volume of the near-field sound(s). In some embodiments, the acoustic output assembly 310 may further include a plurality of acoustic drivers 330 for generating sounds in a plurality of frequency bands, for example, a low-frequency band, a low- and medium-frequency band, a medium- and high-frequency band, a high-frequency band, etc.

In some embodiments, the volume of the near-field sound may be increased and the high-frequency sound leakage may be reduced by controlling a distance between the sound guiding holes 340 and the sound guiding holes 360. In some embodiments, a second distance d2 between the sound guiding hole 360-1 and the sound guiding hole 360-2 may be smaller than a first distance d1 between the sound guiding holes 340-1 and the sound guiding holes 340-2. In the low-frequency range, by setting a larger distance (d1) between the low frequency two point sources, the increase in the volume of the near-field sound may be greater than the increase in the volume of the far-field leakage, which may achieve a higher volume of the near-field sound output in the low-frequency band. At the same time, in the low-frequency range, because that the sound leakage of the low frequency two point sources is very small, increasing the distance d1 may slightly increase the sound leakage. In the high-frequency range, by setting a small distance (d2) between the high frequency two point sources, the problem that the cutoff frequency of high-frequency sound leakage reduction is too low and the audio band of the sound leakage reduction is too narrow may be overcame. More descriptions of adjusting the two point sources to reduce the sound leakage may be found elsewhere in the present disclosure, for example, FIGS. 5-39 and the descriptions thereof.

In some embodiments, the frequency band(s) of the sound(s) output by the sound guiding holes 340-1 and 340-2 corresponding to the acoustic driver 330 may overlap the frequency band(s) of the sound(s) output by the sound guiding holes 360-1 and 360-2 corresponding to the acoustic driver 350. The phase(s) of the sound(s) output by the sound guiding hole(s) 340 and the phase(s) of the sound(s) output by the sound guiding hole 360 may be the same or different. The phase difference between the sound(s) output by the sound guiding hole(s) 340 and the sound(s) output by the sound guiding hole(s) 360 may enhance the effect of reducing the sound leakage.

In some embodiments, the sound leakage may also be reduced by controlling the length of the front and rear chambers corresponding to the sound guiding hole(s). For example, the length of the rear chamber corresponding to the sound guiding hole 340-2 may be different from the length of the front chamber corresponding to the sound guiding holes 340-1, and the length of the rear chamber corresponding to the sound guiding hole 360-2 may be the same as the length of the rear chamber corresponding to the sound guiding hole 360-1, such that the phase difference between the corresponding out sounds may be 180°. Specifically, a ratio between the length of the rear chamber corresponding to the sound guiding hole 340-2 and the length of the front chamber corresponding to the sound guiding holes 340-1 may range from 0.5 to 2. As another example, the ratio may range from 0.6 to 1.5. As a further example, the ratio may range from 0.8 to 1.2. More descriptions of adjusting the length of the front chamber and/or the rear camber to reduce the sound leakage may be found elsewhere in the present disclosure, for example, FIGS. 5-39 and the descriptions thereof.

In some embodiments, the sound leakage may also be reduced by controlling an acoustic impedance before and after the diaphragm. In some embodiments, the acoustic impedance of the acoustic route (front chamber) corresponding to the sound guiding hole 340-2 may be the same as or different from the acoustic impedance of the acoustic route (rear chamber) corresponding to the sound guiding holes 340-1, and the acoustic impedance of the acoustic route (front chamber) corresponding to the sound guiding hole 360-2 may be the same as or different from the acoustic impedance of the acoustic route (rear chamber) corresponding to the sound guiding holes 360-1. For example, a ratio (also referred to as first ratio) between the acoustic impedance of the acoustic route (front chamber) corresponding to the sound guiding hole 340-2 and the acoustic impedance of the acoustic route (rear chamber) corresponding to the sound guiding holes 340-1 or a ratio (also referred to as second ratio) between the acoustic impedance of the acoustic route (front chamber) corresponding to the sound guiding hole 360-2 and the acoustic impedance of the acoustic route (rear chamber) corresponding to the sound guiding holes 360-1 may range from 0.5 to 2. As another example, the first ratio or the second ratio may range from 0.6 to 1.9. As a further example, the first ratio or the second ratio may range from 0.7 to 1.8. As a further example, the first ratio or the second ratio may range from 0.8 to 1.7. As a further example, the first ratio or the second ratio may range from 0.9 to 1.6. As a further example, the first ratio or the second ratio may range from 1.0 to 1.5. More detailed descriptions of the acoustic impedance may be found elsewhere in the present disclosure, for example, FIGS. 5-39, and the descriptions thereof.

FIG. 4 is a schematic diagram illustrating an acoustic device 400 according to some embodiments of the present disclosure. The acoustic device 400 may include a housing 410, an acoustic output assembly 412, a noise reduction component 414, a power source assembly 416, a communication module 418, a controller 422, a switch 424, an indicator 426, a positioning module 428, a cover 430, a baffle 432, and an active noise reduction component 434.

The housing 410 may be configured to accommodate one or more components of the acoustic device 400, for example, the acoustic output assembly 412, the noise reduction component 414, the power module 416, the controller 422, the positioning module 428, etc. The housing 410 may include an intermediate portion, a first leg portion, and a second portion. The housing 410 may be similar to the housing 112, and more descriptions of the housing 410 may be found elsewhere in the present disclosure, for example, FIGS. 1 and 2 and the descriptions thereof.

The acoustic output assembly 412 may be configured to output sound. The sound may include an audio file (e.g., music, recording), a real-time call, a broadcast, prompt sound, etc. For example, the user may play an audio or broadcast via the acoustic output assembly 412. As another example, the user may make a real-time call with an external device via the acoustic output assembly 412. As a further example, the acoustic output assembly 412 may generate a prompt sound according to a user operation, a status of the acoustic device 400, a status of a component (e.g., the acoustic output assembly 412, the communication module 418, the power module 416, and the controller 420) of the acoustic device 400, etc.

In some embodiments, the acoustic output device 412 may be disposed inside leg portions (e.g., the first leg portion, the second leg portion) of the housing 410. In some embodiments, the acoustic output device 412 may be independent from the housing 410 and detachably connected to the housing 410, for example, via plugging, snapping, screwing, etc. The acoustic output assembly 412 may be connected to an external source (e.g., a computer, a mobile phone, or other mobile devices) in a wired or wireless manner (e.g., Bluetooth). In some embodiments, the acoustic device 400 may include a first acoustic output assembly and a second acoustic output assembly. The first acoustic output assembly and the second acoustic output assembly may both be communicatively connected to the external source via the communication module 418. As another example, the first acoustic output assembly may communicate with the external source via the communication module 418, and the second acoustic output assembly may be wirelessly connected to the first acoustic output assembly via the communication module 418. Sound outputted by the first acoustic output assembly and sound the second acoustic output assembly may be synchronized through one or more synchronization signals. More descriptions of the acoustic output assembly 412 may be found elsewhere in the present disclosure, e.g., FIGS. 5-41, and the descriptions thereof.

The noise reduction assembly 414 may be configured to receive sound (also referred to as "third sound"), such as a user's voice instruction, a call, etc. The noise reduction assembly 414 may be also configured to reduce noise of the sound. More descriptions of the noise reduction assembly 414 may be found elsewhere in the present disclosure, e.g., FIGS. 40-44, and the descriptions thereof.

The power module 416 may be configured to provide power supply to one or more components of the acoustic device 400, for example, the acoustic output assembly 412, the communication module 418, the controller 420, etc. A charging mode of the power module 416 may include wireless charging, wired charging, magnetic charging, etc. Exemplary wireless charging may include electromagnetic induction charging, magnetic field resonance charging, radio wave charging, solar charging, etc. In some embodiments, the power module 416 may include a dry battery, a lead storage battery, a lithium battery, a solar battery, or the like, or any combination thereof.

In some embodiments, the power module 416 may be disposed inside the leg portions. For example, the power module 416 may be disposed inside one of the leg portions and supply a power to the first acoustic output assembly and the second acoustic output assembly. As another example, the power module 416 may include two power sub-modules disposed inside the two leg portions, respectively, and supply a power to the first acoustic output assembly and the second acoustic output assembly, respectively.

The communication module 418 may be configured to facilitate communication between one or more components of the acoustic device 400. The communication module 418 may also facilitate communication between the acoustic device 400 and an external device (e.g., a computer, a mobile phone, or other mobile devices). The external device may view information (e.g., location information, power information) of the acoustic device 400 and control the acoustic device 400 to implement functions such as playing an audio, making a call, etc. In some embodiments, the communication may include wireless communication. Exemplary wireless communication may include Bluetooth, local area network, wide area network, wireless personal area network, near field communication, or the like, or any combination thereof.

The detection module 422 may be configured to automatically detect a status of the acoustic device 400 and one or more components thereof, and the controller 420 may further control the acoustic device 400 and the one or more components accordingly. For example, the controller 420 may control the acoustic output assembly 412 to be turned on or off. As another example, the controller 420 may switch audio output by the acoustic output assembly 412 according to a user's instruction. The acoustic device 400 may play an audio or song list of a specified category (such as classical, popular) or a specified singer (such as Michael Jackson, Jay Chou, etc.). The controller 420 may also adjust the volume of the sound output by the acoustic output assembly 412. In some embodiments, the controller 420 may directly communicate with the component(s) of the acoustic device 400 or communicate with the component(s) of the acoustic device 400 via the communication module 418. In some embodiments, the controller 420 may automatically detect the status of the component(s) of the acoustic device 400 or automatically receive status information reported from the component(s) of the acoustic device 400. Based on the status or status information, the controller 420 may control the component(s). For example, the controller 420 may automatically detect the power of the power module 416. If the power of the power module 416 is lower than a threshold (e.g., 20%), the controller 420 may control the acoustic output assembly 412 to output a charging prompt (e.g., "battery low", "shut down soon"). As another example, the controller 420 may automatically detect whether the communication module 418 is connected to an external device (e.g., a user's mobile phone). If the communication module 418 is disconnected to the external device, the controller 420 may control the communication module 418 to be connected to the external device. If the connection is successful, the controller 420 may control the acoustic output assembly 412 to output a prompt (e.g., "Bluetooth connection succeeded"). In some embodiments, the controller 420 may be further configured to control the external device in communication with the acoustic device 400. For example, the controller 420 may control a smart assistant (e.g., Siri™) in a user's mobile phone via the communication module 418. Further, according to a user's instructions (e.g., a voice instruction, a tap instruction), the controller 420 may wake up the smart assistant in the user's mobile phone via the communication module 418, and control the user's mobile phone to perform operations, such as checking the weather, turning on navigation through the smart assistant, etc. In some embodiments, the controller 420 may be disposed at any position of the housing 410.

In some embodiments, if the detection module 422 detects that the acoustic device 400 is in a doffed state, the controller 420 may turn off the one or more components after a preset time period (e.g., 15 s). As another example, if the detection module 422 detects a regular knock on the acoustic device 400 (e.g., two consecutive rapid taps), the controller 420 may automatically pause the sound output of the acoustic output assembly 412. The detection module 422 may include a detector, a sensor, a gyroscope, or the like. Exemplary detectors may include a battery detector, a weight detector, an infrared detector, a mechanical detector, or the like, or any combination thereof. Exemplary sensors may include a temperature sensor, a humidity sensor, a pressure sensor, a displacement sensor, a flow sensor, a liquid level sensor, a force sensor, a speed sensor, a torque sensor, or the like, or any combination thereof. The gyroscope may be configured to detect a placement direction of the acoustic device 400. For example, if the gyroscope detects that the bottom of the acoustic device 400 is placed upward, the controller 420 may turn off the power module 416 after a preset time period (e.g., 20 s).

The switch 424 may be configured to directly control the acoustic device 400 and one or more components thereof. For example, an operation of the switch 424 may include press (e.g., a short-time press, a long time-press), touch, slide, click, etc. For example, the user may turn the acoustic output assembly 412 on or off by pressing the switch 424 for a time period (e.g., 30 seconds). As another example, the user may connect or disconnect the communication between the acoustic device 400 and an external device (for example, a Bluetooth connection) by pressing the switch. As a further example, the user may click the switch 412 for different times to answer or hang up the phone, play or pause an audio, switch an audio, etc. In some embodiments, the switch 424 may include one or more keys. The acoustic device 400 may be controlled by handling the one or more keys, for example, implementing multiple continuous pushes, a single short-time push, a single long-time push, touch, or slide on the one or more keys simultaneously or sequentially.

The indicator 426 may be configured to indicate the status of the one or more components of the acoustic device 400. The indicator 425 may emit a light of one or more colors and/or blink different times to indicate different states of the one or more components, for example, the acoustic output assembly 412, the communication module 418, the power module 416, etc. For example, if the acoustic output assembly 412 is turned on, the indicator 425 may emit a green light. If the acoustic output assembly 412 is turned off, the indicator 425 may emit a red light. As another example, if the acoustic output assembly 412 is turned on, the indicator 425 may blink 3 times. If the acoustic output assembly 412 is turned off, the indicator 425 may blink once. As a further example, if the communication module 418 is successfully connected to an external device, the indicator 425 may emit a green light. If the communication module 418 is not successfully connected to the external device, the indicator 425 may emit a red light. As a further example, if the communication module 418 fails to connect with an external device, the indicator 425 may blink continuously. As a further example, if the power module 416 is out of power, the indicator 425 may emit a red light. As a further example, if the power module 416 is out of power, the indicator 425 may blink continuously.

The positioning module 428 may be configured to obtain real-time position information of the acoustic device 400. Exemplary position information may include longitude data, latitude data. The positioning module 428 may obtain the position information based on a global positioning system (GPS), a global satellite navigation system (GLONASS), a Beidou navigation system (COMPASS), a Galileo positioning system, a quasi-zenith satellite system (QZSS), a wireless fidelity (Wi-Fi) positioning technology, etc. In some embodiments, an external device in communication with the acoustic device 400 may access the position information of the acoustic device 400.

The cover 430 may be configured to protect one or more components of the acoustic device 400, and similar to the cover illustrated in FIGS. 1-2. The baffle 432 may be configured to separate different sound guiding holes. For example, the sound guiding holes may be distributed on two sides thereof, respectively, so that the at least two sound guiding holes may have different acoustic routes to the user's ear canal. More descriptions of the baffle 434 may be found elsewhere in the present disclosure, for example, FIGS. 5-39 and the descriptions thereof. The active noise reduction component 434 may be configured to reduce noise (e.g., environmental noise) heard by the user by generating a noise reduction signal (e.g., a signal that has an opposite phase to the noise).

The descriptions of the acoustic device 100 are intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. In some embodiments, the acoustic device 400 may include a portion of the components described above. For example, the acoustic device 400 may include the housing 410 and the acoustic output assembly 412. As another example, the acoustic device 400 may include the housing 410, the acoustic output assembly 412, and the noise reduction assembly 414.

Figure 5:
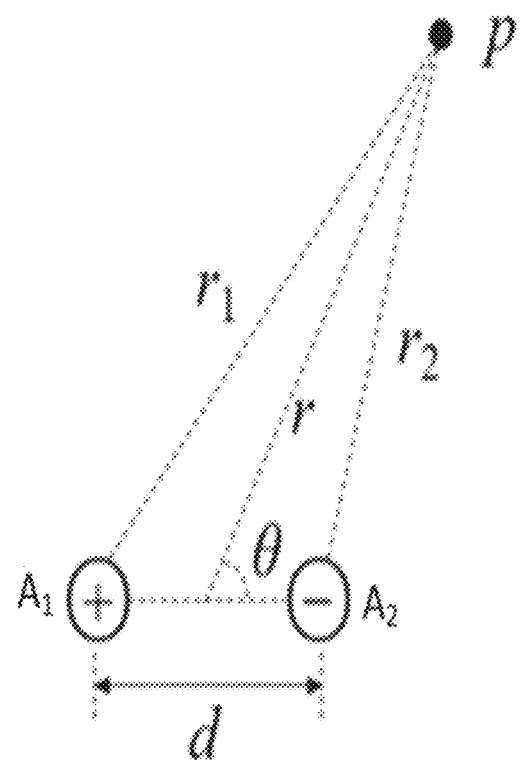
FIG. 5 is a schematic diagram illustrating exemplary two point sources according to some embodiments of the present disclosure.

FIG. 5 is a schematic diagram illustrating an exemplary two point sources according to some embodiments of the present disclosure. In order to further explain the effect of the setting of the sound guiding holes on the acoustic device (e.g., the acoustic device 100, the acoustic device 400), and considering that the sound may be regarded as propagating outwards from the sound guiding holes, the present disclosure may describe sound guiding holes on an acoustic device as sound sources for externally outputting sound.

Just for the convenience of description and for the purpose of illustration, when sizes of the sound guiding holes on the acoustic device are small, each sound guiding hole may be approximately regarded as a point source (or referred to as a point sound source or a sound source). In some embodiments, any sound guiding hole provided on the acoustic device for outputting sound may be approximated as a single point (sound) source on the acoustic device. The sound field pressure p generated by a single point source may satisfy Equation (1):

$$p = \frac{j\omega\rho_0}{4\pi r}Q_0 \exp j(\omega t - kr), \quad (1)$$

where ω denotes an angular frequency, $\rho_0$ denotes an air density, r denotes a distance between a target point and the point source, $Q_0$ denotes a volume velocity of the point source, and k denotes the wave number. It may be concluded that the magnitude of the sound field pressure of the point source at the target point is inversely proportional to the distance from the target point to the point source.

It should be noted that the sound guiding holes for outputting sound as point sources may only serve as an explanation of the principle and effect of the present disclosure, and may not limit the shapes and sizes of the sound guiding holes in practical applications. In some embodiments, if an area of a sound guiding hole is large enough, the sound guiding hole may also be equivalent to a planar acoustic source. In some embodiments, the point source may also be realized by other structures, such as a vibration surface and a sound radiation surface. For those skilled in the art, without creative activities, it may be known that sounds produced by structures such as a sound guiding hole, a vibration surface, and an acoustic radiation surface may be similar to a point source at the spatial scale discussed in the present disclosure, and may have similar sound propagation characteristics and the similar mathematical description method. Further, for those skilled in the art, without creative activities, it may be known that the acoustic effect achieved by "an acoustic driver may output sound from at least two first sound guiding holes" described in the present disclosure may also achieve the same effect by other acoustic structures, for example, "at least two acoustic drivers each may output sound from at least one acoustic radiation surface." According to actual situations, other acoustic structures may be selected for adjustment and combination, and the same acoustic output effect may also be achieved. The principle of radiating sound outward with structures such as surface sound sources may be similar to that of point sources, and may not be repeated here.

As mentioned above, at least two sound guiding holes corresponding to a same acoustic driver may be set on the acoustic device provided in the specification. In this case, two point sources may be formed, which may reduce sound transmitted to the surrounding environment. For convenience, sound output from the acoustic device to the surrounding environment may be referred to as a far-field leakage since it can be heard by others in the environment. The sound output from the acoustic device to the ears of the user wearing the acoustic device may be referred to as a near-field sound since a distance between the acoustic device and the user is relatively short. In some embodiments, the sound output from two sound guiding holes (i.e., two point sources) may have a certain phase difference. When the distance between the two point sources and the phase difference of the two point sources meet a certain condition, the acoustic device may output different sound effects in the near field (for example, the position of the user's ear) and the far field. For example, if the phases of the point sources corresponding to the two sound guiding holes are opposite, that is, an absolute value of the phase difference between the two point sources is 180 degrees, the far-field leakage may be reduced according to the principle of reversed phase cancellation. More details regarding an enhancement of the acoustic device by adjusting the amplitude and/or phase of each point source may be found in International application No. PCT/CN2019/130884, filed on Dec. 31, 2019, the entire content of which may be hereby incorporated by reference.

As shown in FIG. 5, a sound field pressure p generated by two point sources may satisfy Equation (2):

$$p = \frac{A_1}{r_1} \exp j(\omega t - kr_1 + \varphi_1) + \frac{A_2}{r_2} \exp j(\omega t - kr_2 + \varphi_2), \quad (2)$$

where $A_1$ and $A_2$ denote intensities of the two point sources, and $\varphi_1$ and $\varphi_2$ denote phases of the two point sources, respectively, d denotes a distance between the two point sources, and $r_1$ and $r_2$ may satisfy Equation (3):

$$\begin{cases} r_1 = \sqrt{r^2 + \left(\frac{d}{2}\right)^2 - 2*r*\frac{d}{2}*\cos\theta} \\ r_2 = \sqrt{r^2 + \left(\frac{d}{2}\right)^2 + 2*r*\frac{d}{2}*\cos\theta} \end{cases} \quad 3)$$

where r denotes a distance between a target point and the center of the two point sources in the space, and θ indicates an angle between a line connecting the target point and the center of the two point sources and the line on which the two point source is located.

It may be concluded from Equation (3) that a magnitude of the sound pressure p at the target point in the sound field may relate to the intensity of each point source, the distance d, the phase of each point source, and the distance r.

Two point sources with different output effects may be achieved by different settings of sound guiding holes, such that the volume of the near-field sound may be improved, and the far-field leakage may be reduced. For example, an acoustic driver may include a vibration diaphragm (also referred to as diaphragm). When the vibration diaphragm vibrates, sounds may be transmitted from the front and rear sides of the vibration diaphragm, respectively. The front side of the vibration diaphragm in the acoustic device may be provided with a front chamber for transmitting sound. The front chamber may be coupled with a sound guiding hole acoustically. The sound on the front side of the vibration diaphragm may be transmitted to the sound guiding hole through the front chamber and further transmitted outwards. The rear side of the vibration diaphragm in the acoustic device may be provided with a rear chamber for transmitting sound. The rear chamber may be coupled with another sound guiding hole acoustically. The sound on the rear side of the vibration diaphragm may be transmitted to the sound guiding hole through the rear chamber and propagate further outwards. It should be noted that, when the vibration diaphragm is vibrating, the front side and the rear side of the vibration diaphragm may generate sounds with opposite phases. In some embodiments, the structures of the front chamber and rear chamber may be specially set so that the sound output by the acoustic driver at different sound guiding holes may meet a specific condition. For example, lengths of the front chamber and rear chamber may be specially designed such that sounds with a specific phase relationship (e.g., opposite phases) may be output at the two sound guiding holes. As a result, a problem that the acoustic device has a low volume in the near-field and a sound leakage in the far-field may be effectively resolved.

Under certain conditions, compared to the volume of a far-field leakage of a single point source, the volume of a far-field leakage of two point sources may increase with the frequency. In other words, the leakage reduction capability of the two point sources in the far field may decrease with the frequency increases. For further description, a curve illustrating a relationship between a far-field leakage and a frequency may be described in connection with FIG. 6.

Figure 6:
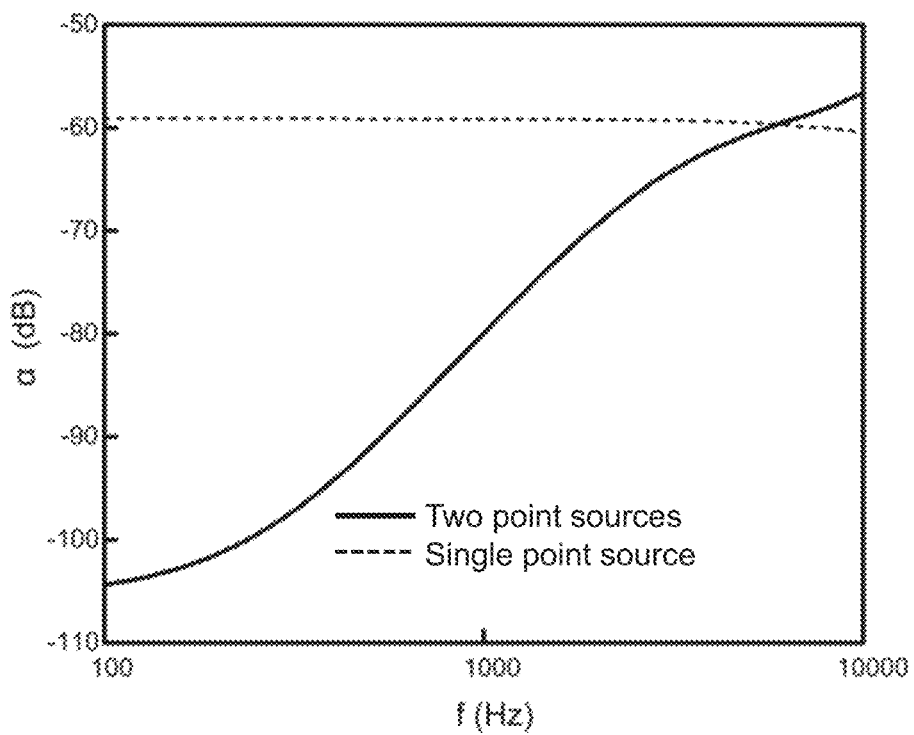
FIG. 6 is a schematic diagram illustrating a variation of sound leakage of two point sources and a single point source along with frequency according to some embodiments of the present disclosure.

FIG. 6 is a schematic diagram illustrating a variation of a sound leakage of two point sources and a single point source as a function of frequency according to some embodiments of the present disclosure. The distance between the two point sources in FIG. 6 may be fixed, and the two point sources may have a substantially same amplitude and opposite phases. The dotted line may indicate a variation curve of a volume of a leaked sound of the single point source at different frequencies. The solid line may indicate a variation curve of a volume of a leaked sound of the two point sources at different frequencies. The abscissa of the diagram may represent the sound frequency (f), and the unit may be Hertz (Hz). The ordinate of the diagram may use a normalization parameter a to evaluate the volume of a leaked sound. The parameter a may be determined according to Equation (4):

$$\alpha = \frac{|P_{far}|^2}{|P_{ear}|^2}, \tag{4}$$

where $P_{far}$ represents the sound pressure of the acoustic device in the far-field (i.e., the sound pressure of the far-field sound leakage). $P_{ear}$ represents the sound pressure around the user's ears (i.e., the sound pressure of the near-field sound). The larger the value of a, the larger the far-field leakage relative to the near-field sound heard will be, indicating that a poorer capability of the acoustic device for reducing the far-field leakage.

As shown in FIG. 6, when the frequency is below 6000 Hz, the far-field leakage produced by the two point sources may be less than the far-field leakage produced by the single point source, and may increase as the frequency increases. When the frequency is close to 10000 Hz (for example, about 8000 Hz or above), the far-field leakage produced by the two point sources may be greater than the far-field leakage produced by the single point source. In some embodiments, a frequency corresponding to an intersection of the variation curves of the two point sources and the single point source may be determined as an upper limit frequency that the two point sources are capable of reducing a sound leakage.

For illustrative purposes, when the frequency is relatively small (for example, in a range of 100 Hz~1000 Hz), the capability of reducing a sound leakage of the two point sources may be strong (e.g., the value of a is small, such as below −80 dB). In such a frequency band, an increase of the volume of the sound heard by the user may be determined as an optimization goal. When the frequency is larger (for example, in a range of 1000 Hz~8000 Hz), the capability of reducing a sound leakage of the two point sources may be weak (e.g., above −80 dB). In such a frequency band, a decrease of the sound leakage may be determined as the optimization goal.

According to FIG. 6, it may be possible to determine a frequency division point based on the variation tendency of the two point sources' capability of reducing a sound leakage. Parameters of the two point sources may be adjusted according to the frequency division point so as to reducing the sound leakage of the acoustic device. For example, the frequency corresponding to a of a specific value (for example, −60 dB, −70 dB, −80 dB, −90 dB, etc.) may be used as the frequency division point. Parameters of the two point sources may be determined to improve the near-field sound in a frequency band below the frequency division point, and/or to reduce the far-field sound leakage in a frequency band above the frequency division point. In some embodiments, a high-frequency band with a high frequency (for example, a sound output from a high-frequency acoustic driver) and a low-frequency band with a low frequency (for example, a sound output from a low-frequency acoustic driver) may be determined based on the frequency division point. More details of the frequency division point may be disclosed elsewhere in the present disclosure, for example, FIG. 8 and the descriptions thereof.

In some embodiments, the method for measuring and determining the sound leakage may be adjusted according to the actual conditions. For example, a plurality of points on a spherical surface centered by s center point of the two point sources with a radius of r (for example, 40 centimeter) may be identified, and an average value of amplitudes of the sound pressure at the plurality of points may be determined as the value of the sound leakage. The distance between the near-field listening position and the point sources may be far less than the distance between the point sources and the spherical surface for measuring the far-field leakage. Optionally, the ratio of the distance from the near-field listening position to the center of the two point sources to the radius r may be less than 0.3, 0.2, 0.15, or 0.1. As another example, one or more points of the far-field may be taken as the position for measuring the sound leakage, and the sound volume of the position may be taken as the value of the sound leakage. As another example, a center of the two point sources may be used as a center of a circle at the far field, and sound pressure amplitudes of two or more points evenly distributed at the circle according to a certain spatial angle may be averaged as the value of the sound leakage. These methods may be adjusted by those skilled in the art according to actual conditions, and is not intended to be limiting.

According to FIG. 6, it may be concluded that in the high-frequency band (a higher frequency band determined according to the frequency division point), the two point sources may have a weak capability to reduce a sound leakage. In the low-frequency band (a lower frequency band determined according to the frequency division point), the two point sources may have a strong capability to reduce a sound leakage. At a certain sound frequency, if the distance between the two point sources changes, its capability to reduce a sound leakage may be changed, and the difference between volume of the sound heard by the user (also referred to as "heard sound") and volume of the leaked sound may also be changed. For a better description, the curve of a far-field leakage as a function of the distance between the two point sources may be described with reference to FIGS. 7A and 7B.

Figure 7A:
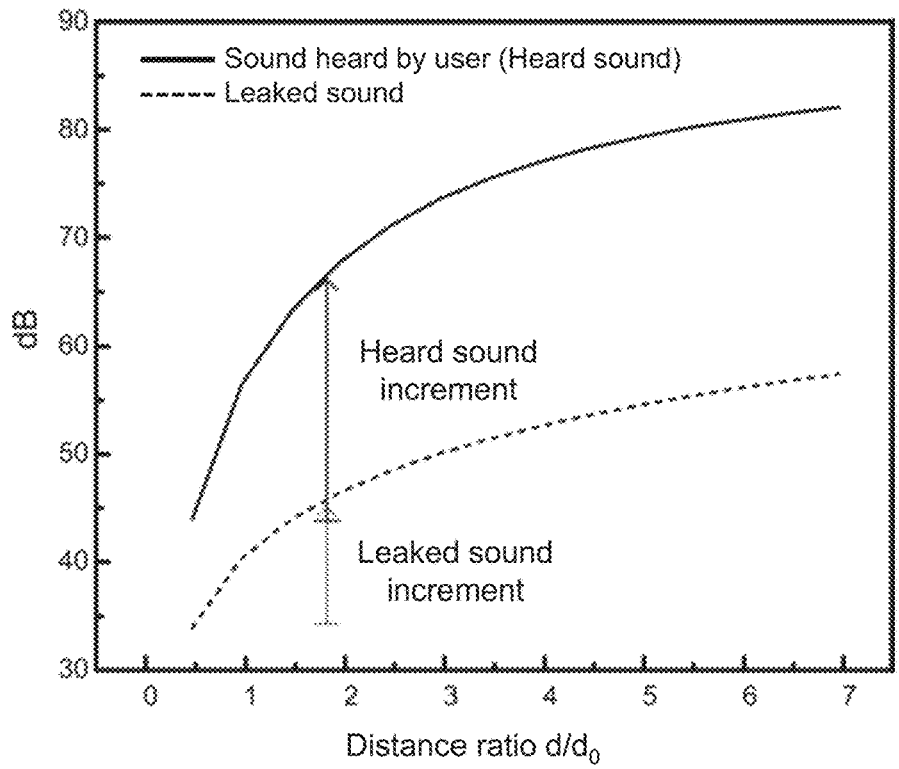
FIGS. 7A-7B are graphs illustrating a volume of the near-field sound and a volume of the far-field leakage as a function of a distance of two point sources according to some embodiments of the present disclosure.
Figure 7B:
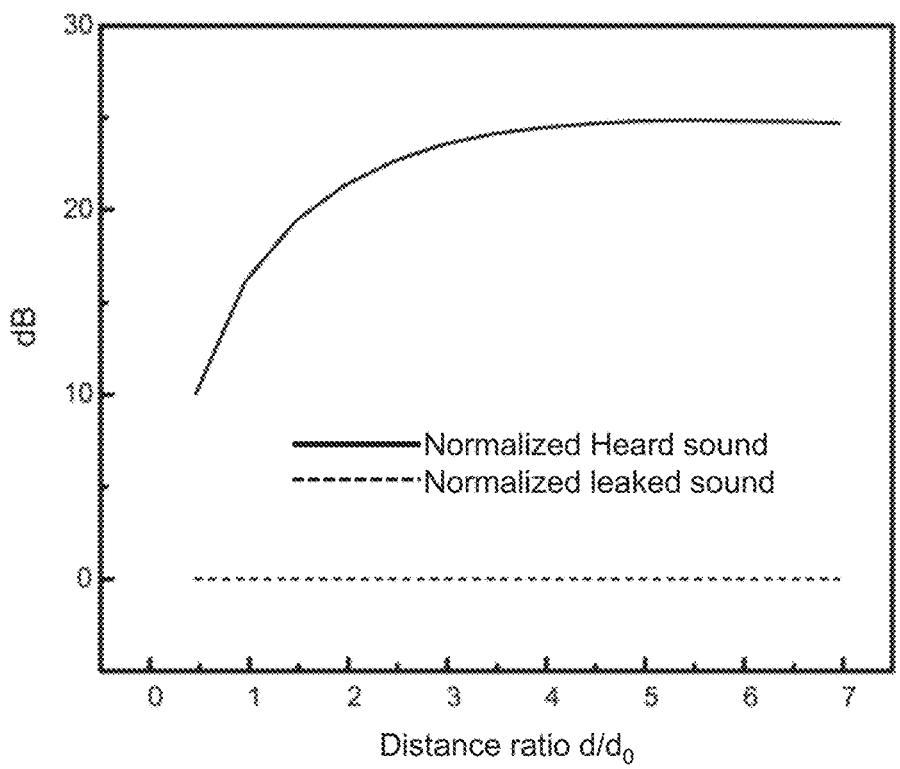

FIGS. 7A and 7B are exemplary graphs illustrating a volume of a near-field sound and a volume of a far-field leakage as a function of a distance between two point sources according to some embodiments of the present disclosure. FIG. 7B may be generated by performing a normalization on the graph in FIG. 7A.

In FIG. 7A, a solid line may represent a variation curve of the volume of the two point sources as a function of the distance between the two point sources, and the dotted line may represent the variation curve of the volume of the leaked sound of the two point sources as a function of the distance between the two point sources. The abscissa may represent a distance ratio d/d0 of the distance d of the two point sources to a reference distance d0. The ordinate may represent a sound volume (the unit is decibel dB). The distance ratio d/d0 may reflect a variation of the distance between the two point sources. In some embodiments, the reference distance d0 may be selected within a specific range. For example, d0 may be a specific value in the range of 2.5 mm~10 mm, e.g., d0 may be 5 mm. In some embodiments, the reference distance d0 may be determined based on a listening position. For example, the distance between the listening position to the nearest point source may be taken as the reference distance d0. It should be known that the reference distance d0 may be flexibly selected from any other suitable values according to the actual conditions, which is not limited here. Merely by way of example, in FIG. 7A, d0 may be 5 mm.

When the sound frequency is a constant, the volume of the sound heard by the user and volume of the leaked sound of the two point sources may increase as the distance between the two point sources increases. When the distance ratio d/d0 of is less than a threshold ratio, an increase (or increment) in the volume of the sound heard by the user may be larger than an increase (or increment) in the volume of the leaked sound as the distance between two point sources increases. That is to say, the increase in volume of the sound heard by the user may be more significant than the increase in volume of the leaked sound. For example, as shown in FIG. 7A, when the distance ratio d/d0 is 2, the difference between the volume of the sound heard by the user and the volume of the leaked sound may be about 20 dB. When the distance ratio d/d0 is 4, the difference between the volume of the sound heard by the user and the volume of the leaked sound may be about 25 dB. In some embodiments, when the distance ratio d/d0 reaches the threshold ratio, the ratio of the volume of the sound heard by the user to the volume of the leaked sound of the two point sources may reach a maximum value. At this time, as the distance of the two point sources further increases, the curve of the volume of the sound heard by the user and the curve of the volume of the leaked sound may gradually go parallel, that is, the increase in volume of the sound heard by the user and the increase in volume of the leaked sound may remain substantially the same. For example, as shown in FIG. 7B, when the distance ratio d/d0 is 5, 6, or 7, the difference between the volume of the sound heard by the user and the volume of the leaked sound may remain substantially the same, both of which may be about 25 dB. That is, the increase in volume of the sound heard by the user may be the same as the increase in volume of the leaked sound. In some embodiments, the threshold ratio of the distance ratio d/d0 of the two point sources may be in the range of 0~7. For example, the threshold ratio of d/d0 may be set in the range of 0.5~4.5. As another example, the threshold ratio of d/d0 may be set in the range of 1~4.

In some embodiments, the threshold ratio value may be determined based on the variation of the difference between the volume of the sound heard by the user and the volume of the leaked sound of the two point sources of FIG. 7A. For example, the ratio corresponding to the maximum difference between the volume of the sound heard by the user and the volume of the leaked sound may be determined as the threshold ratio. As shown in FIG. 7B, when the distance ratio d/d0 is less than the threshold ratio (e.g., 4), a curve of a normalized sound heard by the user (also referred to as "normalized heard sound") may show an upward trend (the slope of the curve is larger than 0) as the distance between the two point sources increases. That is, the increase in sound heard by the user volume may be greater than the increase in volume of the leaked sound. When the distance ratio d/d0 is greater than the threshold ratio, the slope of the curve of the normalized sound heard by the user may gradually approach 0 as the distance between the two point sources increases. That is to say, the increase in volume of the sound heard by the user may be no longer greater than the increase in volume of the leaked sound as the distance between the two point sources increases.

According to the descriptions above, if the listening position is fixed, the parameters of the two point sources may be adjusted by certain means. It may be possible to achieve an effect that the volume of the near-field sound has a significant increase while the volume of the far-field leakage only increases slightly (i.e., the increase in the volume of the near-field sound is greater than the volume of the far-field leakage). For example, two or more sets of two point sources (such as a set of high-frequency two point sources and a set of low-frequency two point sources) may be used. For each set, the distance between the point sources in the set is adjusted by a certain means, so that the distance between the high-frequency two point sources may be less than the distance between the low-frequency two point sources. The low-frequency two point sources may have a small sound leakage (the capability to reduce the sound leakage is strong), and the high-frequency two point sources have a large sound leakage (the capability to reduce the sound leakage is weak). The volume of the sound heard by the user may be significantly larger than the volume of the leaked sound if a smaller distance between the two point sources is set in the high-frequency band, thereby reducing the sound leakage.

In some embodiments, each acoustic driver may have a corresponding pair of sound guiding holes. The distance between the sound guiding holes corresponding to each acoustic driver may affect the volume of the near-field sound transmitted to the user's ears and the volume of the far-field leakage transmitted to the environment. In some embodiments, if the distance between the sound guiding holes corresponding to a high-frequency acoustic driver is less than that between the sound guiding holes corresponding to a low-frequency acoustic driver, the volume of the sound heard by the user may be increased and the sound leakage may be reduced, thereby preventing the sound from being heard by others near the user of the acoustic device. According to the above descriptions, the acoustic device may be effectively used as an open earphone even in a relatively quiet environment.

Figure 8:
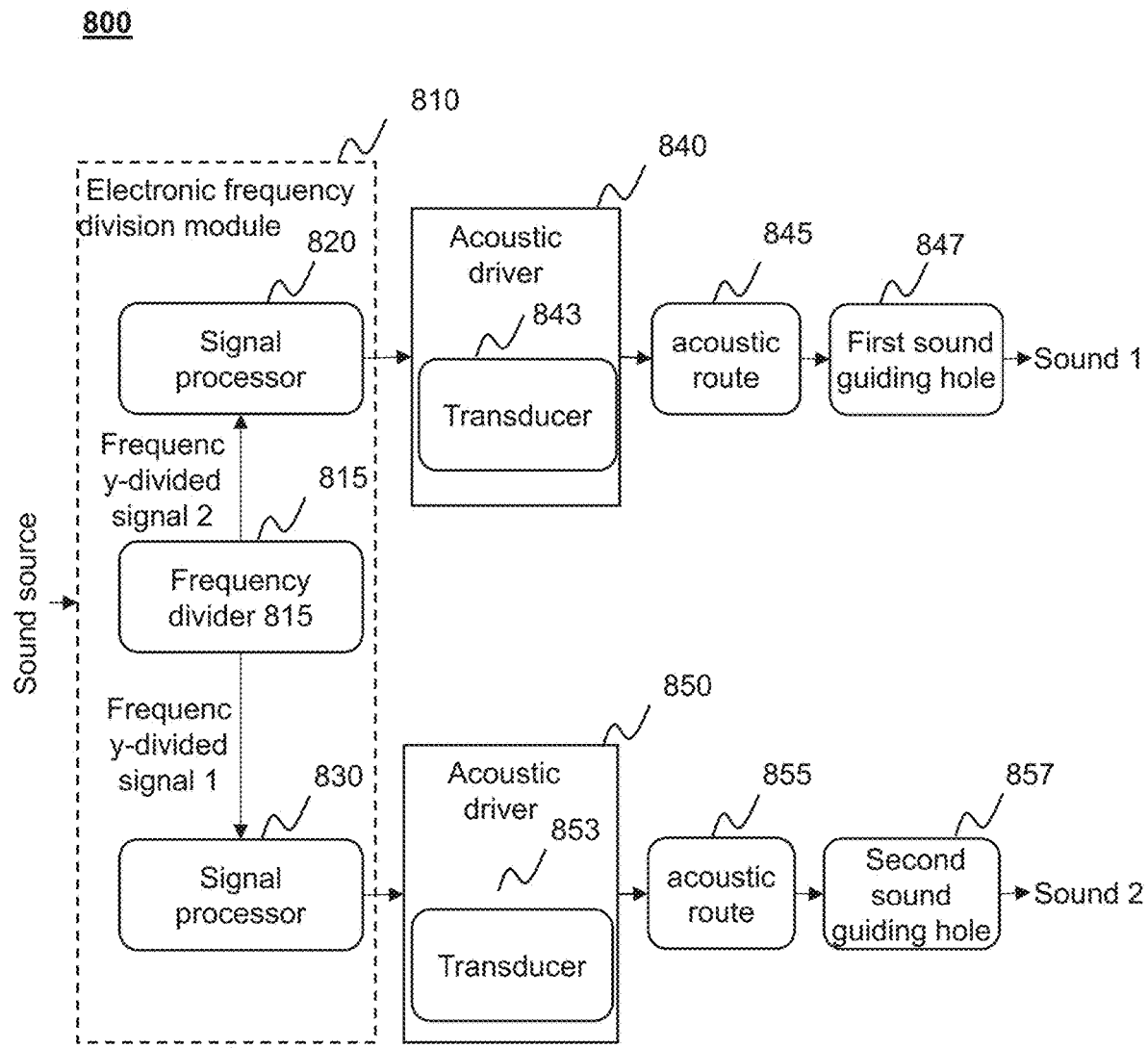
FIG. 8 is a schematic diagram illustrating an exemplary acoustic device according to some embodiments of the present disclosure.

FIG. 8 is a schematic diagram illustrating an exemplary acoustic device according to some embodiments of the present disclosure. The acoustic device 800 may be an example of the acoustic device 100 or the acoustic device 400. As shown in FIG. 8, the acoustic device 800 may include an electronic frequency division module 810, an acoustic driver 840, an acoustic driver 850, an acoustic route 845, an acoustic route 855, at least two first sound guiding holes 847, and at least two second sound guiding holes 857. In some embodiments, the acoustic device 800 may further include a controller (not shown in the figure) (e.g., the controller 420 shown in FIG. 4). The electronic frequency division module 810 may be part of the controller and configured to generate electrical signals that are input into different acoustic drivers. The connection between different components in the acoustic device 800 may be wired and/or wireless. For example, the electronic frequency division module 810 may send signals to the acoustic driver 840 and/or the acoustic driver 850 through a wired transmission or a wireless transmission.

The electronic frequency division module 810 may divide the frequency of a source signal. The source signal may come from one or more sound source apparatus (for example, a memory storing audio data). The sound source apparatus may be part of the acoustic device 800 or an independent device. The source signal may be an audio signal that is received by the acoustic device 800 via a wired or wireless means. In some embodiments, the electronic frequency division module 810 may decompose the source signal into two or more frequency-divided signals having different frequencies. For example, the electronic frequency division module 110 may decompose the source signal into a first frequency-divided signal (or frequency-divided signal 1) having a high-frequency sound and a second frequency-divided signal (or frequency-divided signal 2) having a low-frequency sound. For convenience, a frequency-divided signal having the high-frequency sound may be referred to as a high-frequency signal, and a frequency-divided signal having the low-frequency sound may be referred to as a low-frequency signal.

For the purposes of description, a low-frequency signal described in the present disclosure may refer to a sound signal with a frequency in a first frequency range (or referred to as a low frequency range). A high-frequency signal may refer to a sound signal with a frequency in a second frequency range (or referred to as a high frequency range). The first frequency range and the second frequency range may or may not include overlapping frequency ranges. The second frequency range may include frequencies higher than the first frequency range. Merely by way of example, the first frequency range may include frequencies below a first threshold frequency. The second frequency range may include frequencies above a second threshold frequency. The first threshold frequency may be lower than the second threshold frequency, or equal to the second threshold frequency, or higher than the second threshold frequency. For example, the first threshold frequency may be lower than the second threshold frequency (for example, the first threshold frequency may be 600 Hz and the second threshold frequency may be 700 Hz), which means that there is no overlap between the first frequency range and the second frequency range. As another example, the first threshold frequency may be equal to the second frequency (for example, both the first threshold frequency and the second threshold frequency may be 650 Hz or any other frequency values). As another example, the first threshold frequency may be higher than the second threshold frequency, which indicates that there is an overlap between the first frequency range and the second frequency range. In such cases, in some embodiments, the difference between the first threshold frequency and the second threshold frequency may not exceed a third threshold frequency. The third threshold frequency may be a fixed value, for example, 20 Hz, 50 Hz, 100 Hz, 150 Hz, or 200 Hz. Optionally, the third threshold frequency may be a value related to the first threshold frequency and/or the second threshold frequency (for example, 5%, 10%, 15%, etc., of the first threshold frequency). Alternatively, the third threshold frequency may be a value flexibly set by the user according to the actual needs, which may be not limited herein. It should be noted that the first threshold frequency and the second threshold frequency may be flexibly set according to different situations, and are not limited herein.

In some embodiments, the electronic frequency division module 810 may include a frequency divider 815, a signal processor 820, and a signal processor 830. The frequency divider 815 may be used to decompose the source signal into two or more frequency-divided signals containing different frequency components, for example, a frequency-divided signal 1 having a high-frequency sound component and a frequency-divided signal 2 having a low-frequency sound component. In some embodiments, the frequency divider 815 may be any electronic device that may implement the signal decomposition function, including but not limited to one of a passive filter, an active filter, an analog filter, a digital filter, or any combination thereof. In some embodiments, the frequency divider 815 may divide the source signal based on one or more frequency division points. A frequency division point may refer to a specific frequency distinguishing the first frequency range and the second frequency range. For example, when there is an overlapping frequency range between the first frequency range and the second frequency range, the frequency division point may be a feature point within the overlapping frequency range (for example, a low-frequency boundary point, a high-frequency boundary point, a center frequency point, etc., of the overlapping frequency range). In some embodiments, the frequency division point may be determined according to a relationship between the frequency and the sound leakage of the acoustic device (for example, the curves shown in FIGS. 6, 7A, and 7B). For example, considering that the sound leakage of the acoustic device changes with the frequency, a frequency point corresponding to the volume of the leaked sound satisfying a certain condition may be selected as the frequency division point, for example, 1000 Hz shown in FIG. 6. In some alternative embodiments, the user may specify a specific frequency as the frequency division point directly. For example, considering that the frequency range of sounds that the human ear may hear is 20 Hz-20 kHz, the user may select a frequency point in this range as the frequency division point. For example, the frequency division point may be 600 Hz, 800 Hz, 1000 Hz, 1200 Hz, or the like. In some embodiments, the frequency division point may be determined based on the performance of the acoustic drivers 840 and 850. For example, considering that a low-frequency acoustic driver and a high-frequency acoustic driver have different frequency response curves, the frequency division point may be selected within a frequency range. The frequency range may be above ½ of the upper limiting frequency of the low-frequency acoustic driver and below 2 times of the lower limiting frequency of the high-frequency acoustic driver. In some embodiments, the frequency division point may be selected in a frequency range above ⅓ of the upper limiting frequency of the low-frequency acoustic driver and below 1.5 times of the lower limiting frequency of the high-frequency acoustic driver. In some embodiments, in the overlapping frequency range, the positional relationship between point sources may also affect the volume of the sound produced by the acoustic device in the near field and the far field. More details may be found in International application No. PCT/CN2019/130886, filed on Dec. 31, 2019, the entire contents of which are hereby incorporated by reference.

The signal processor 820 and the signal processor 830 may further process a frequency-divided signal to meet the requirements of sound output. In some embodiments, the signal processor 820 and/or the signal processor 830 may include one or more signal processing components. For example, the signal processing components(s) may include, but not limited to, an amplifier, an amplitude modulator, a phase modulator, a delayer, a dynamic gain controller, or the like, or any combination thereof. Merely by way of example, the processing of a sound signal by the signal processor 820 and/or the signal processor 830 may include adjusting the amplitude of a portion of the sound signal that has a specific frequency. In some embodiments, if the first frequency range and the second frequency range overlap, the signal processors 820 and 830 may adjust the intensity of a portion of a sound signal that has the frequency in the overlapping frequency range (for example, reduce the amplitude of the portion that has the frequency in the overlapping frequency range). This may avoid that in a final sound outputted by acoustic device, the portion that corresponds to the overlapping frequency range may have an excessive volume caused by the superposition of multiple sound signals.

After being processed by the signal processors 820 or 830, the frequency-divided signals 1 and 2 may be transmitted to the acoustic drivers 840 and 850, respectively. In some embodiments, the processed frequency-divided signal transmitted into the acoustic driver 840 may be a sound signal having a lower frequency range (e.g., the first frequency range). Therefore, the acoustic driver 840 may also be referred to as a low-frequency acoustic driver. The processed frequency-divided transmitted into the acoustic driver 850 may be a sound signal having a higher frequency range (e.g., the second frequency range). Therefore, the acoustic driver 850 may also be referred to as a high-frequency acoustic driver. The acoustic driver 840 and the acoustic driver 850 may convert sound signals into a low-frequency sound and a high-frequency sound, respectively, then propagate the converted signals outwards.

In some embodiments, the acoustic driver 840 may be acoustically coupled to at least two first sound guiding holes. For example, the acoustic driver 840 may be acoustically coupled to the two first sound guiding holes 847 via two acoustic routes 845. The acoustic driver 840 may propagate sound through the at least two first sound guiding holes 847. The acoustic driver 850 may be acoustically coupled to at least two second sound guiding holes. For example, the acoustic driver 850 may be acoustically coupled to the two second sound guiding holes 857 via two acoustic routes 855. The acoustic driver 850 may propagate sound through the at least two second sound guiding holes 857. A sound guiding hole may be a small hole formed on the acoustic device with a specific opening and allowing sound to pass. The shape of a sound guiding hole may include but not limited to a circle shape, an oval shape, a square shape, a trapezoid shape, a rounded quadrangle shape, a triangle shape, an irregular shape, or the like, or any combination thereof. In addition, the number of the sound guiding holes connected to the acoustic driver 840 or 850 may not be limited to two, which may be an arbitrary value instead, for example, three, four, six, or the like.

In some embodiments, in order to reduce the far-field leakage of the acoustic device 800, the acoustic driver 840 may be used to output low-frequency sounds with the same (or approximately the same) amplitude and opposite (or approximately opposite) phases via the at least two first sound guiding holes. The acoustic driver 850 may be used to output high-frequency sounds with the same (or approximately the same) amplitude and opposite (or approximately opposite) phases via the at least two second sound guiding holes. In this way, the far-field leakage of low-frequency sounds (or high-frequency sounds) may be reduced according to the principle of acoustic interference cancellation.

According to FIGS. 6 7A and 7B, considering that the wavelength of a low-frequency sound is longer than that of a high-frequency sound, and in order to reduce the interference cancellation of the sound in the near field (for example, near the user's ear), the distance between the first sound guiding holes and the distance between the second sound guiding holes may have different values. For example, assuming that there is a first distance between the two first sound guiding holes and a second distance between the two second sound guiding holes, the first distance may be longer than the second distance. In some embodiments, the first distance and the second distance may be arbitrary values. Merely by way of example, the first distance may not be longer than 40 mm, for example, in the range of 20 mm-40 mm. The second distance may not be longer than 12 mm, and the first distance may be longer than the second distance. In some embodiments, the first distance may not be shorter than 12 mm. The second distance may be shorter than 7 mm, for example, in the range of 3 mm-7 mm. In some embodiments, the first distance may be 30 mm, and the second distance may be 5 mm. As another example, the first distance may be at least twice longer than the second distance. In some embodiments, the first distance may be at least three times longer than the second distance. In some embodiments, the first distance may be at least 5 times longer than the second distance.

As shown in FIG. 8, the acoustic driver 840 may include a transducer 843. The transducer 843 may transmit a sound to the first sound guiding hole(s) 847 through the acoustic route 845. The acoustic driver 850 may include a transducer 853. The transducer 853 may transmit a sound to the second sound guiding hole(s) 857 through the acoustic route 855. In some embodiments, the transducer may include, but not limited to, a transducer of a gas-conducting acoustic device, a transducer of a bone-conducting acoustic device, a hydroacoustic transducer, an ultrasonic transducer, or the like, or any combination thereof. In some embodiments, the transducer may be of a moving coil type, a moving iron type, a piezoelectric type, an electrostatic type, or a magneto strictive type, or the like, or any combination thereof.

In some embodiments, the acoustic drivers (such as the low-frequency acoustic driver 840, the high-frequency acoustic driver 850) may include transducers with different properties or different counts of transducers. For example, each of the low-frequency acoustic driver 840 and the high-frequency acoustic driver 850 may include a transducer, and the transducers of the frequency acoustic driver 840 and the high-frequency acoustic driver 850 may have different frequency response characteristics (such as a low-frequency speaker unit and a high-frequency speaker unit). As another example, the low-frequency acoustic driver 840 may include two transducers 843 (such as two low-frequency speaker units), and the high-frequency acoustic driver 850 may include two transducers 853 (such as two high-frequency speaker units).

In some embodiments, the acoustic device 800 may generate sounds with different frequency ranges by other means, for example, a transducer frequency division, an acoustic route frequency division, or the like. When the acoustic device 800 uses a transducer or an acoustic route to divide a sound, the electronic frequency division module 810 (e.g., the part inside the dotted frame in FIG. 8) may be omitted. The source signal may be input to the acoustic driver 840 and the acoustic driver 850, respectively.

In some embodiments, the acoustic device 800 may use a plurality of transducers to achieve signal frequency division. For example, the acoustic driver 840 and the acoustic driver 850 may convert the inputted source signal into a low-frequency signal and a high-frequency signal, respectively. Specifically, through the transducer 843 (such as a low-frequency speaker), the low-frequency acoustic driver 840 may convert the source signal into the low-frequency sound having a low-frequency component. The low-frequency sound may be transmitted to at least two first sound guiding holes 847 along at least two different acoustic routes 845. Then the low-frequency sound may be propagated outwards through the first sound guiding holes 847. Through the transducer 853 (such as a high-frequency speaker), the high-frequency acoustic driver 850 may convert the source signal into the high-frequency sound having a high-frequency component. The high-frequency sound may be transmitted to at least two second sound guiding holes 857 along at least two different acoustic routes 855. Then the high-frequency sound may be propagated outwards through the second sound guiding holes 857.

In some alternative embodiments, an acoustic route (e.g., the acoustic routes 845 and the acoustic routes 855) connecting a transducer and a sound guiding hole may affect the nature of the transmitted sound. For example, an acoustic route may attenuate or change the phase of the transmitted sound to some extent. In some embodiments, the acoustic route may include a sound tube, a sound cavity, a resonance cavity, a sound hole, a sound slit, a tuning net, or the like, or any combination thereof. In some embodiments, the acoustic route may include an acoustic resistance material, which may have a specific acoustic impedance. For example, the acoustic impedance may be in the range of 5MKS Rayleigh to 500MKS Rayleigh. Exemplary acoustic resistance materials may include but not limited to plastic, textile, metal, permeable material, woven material, screen material or mesh material, porous material, particulate material, polymer material, or the like, or any combination thereof. By setting acoustic routes of different acoustic impedances, the sounds output of different transducers may be acoustically filtered. In this case, the sounds output through different acoustic routes have different frequency components.

In some embodiments, the acoustic device 800 may utilize a plurality of acoustic routes to achieve signal frequency division. Specifically, the source signal may be inputted into a specific acoustic driver and converted into a sound including high and low-frequency components. The sound may be propagated along an acoustic route having a specific frequency selection characteristic. For example, the sound may be propagated along an acoustic route with a low-pass characteristic to a corresponding sound guiding hole to output a low-frequency sound. In this process, the high-frequency component of the sound may be absorbed or attenuated by the acoustic route with a low-pass characteristic. Similarly, the sound signal may be propagated along an acoustic route with a high-pass characteristic to the corresponding sound guiding hole to output a high-frequency sound. In this process, the low-frequency component of the sound may be absorbed or attenuated by the acoustic route with the high-pass characteristic.

In some embodiments, the controller in the acoustic device 800 may cause the low-frequency acoustic driver 840 to output a sound in the first frequency range (i.e., a low-frequency sound), and cause the high-frequency acoustic driver 850 to output a sound in the second frequency range (i.e., a high-frequency sound). In some embodiments, the acoustic device 800 may also include a supporting structure. In some embodiments, the supporting structure may be an enclosed shell structure with an internal hollow cavity. The supporting structure may be used to carry an acoustic driver (such as the high-frequency acoustic driver 850, the low-frequency acoustic driver 840), so that the acoustic driver may be positioned away from the user's ear. In some embodiments, the sound guiding hole(s) acoustically coupled with the high-frequency acoustic driver 850 may be located closer to an expected position of the user's ears (for example, the ear canal entrance), while the sound guiding hole(s) acoustically coupled with the low-frequency acoustic driver 840 may be located further away from the expected position. In some embodiments, the supporting structure may be used to package the acoustic driver. For example, the supporting structure may include a casing made of various materials such as plastic, metal, and tape. The casing may encapsulate the acoustic driver and form a front chamber and a rear chamber corresponding to the acoustic driver. The front chamber may be acoustically coupled to one of the at least two sound guiding holes corresponding to the acoustic driver. The rear chamber may be acoustically coupled to the other of the at least two sound guiding holes corresponding to the acoustic driver. For example, the front chamber of the low-frequency acoustic driver 840 may be acoustically coupled to one of the at least two first sound guiding holes 847. The rear chamber of the low-frequency acoustic driver 840 may be acoustically coupled to the other of the at least two first sound guiding holes 847. The front chamber of the high-frequency acoustic driver 850 may be acoustically coupled to one of the at least two second sound guiding holes 857. The rear chamber of the high-frequency acoustic driver 850 may be acoustically coupled to the other of the at least two second sound guiding holes 857. In some embodiments, a sound guiding hole (such as the first sound guiding hole(s) 847 and the second sound guiding hole(s) 857) may be disposed on the casing.

The above description of the acoustic device 800 may be merely provided by way of example. Those skilled in the art may make adjustments and changes to the structure, quantity, etc., of the acoustic driver, which is not limiting in the present disclosure. In some embodiments, the acoustic device 800 may include any number of the acoustic drivers. For example, the acoustic device 800 may include two groups of the high-frequency acoustic drivers 850 and two groups of the low-frequency acoustic drivers 840, or one group of the high-frequency acoustic drives 850 and two groups of the low-frequency acoustic drivers 840, and these high-frequency/low-frequency drivers may be used to generate a sound in a specific frequency range, respectively. As another example, the acoustic driver 840 and/or the acoustic driver 850 may include an additional signal processor. The signal processor may have the same structural component as or different structural component from the signal processor 820 or 830.

It should be noted that the acoustic device and its modules shown in FIG. 8 may be implemented in various ways. For example, in some embodiments, the system and the modules may be implemented by hardware, software, or a combination of both. The hardware may be implemented by a dedicated logic. The software may be stored in a storage which may be executed by a suitable instruction execution system, for example, a microprocessor or a dedicated design hardware. It will be appreciated by those skilled in the art that the above methods and systems may be implemented by computer-executable instructions and/or embedded in control codes of a processor. For example, the control codes may be provided by a medium such as a disk, a CD or a DVD-ROM, a programmable memory device, such as read-only memory (e.g., firmware), or a data carrier such as an optical or electric signal carrier. The system and the modules in the present disclosure may be implemented not only by a hardware circuit in a programmable hardware device in an ultra large scale integrated circuit, a gate array chip, a semiconductor such a logic chip or a transistor, a field programmable gate array, or a programmable logic device. The system and the modules in the present disclosure may also be implemented by a software to be performed by various processors, and further also by a combination of hardware and software (e.g., firmware).

It should be noted that the above description of the acoustic device 800 and its components is only for convenience of description, and not intended to limit the scope of the present disclosure. It may be understood that, for those skilled in the art, after understanding the principle of the apparatus, it is possible to combine each unit or form a substructure to connect with other units arbitrarily without departing from this principle. For example, the electronic frequency division module 810 may be omitted, and the frequency division of the source signal may be implemented by the internal structure of the low-frequency acoustic driver 840 and/or the high-frequency acoustic driver 850. As another example, the signal processor 820 or 830 may be a part independent of the electronic frequency division module 810. Those modifications may fall within the scope of the present disclosure.

Figure 9A:
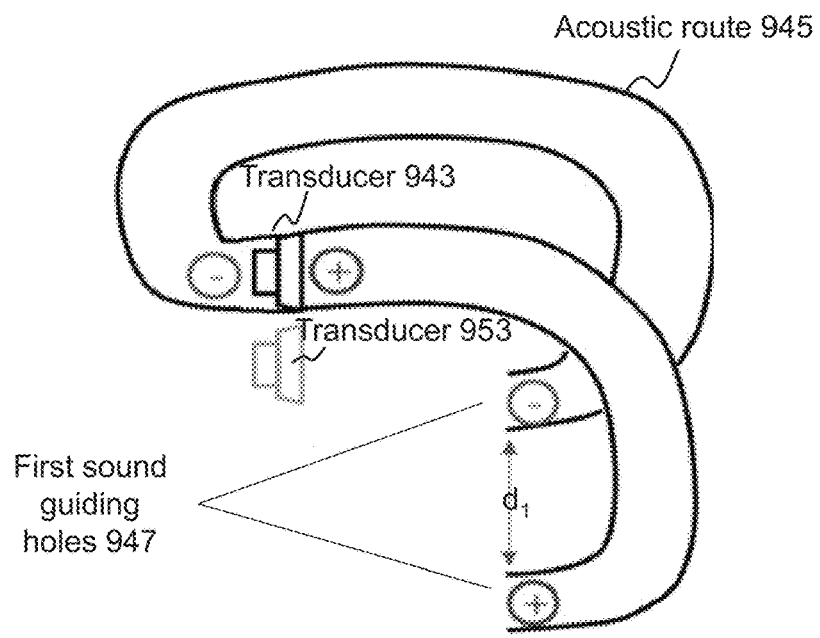
FIGS. 9A-9B are schematic diagrams illustrating exemplary application scenarios of an acoustic driver according to some embodiments of the present disclosure.
Figure 9B:
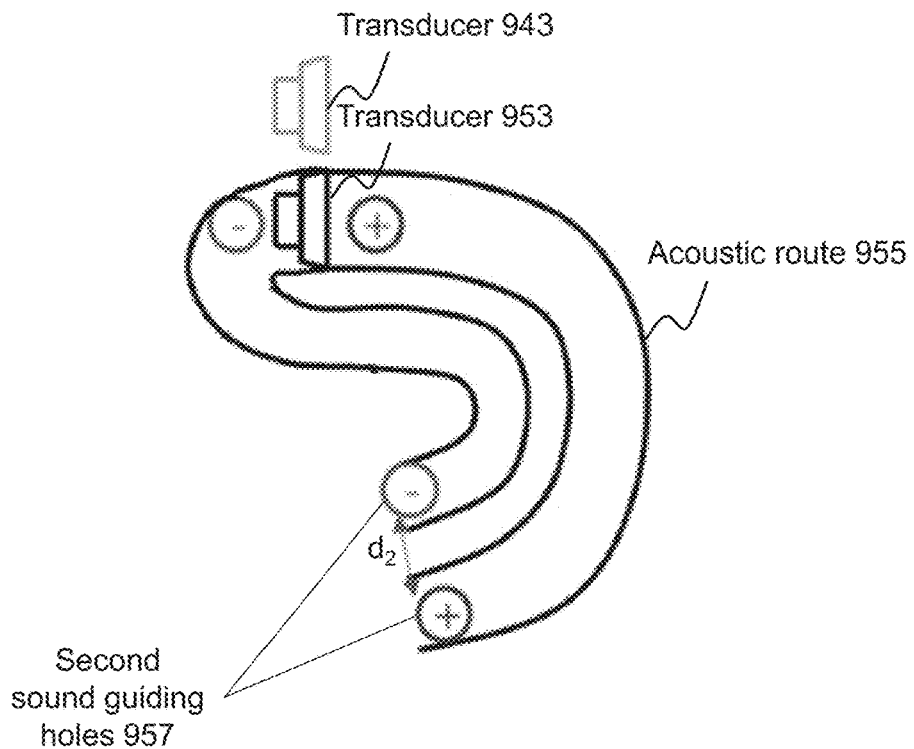

FIGS. 9A and 9B are schematic diagrams illustrating exemplary acoustic devices according to some embodiments of the present disclosure. For the purpose of illustration, sounds outputted by different sound guiding holes coupled with a same transducer may be described as an example. In FIGS. 9A and 9B, each transducer may have a front side and a rear side, and a front chamber and a rear chamber may exist on the front and rear side of the transducer, respectively. In some embodiments, these structures may have the same or approximately the same equivalent acoustic impedance, such that the transducer may be loaded symmetrically. The symmetrical load of the transducer may form sound sources satisfying an amplitude and phase relationship at different sound guiding holes (such as the "two point sources" having a same amplitude and opposite phases as described above), such that a specific sound field may be formed in the high-frequency range and/or the low-frequency range (for example, the near-field sound may be enhanced and the far-field leakage may be suppressed).

As shown in FIGS. 9A and 9B, an acoustic driver (for example, the acoustic driver 910 or 920) may include transducers, and acoustic routes and sound guiding holes connected to the transducers. The acoustic driver 910 may include a transducer 943 (or referred to as a low-frequency acoustic driver), and the transducer 943 may be coupled with two first sound guiding holes 947 through an acoustic route 945. The acoustic driver 920 may include a transducer 953 (or referred to as a high-frequency acoustic driver), and the transducer 953 may be coupled with two second sound guiding holes 957 through an acoustic route 955.

The transducer 943 or 953 may vibrate under the driving of an electric signal, and the vibration may generate sounds with equal amplitudes and opposite phases (180 degrees inversion). The type of the transducer may include, but not limited to, an air conduction speaker, a bone conduction speaker, a hydroacoustic transducer, an ultrasonic transducer, or the like, or any combination thereof. The transducer may be of a moving coil type, a moving iron type, a piezoelectric type, an electrostatic type, a magneto strictive type, or the like, or any combination thereof. In some embodiments, the transducer 943 or 953 may include a vibration diaphragm, which may vibrate when driven by an electrical signal, and the front and rear sides of the vibration diaphragm may simultaneously output a normal-phase sound and a reverse-phase sound. In FIGS. 9A and 9B, "+" and "−" may be used to represent sounds with different phases, wherein "+" may represent a normal-phase sound, and "−" may represent a reverse-phase sound.

In some embodiments, a transducer may be encapsulated by a casing of a supporting structure, and the interior of the casing may be provided with sound channels connected to the front and rear sides of the transducer, respectively, thereby forming an acoustic route. For example, a front cavity of the transducer 943 may be coupled to one of the two first sound guiding holes 947 through a first acoustic route (i.e., a half of the acoustic route 945), and a rear cavity of the transducer 943 may acoustically be coupled to the other sound guiding hole of the two first sound guiding holes 947 through a second acoustic route (i.e., the other half of the acoustic route 945). A normal-phase sound and a reverse-phase sound output from the transducer 943 may be output from the two first sound guiding holes 947, respectively. As another example, a front cavity of the transducer 953 may be coupled to one of the two sound guiding holes 957 through a third acoustic route (i.e., half of the acoustic route 955), and a rear cavity of the transducer 953 may be coupled to another sound guiding hole of the two second sound guiding holes 957 through a fourth acoustic route (i.e., the other half of the acoustic route 955). A normal-phase sound and a reverse-phase sound output from the transducer 953 may be output from the two second sound guiding holes 957, respectively.

In some embodiments, an acoustic route may affect the nature of the transmitted sound. For example, an acoustic route may attenuate or change the phase of the transmitted sound to some extent. In some embodiments, the acoustic route may include one or more of a sound tube, a sound cavity, a resonance cavity, a sound hole, a sound slit, a tuning net, or the like, or any combination thereof. In some embodiments, the acoustic route may include an acoustic resistance material, which may have a specific acoustic impedance. For example, the acoustic impedance may be in the range of 5MKS Rayleigh to 500MKS Rayleigh. In some embodiments, the acoustic resistance material may include but not limited to plastics, textiles, metals, permeable materials, woven materials, screen materials, and mesh materials, or the like, or any combination thereof. In some embodiments, in order to prevent the sound transmitted by the acoustic driver's front chamber and rear chamber from being differently disturbed, the front chamber and rear chamber corresponding to the acoustic driver may have the approximately same equivalent acoustic impedance. Additionally, sound guiding holes with the same acoustic resistance material, the same size and/or shape, etc., may be used.

The distance between the two first sound guiding holes 947 of the low-frequency acoustic driver may be expressed as d1 (i.e., the first distance). The distance between the two second sound guiding holes 957 of the high-frequency acoustic driver may be expressed as d2 (i.e., the second distance). By setting the distances d1 and d2, a higher sound volume output in the low-frequency band and a stronger ability to reduce the sound leakage in the high-frequency band may be achieved. For example, the distance between the two first sound guiding holes 947 is greater than the distance between the two second sound guiding holes 957 (i.e., d1>d2).

In some embodiments, the transducer 943 and the transducer 953 may be housed together in a housing of an acoustic device, and be placed in isolation in a structure of the housing.

In some embodiments, the acoustic device may include multiple sets of high-frequency acoustic drivers and low-frequency acoustic drivers. For example, the acoustic device may include a set of high-frequency acoustic drivers and a set of low-frequency acoustic drivers for simultaneously outputting sound to the left and/or right ears. As another example, the acoustic device may include two sets of high-frequency acoustic drivers and two sets of low-frequency acoustic drivers, wherein one set of high-frequency acoustic drivers and one set of low-frequency acoustic drivers may be used to output sound to a user's left ear, and the other set of high-frequency acoustic drivers and the other set of low-frequency acoustic drivers may be used to output sound to a user's right ear.

In some embodiments, the high-frequency acoustic driver and the low-frequency acoustic driver may have different powers. In some embodiments, the low-frequency acoustic driver may have a first power, the high-frequency acoustic driver may have a second power, and the first power may be greater than the second power. In some embodiments, the first power and the second power may be arbitrary values.

Figure 10A:
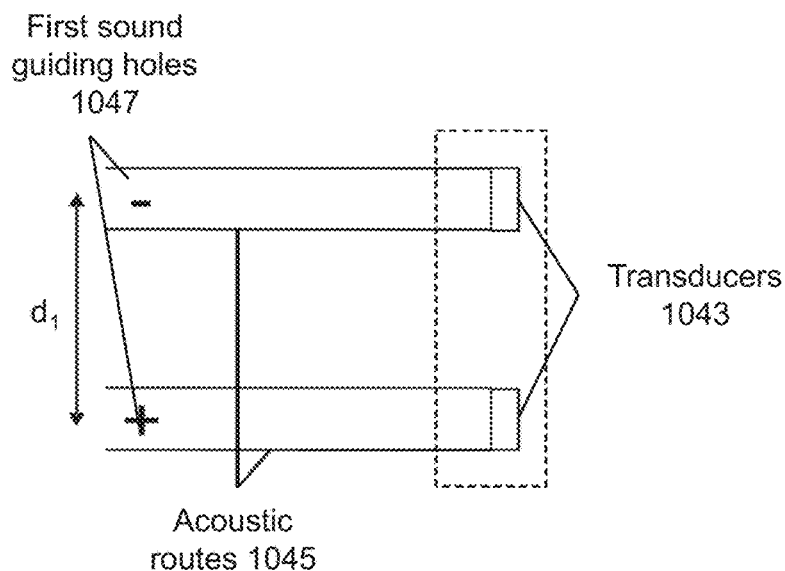
FIGS. 10A-10C are schematic diagrams illustrating exemplary sound outputs according to some embodiments of the present disclosure.
Figure 10B:
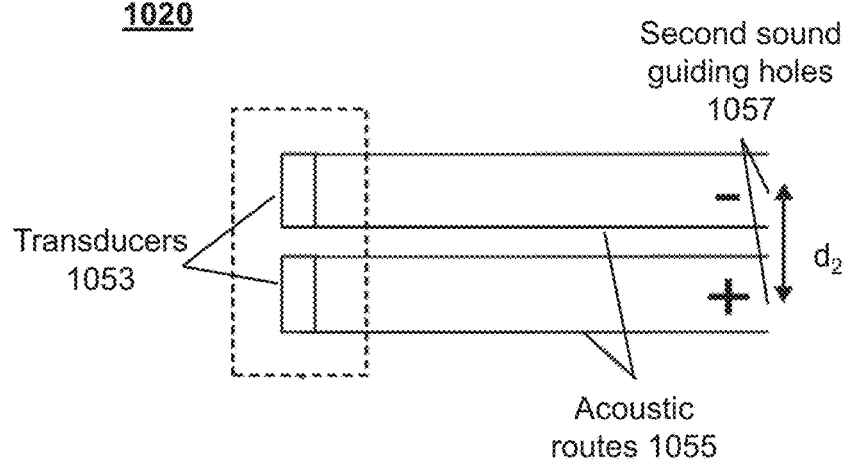
Figure 10C:
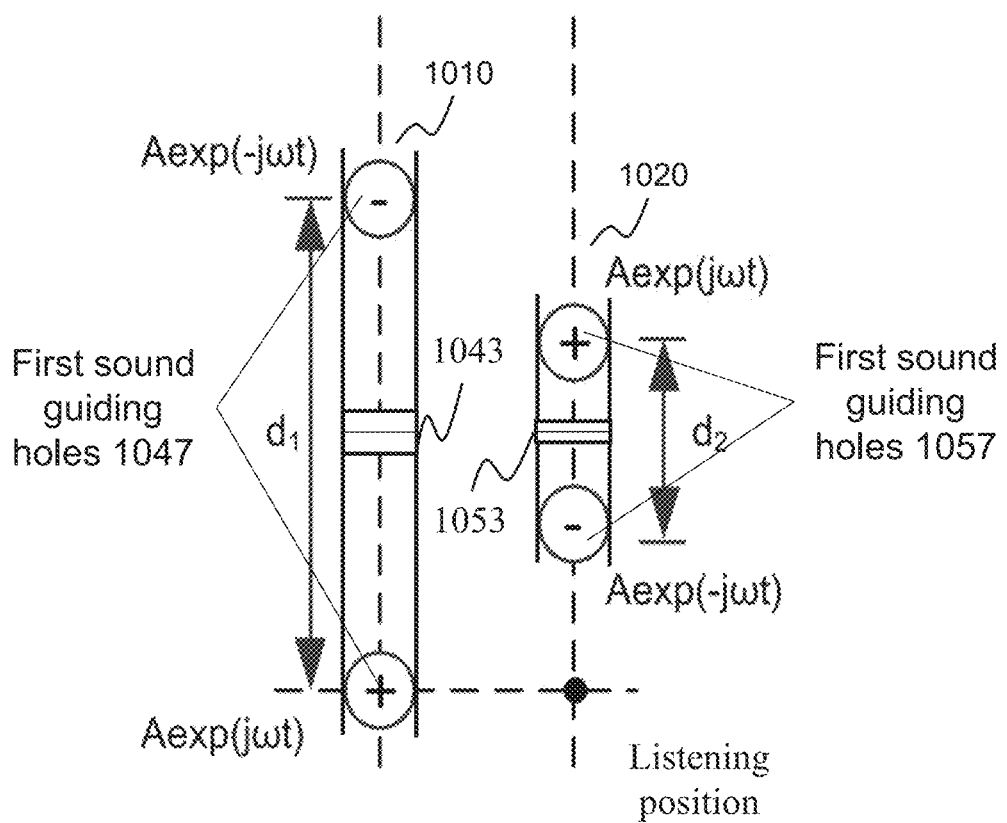

FIGS. 10A, 10B, and 10C are schematic diagrams illustrating sound output scenarios according to some embodiments of the present disclosure.

In some embodiments, the acoustic device may generate sounds in the same frequency range through two or more transducers, and the sounds may propagate outwards through different sound guiding holes. In some embodiments, different transducers may be controlled by the same controller or different controllers, respectively, and may produce sounds that satisfy a certain phase and amplitude condition (for example, sounds with the same amplitude but opposite phases, sounds with different amplitudes and opposite phases, etc.). For example, a controller may make the electrical signals input into two low-frequency transducers of an acoustic driver have the same amplitude and opposite phases. In this way, the two low-frequency transducers may output low-frequency sounds with the same amplitude but opposite phases.

Specifically, the two transducers in an acoustic driver (such as a low-frequency acoustic driver 1010 or a high-frequency acoustic driver 1020) may be arranged side by side in an acoustic device, one of which may be used to output a normal-phase sound, and the other may be used to output a reverse-phase sound. As shown in FIG. 10A, the acoustic driver 1010 may include two transducers 1043, two acoustic routes 1045, and two first sound guiding holes 1047. As shown in FIG. 10B, the acoustic driver 1050 may include two transducers 1053, two acoustic routes 1055, and two second sound guiding holes 1057. Driven by electrical signals with opposite phases, the two transducers 1043 may generate a set of low-frequency sounds with opposite phases (180 degrees inversion). One of the two transducers 1043 (such as the transducer located below) may output a normal-phase sound, and the other (such as the transducer located above) may output a reverse-phase sound. The two low-frequency sounds with opposite phases may be transmitted to the two first sound guiding holes 1047 along the two acoustic routes 1045, respectively, and propagate outwards through the two first sound guiding holes 1047. Similarly, driven by electrical signals with opposite phases, the two transducers 1053 may generate a set of high-frequency sounds with opposite phases (180 degrees inversion). One of the two transducers 1053 (such as the transducer located below) may output a normal-phase high-frequency sound, and the other (such as the transducer located above) may output a reverse-phase high-frequency sound. The high-frequency sounds with opposite phases may be transmitted to the two second sound guiding holes 1057 along the two acoustic routes 1055, respectively, and propagate outwards through the two second sound guiding holes 1057.

In some embodiments, the two transducers in an acoustic driver (for example, the low-frequency acoustic driver 1043 and the high-frequency acoustic driver 1053) may be arranged relatively close to each other along a straight line, and one of them may be used to output a normal-phase sound and the other may be used to output a reverse-phase sound.

As shown in FIG. 10C, the left side may be the acoustic driver 1010, and the right side may be the acoustic driver 1020. The two transducers 1043 of the acoustic driver 1010 may generate a set of low-frequency sounds of equal amplitude and opposite phases under the control of the controller, respectively. One of the transducers 1043 may output a normal-phase low-frequency sound, and transmit the normal-phase low-frequency sound along a first acoustic route to a first sound guiding hole 1047. The other transducer 1043 may output a reverse-phase low-frequency sound, and transmit the reverse-phase low-frequency sound along a second acoustic route to another first sound guiding hole 1047. The two transducers 1053 of the acoustic driver 1020 may generate high-frequency sounds of equal amplitude and opposite phases under the control of the controller, respectively. One of the transducers 1053 may output a normal-phase high-frequency sound, and transmit the normal-phase high-frequency sound along a third acoustic route to a second sound guiding hole 1057. The other transducer 1053 may output a reverse-phase high-frequency sound, and transmit the reverse-phase high-frequency sound along a fourth acoustic route to another second sound guiding hole 1057.

In some embodiments, the transducer 1043 and/or the transducer 1053 may be of various suitable types. For example, the transducer 1043 and the transducer 1053 may be dynamic coil speakers, which may have the characteristics of a high sensitivity in low-frequency, a deep low frequency depth, and a small distortion. As another example, the transducer 1043 and the transducer 1053 may be moving iron speakers, which may have the characteristics of a small size, a high sensitivity, and a large high-frequency range. As another example, the transducers 1043 and 1053 may be air-conducted speakers or bone-conducted speakers. As yet another example, the transducer 1043 and the transducer 1053 may be balanced armature speakers. In some embodiments, the transducer 1043 and the transducer 1053 may be of different types. For example, the transducer 1043 may be a moving iron speaker, and the transducer 1053 may be a moving coil speaker. As another example, the transducer 1043 may be a dynamic coil speaker, and the transducer 1053 may be a moving iron speaker.

In FIGS. 10A-10C, the distance between the two point sources of the acoustic driver 1010 may be d1, the distance between the two point sources of the acoustic driver 1020 may be d2, and d1 may be greater than d2. As shown in FIG. 10C, the listening position (that is, the position of the ear canal when the user wears an acoustic device) may be approximately located on a line of a set of two point sources. In some embodiments, the listening position may be located at any suitable position. For example, the listening position may be located on a circle centered on the center point of the two point sources. As another example, the listening position may be on the same side of the two lines of the two sets of point sources.

It may be understood that the simplified structure of the acoustic device shown in FIGS. 10A-10C may be merely by way of example, which may be not a limitation for the present disclosure. In some embodiments, the acoustic device may include a supporting structure, a controller, a signal processor, or the like, or any combination thereof.

Figure 11A:
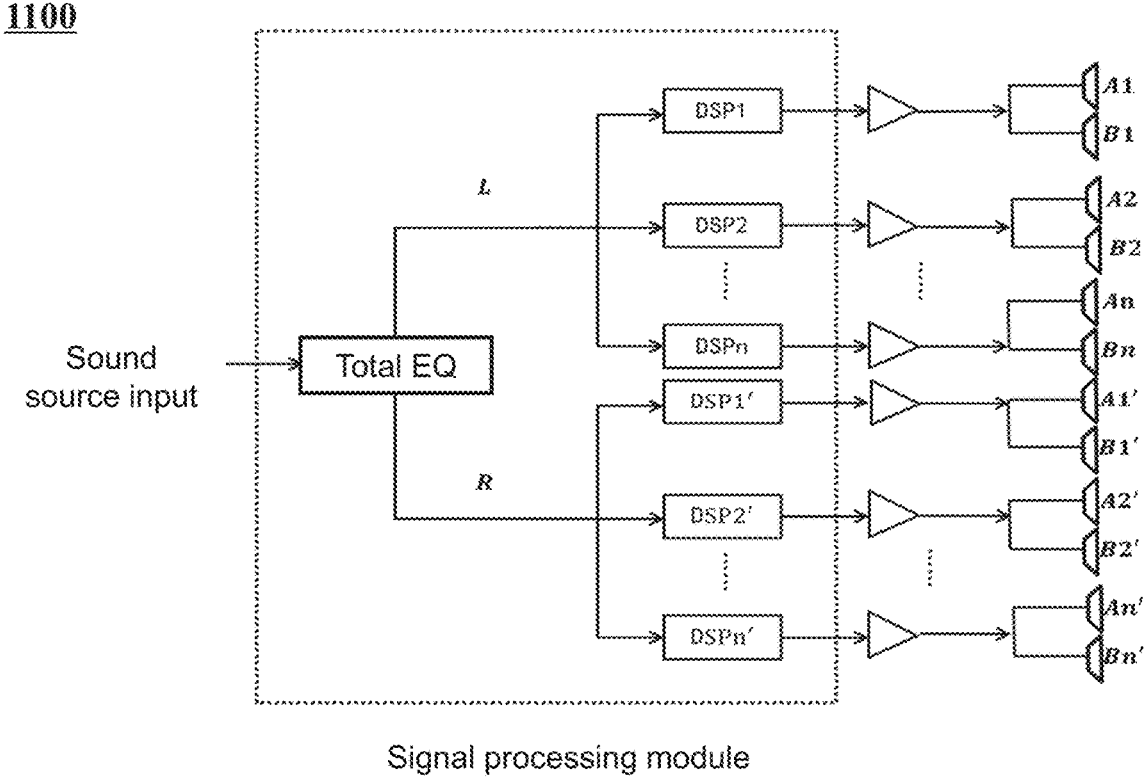
FIGS. 11A-11B are schematic diagrams illustrating acoustic devices according to some embodiments of the present disclosure.
Figure 11B:
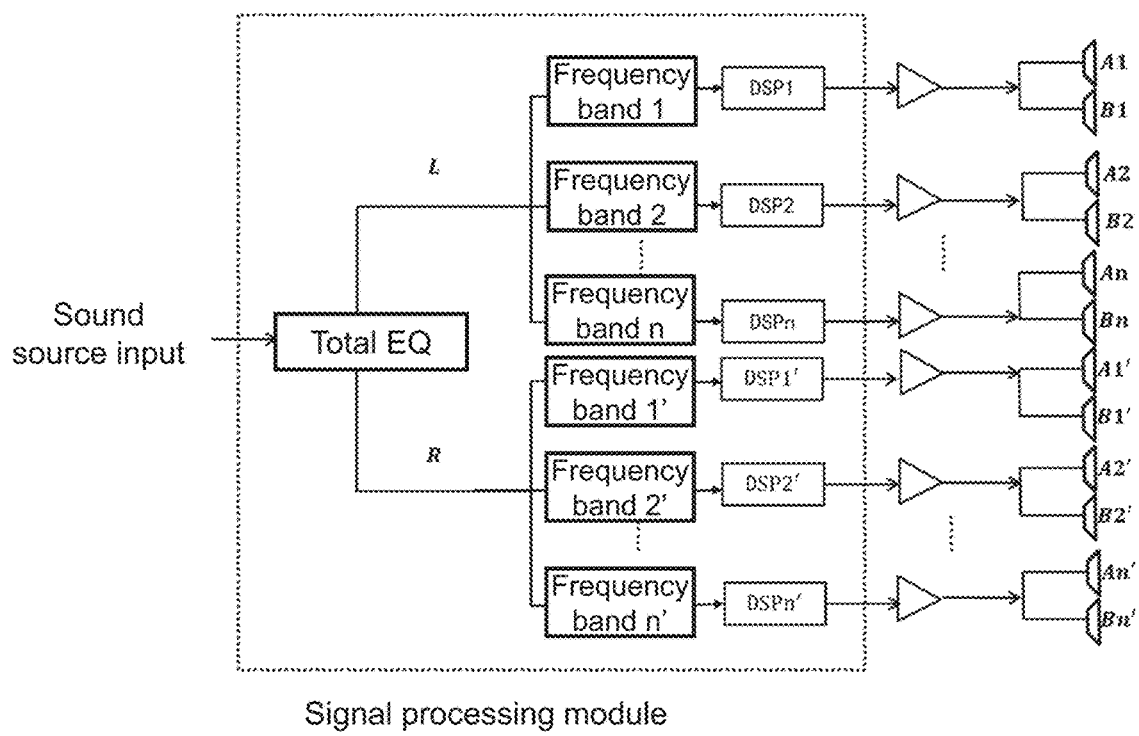

FIGS. 11A and 11B are schematic diagrams illustrating an acoustic device according to some embodiments of the present disclosure. The acoustic device 1100 may be an example of the acoustic device 100 or the acoustic device 400.

In some embodiments, acoustic drivers (e.g., acoustic drivers 1043 or 1053) may include multiple narrow-band speakers. As shown in FIG. 11A, the acoustic device may include a plurality of narrow-band speaker units and a signal processing module. On the left or right side of the user, the acoustic device may include n groups, narrow-band speaker units, respectively. Each group of narrow-band speaker units may have different frequency response curves, and the frequency response of each group may be complementary and collectively cover the audible sound frequency band. A narrow-band speaker unit used herein may be an acoustic driver with a narrower frequency response range than a low-frequency acoustic driver and/or a high-frequency acoustic driver. Taking the speaker units located on the left side of the user as shown in FIG. 11A as an example: A1~An and B1~Bn form n groups of two point sources. When a same electrical signal is input, each two point sources may generate sounds with different frequency ranges. By setting the distance dn of each two point sources, the near-field and far-field sound of each frequency band may be adjusted. For example, in order to enhance the volume of near-field sound and reduce the volume of far-field leakage, the distance between a pair of two point sources corresponding to a high frequency may be less than the distance between a pair of two point sources corresponding to a low frequency.

In some embodiments, the signal processing module may include an Equalizer (EQ) processing module and a Digital Signal Processor (DSP) processing module. The signal processing module may be used to implement signal equalization and other digital signal processing algorithms (such as amplitude modulation and phase modulation). The processed signal may be connected to a corresponding acoustic driver (for example, a narrow-band speaker unit) to output a sound. Preferably, a narrow-band speaker unit may be a dynamic coil speaker or a moving iron speaker. In some embodiments, the narrow-band speaker unit may be a balanced armature speaker. Two point sources may be constructed using two balanced armature speakers, and the sound output from the two speakers may be in opposite phases.

In some embodiments, an acoustic driver (such as acoustic drivers 840, 850, 1040 or 1050) may include multiple sets of full-band speakers. As shown in FIG. 11B, the acoustic device may include a plurality of sets of full-band speaker units and a signal processing module. On the left or right side of the user, the acoustic device may include n groups full-band speaker units, respectively. Each full-band speaker unit may have the same or similar frequency response curve, and may cover a wide frequency range.

Taking the speaker units located on the left side of the user as shown in FIG. 11B as an example: A1~An and B1~Bn form n groups of two point sources. The difference between FIGS. 11A and 11B may be that the signal processing module in FIG. 11B may include at least one set of filters for performing frequency division on the sound source signal to generate electric signals corresponding to different frequency ranges, and the electric signals corresponding to different frequency ranges may be input into each group of full-band speaker units. In this way, each group of speaker units (similar to the two point sources) may produce sounds with different frequency ranges separately.

Figure 12A:
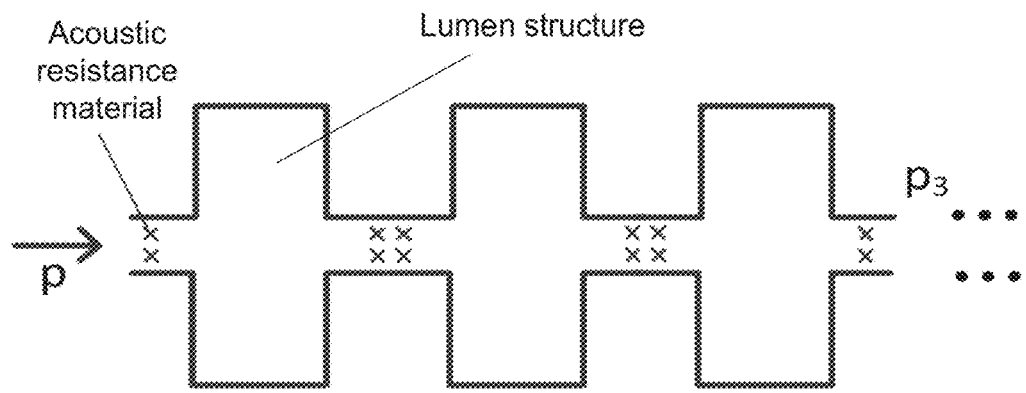
FIGS. 12A-12C are schematic diagrams illustrating acoustic routes according to some embodiments of the present disclosure.
Figure 12B:
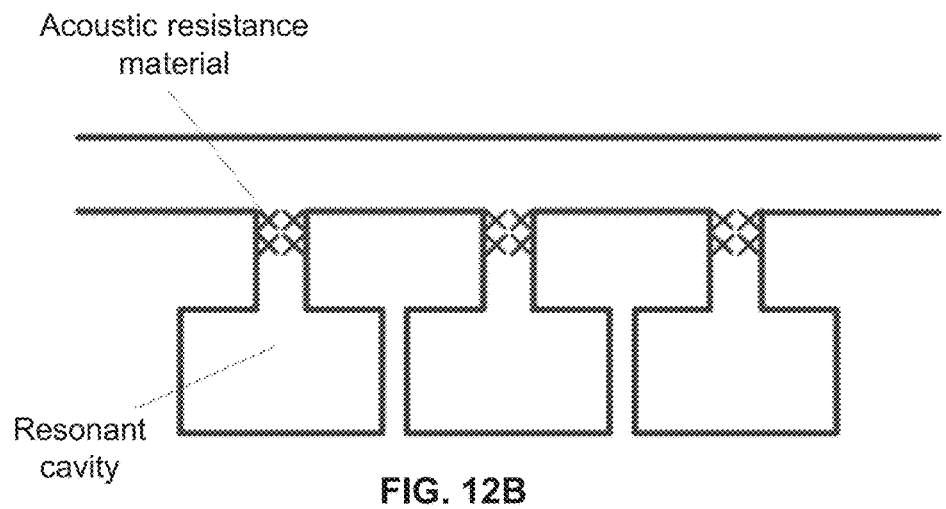
Figure 12C:
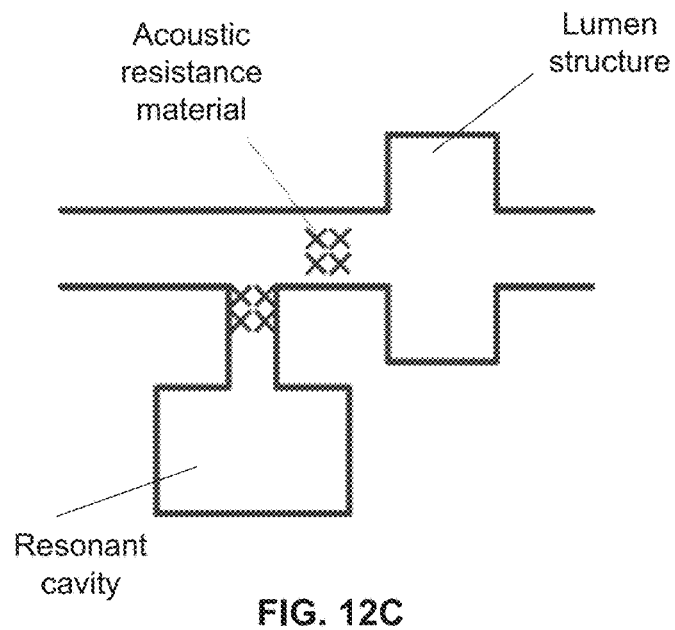

FIGS. 12A-12C are schematic diagrams illustrating an acoustic route according to some embodiments of the present disclosure. The acoustic route shown in FIGS. 12A-12C may be an example the acoustic route illustrated in FIGS. 1-4.

As described above, an acoustic filtering structure may be constructed by setting structures such as a sound tube, a sound cavity, and a sound resistance in an acoustic route to achieve frequency division of sound. FIGS. 12A-12C show schematic structural diagrams of frequency division of a sound signal using an acoustic route. It should be noted that FIGS. 12A-12C may be examples of setting the acoustic route when using the acoustic route to perform frequency division on the sound signal, and may not be a limitation on the present disclosure.

As shown in FIG. 12A, an acoustic route may include one or more groups of lumen structures connected in series, and an acoustic resistance material may be provided in the lumen structures to adjust the acoustic impedance of the entire structure to achieve a filtering effect. In some embodiments, a band-pass filtering or a low-pass filtering may be performed on the sound by adjusting the size of the lumen structures and/or the acoustic resistance material to achieve frequency division of the sound. As shown in FIG. 12B, a structure with one or more sets of resonant cavities (for example, Helmholtz cavity) may be constructed on a branch of the acoustic route, and the filtering effect may be achieved by adjusting the size of each resonant cavity and the acoustic resistance material. As shown in FIG. 12C, a combination of a lumen structure and a resonant cavity (for example, a Helmholtz cavity) may be constructed in an acoustic route, and a filtering effect may be achieved by adjusting the size of the lumen structure and/or a resonant cavity, and/or the acoustic resistance material.

Figure 13:
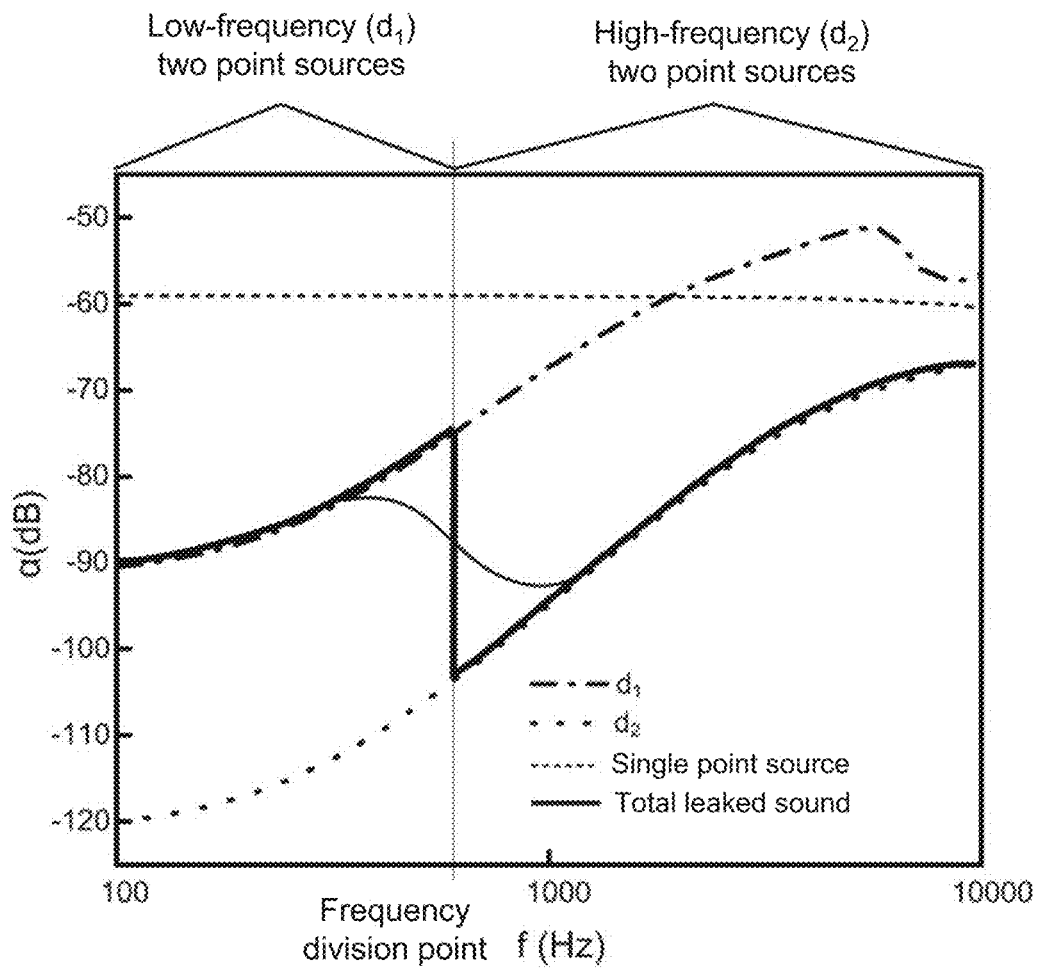
FIG. 13 is an exemplary graph illustrating a sound leakage under a combination of two sets of two point sources according to some embodiments of the present disclosure.

FIG. 13 shows a curve of a sound leakage of an acoustic device (for example, the acoustic device 800) under the action of two sets of two point sources (a set of high-frequency two point sources and a set of low-frequency two point sources). The frequency division points of the two sets of two point sources may be around 700 Hz.

A normalization parameter a may be used to evaluate the volume of the leaked sound (descriptions of a may be found in Equation (4)). As shown in FIG. 13, compared with a single point source, the two sets of two point sources may have a stronger ability to reduce sound leakage. In addition, compared with the acoustic device provided with only one set of two point sources, the two sets of two point sources may output high-frequency sounds and low-frequency sounds, separately. The distance between the low-frequency two point sources may be greater than that of the high-frequency two point sources. In the low-frequency range, by setting a larger distance (d1) between the low frequency two point sources, the increase in the volume of the near-field sound may be greater than the increase in the volume of the far-field leakage, which may achieve a higher volume of the near-field sound output in the low-frequency band. At the same time, in the low-frequency range, because that the sound leakage of the low frequency two point sources is very small, increasing the distance d1 may slightly increase the sound leakage. In the high-frequency range, by setting a small distance (d2) between the high frequency two point sources, the problem that the cutoff frequency of high-frequency sound leakage reduction is too low and the audio band of the sound leakage reduction is too narrow may be overcame. Therefore, by setting the distance d1 and/or the distance d2, the acoustic device provided in the embodiments of the present disclosure may obtain a stronger sound leakage suppressing capability than an acoustic device having a single point source or a single set of two point sources.

In some embodiments, affected by factors such as the filter characteristic of a circuit, the frequency characteristic of a transducer, and the frequency characteristic of an acoustic route, the actual low-frequency and high-frequency sounds of the acoustic device may differ from those shown in FIG. 13. In addition, low-frequency and high-frequency sounds may have a certain overlap (aliasing) in the frequency band near the frequency division point, causing the total sound leakage reduction of the acoustic device not have a mutation at the frequency division point as shown in FIG. 13. Instead, there may be a gradient and/or a transition in the frequency band near the frequency division point, as shown by a thin solid line in FIG. 13. It may be understood that these differences may not affect the overall leakage reduction effect of the acoustic device provided by the embodiments of the present disclosure.

According to FIGS. 8 to 13 and the related descriptions, the acoustic device provided by the present disclosure may be used to output sounds in different frequency bands by setting high-frequency two point sources and low-frequency two point sources, thereby achieving a better acoustic output effect. In addition, by setting different sets of two point sources with different distances, the acoustic device may have a stronger capability to reduce the sound leakage in a high frequency band, and meet the requirements of an open acoustic device.

In some alternative embodiments, an acoustic device may include at least one acoustic driver, and the sound generated by the at least one acoustic driver may propagate outwards through at least two sound guiding holes coupled with the at least one acoustic driver. In some embodiments, the acoustic device may be provided with a baffle structure, so that the at least two sound guiding holes may be distributed on two sides of the baffle. In some embodiments, the at least two sound guiding holes may be distributed on both sides of the user's auricle. More descriptions of two point sources and a baffle may be found in International applications No. PCT/CN2019/130921 and No. PCT/CN2019/130942, both filed on Dec. 31, 2019, the entire contents of each of which are hereby incorporated by reference in the present disclosure.

Figure 14:
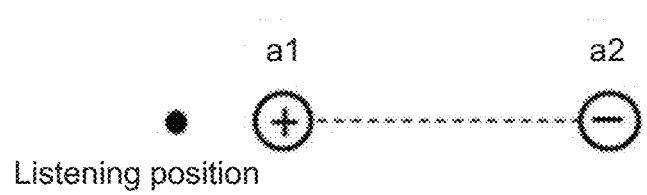
FIG. 14 is a schematic diagram illustrating two point sources and listening positions according to some embodiments of the present disclosure

FIG. 14 is a schematic diagram illustrating two point sources and a listening position according to some embodiments of the present disclosure. As shown in FIG. 14, a point source a1 and a point source a2 may be on a same side of the listening position. The point source a1 may be closer to the listening position, and the point source a1 and the point source a2 may output sounds with the same amplitude but opposite phases.

Figure 15:
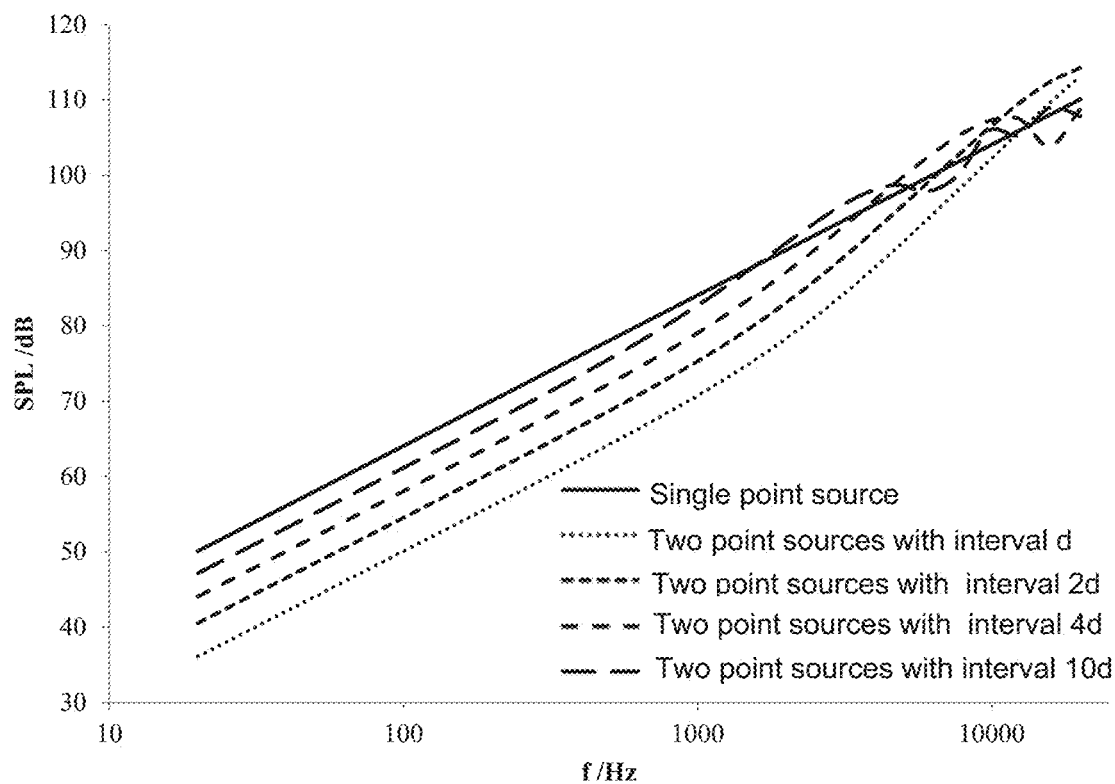
FIG. 15 is a graph illustrating a variation of a volume of the sound heard by the user of two point sources with different distances as a function of frequency according to some embodiments of the present disclosure.

FIG. 15 is a graph illustrating a variation of the volume of the sound heard by the user of two point sources with different distances as a function of a frequency of sound according to some embodiments of the present disclosure. The abscissa may represent the frequency (f) of the sound output by the two point sources (denoted as a1 and a2), and the unit may be hertz (Hz). The ordinate may represent the volume of the sound, and the unit may be decibel (dB). As shown in FIG. 15, as the distance between the point source a1 and the point source a2 gradually increases (for example, from d to 10d), the sound volume at the listening position may gradually increase. That is, as the distance between the point source a1 and the point source a2 increases, the difference in sound pressure amplitude (i.e., sound pressure difference) between the two sounds reaching the listening position may become larger, making the sound cancellation effect weaker, which may increase the sound volume at the listening position. However, due to the existence of sound cancellation, the sound volume at the listening position may still be less than the sound volume generated by a single point source at a same position in the low and middle frequency band (for example, a frequency of less than 1000 Hz). However, in the high-frequency band (for example, a frequency close to 10000 Hz), due to the decrease in the wavelength of the sound, mutual enhancement of the sound may appear, making the sound generated by the two point sources louder than that of the single point source. In some embodiments, a sound pressure may refer to the pressure generated by the sound through the vibration of the air.

Figure 16:
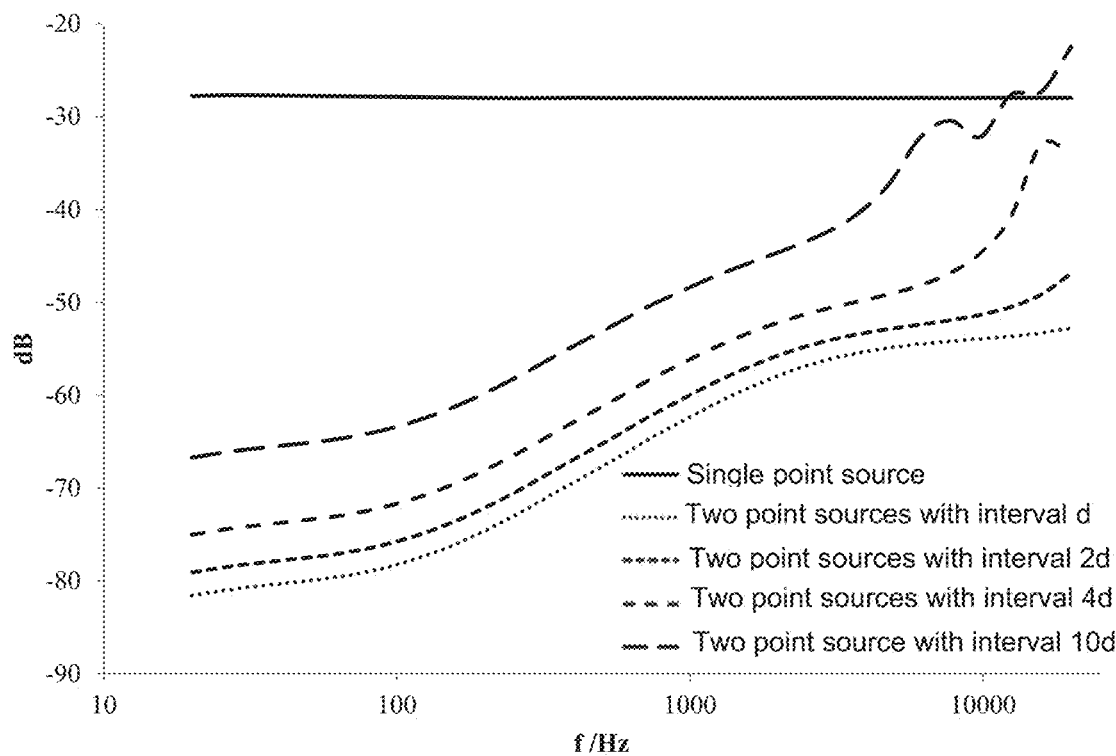
FIG. 16 is a graph illustrating a variation of a normalized parameter of two point sources in a far field along with frequency according to some embodiments of the present disclosure.

In some embodiments, by increasing the distance between the two point sources (for example, the point source a1 and the point source a2), the sound volume at the listening position may be increased. But as the distance increases, the sound cancellation of the two point sources may become weaker, which may lead to an increase of the far-field sound leakage. For illustration purposes, FIG. 16 is a graph illustrating a variation of a normalized parameter of different distances between two point sources in the far field along with a frequency of sound according to some embodiments of the present disclosure. The abscissa may represent the frequency (f) of the sound, the unit may be Hertz (Hz). The ordinate may use a normalization parameter a for evaluating the volume of the leaked sound, and the unit may be decibel (dB). As shown in FIG. 16, taking the normalization parameter a of a single point source as a reference, as the distance between the two point sources increases from d to 10d, the normalization parameter a may gradually increase, indicating that the sound leakage may gradually increase. More descriptions regarding the normalization parameter a may be found in equation (4) and related descriptions.

Figure 17:
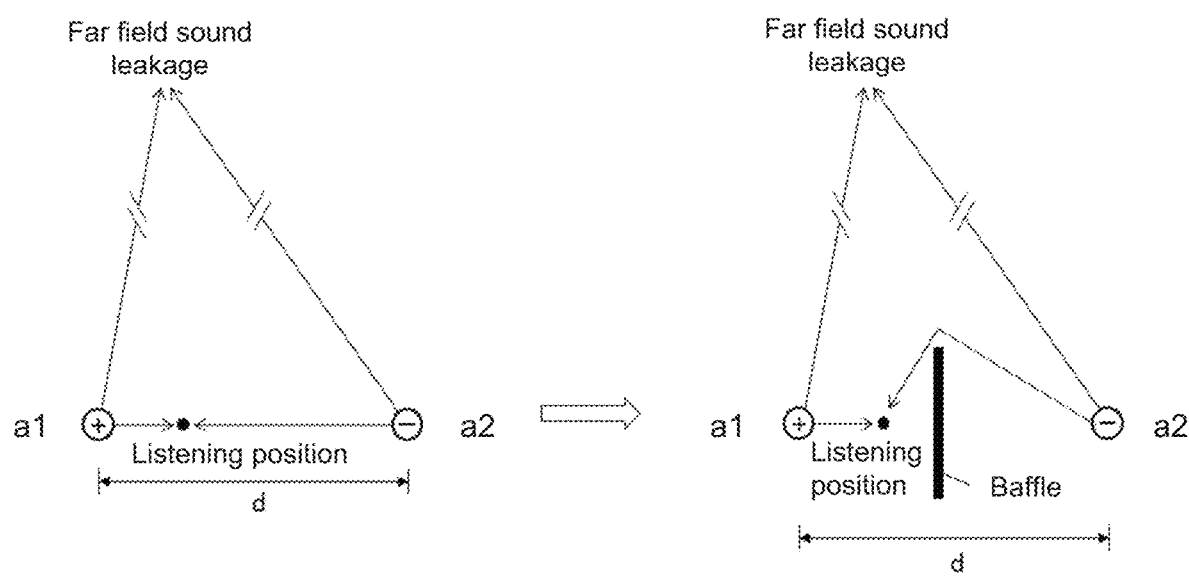
FIG. 17 is a distribution diagram illustrating an exemplary baffle provided between two point sources according to some embodiments of the present disclosure.

In some embodiments, adding a baffle structure to the acoustic device may be beneficial to improve the output effect of the acoustic device, that is, to increase the sound intensity at the near-field listening position, while reduce the volume of the far-field sound leakage. For illustration, FIG. 17 is a diagram illustrating an exemplary baffle provided between two point sources according to some embodiments of the present disclosure. As shown in FIG. 17, when a baffle is provided between the point source a1 and the point source a2, in the near field, the sound wave of the point source a2 may need to bypass the baffle to interfere with the sound wave of the point source a1 at the listening position, which may be equivalent to increasing the length of the acoustic route from the point source a2 to the listening position. Therefore, assuming that the point source a1 and the point source a2 have a same amplitude, compared to the case without a baffle, the difference in the amplitude of the sound waves of the point source a1 and the point source a2 at the listening position may increase, so that the degree of cancellation of the two sounds at the listening position may decrease, causing the sound volume at the listening position to increase. In the far field, because the sound waves generated by the point source a1 and the point source a2 do not need to bypass the baffle in a large space, the sound waves may interfere (similar to the case without a baffle). Compared to the case without a baffle, the sound leakage in the far field may not increase significantly. Therefore, a baffle structure being provided between the point source a1 and the point source a2 may increase the sound volume at the near-field listening position significantly while the volume of the far-field leakage does not increase significantly.

Figure 18:
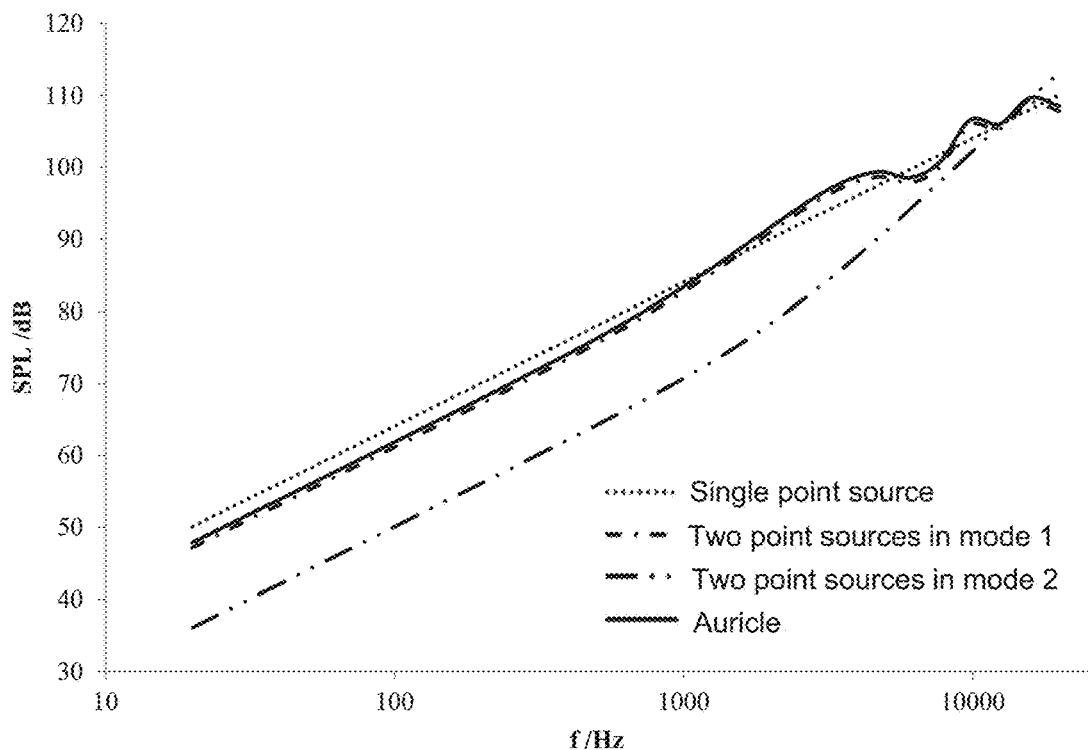
FIG. 18 is a graph illustrating a variation of a volume of sound heard by the user as a function of frequency when a baffle is located between two point sources according to some embodiments of the present disclosure.
Figure 19:
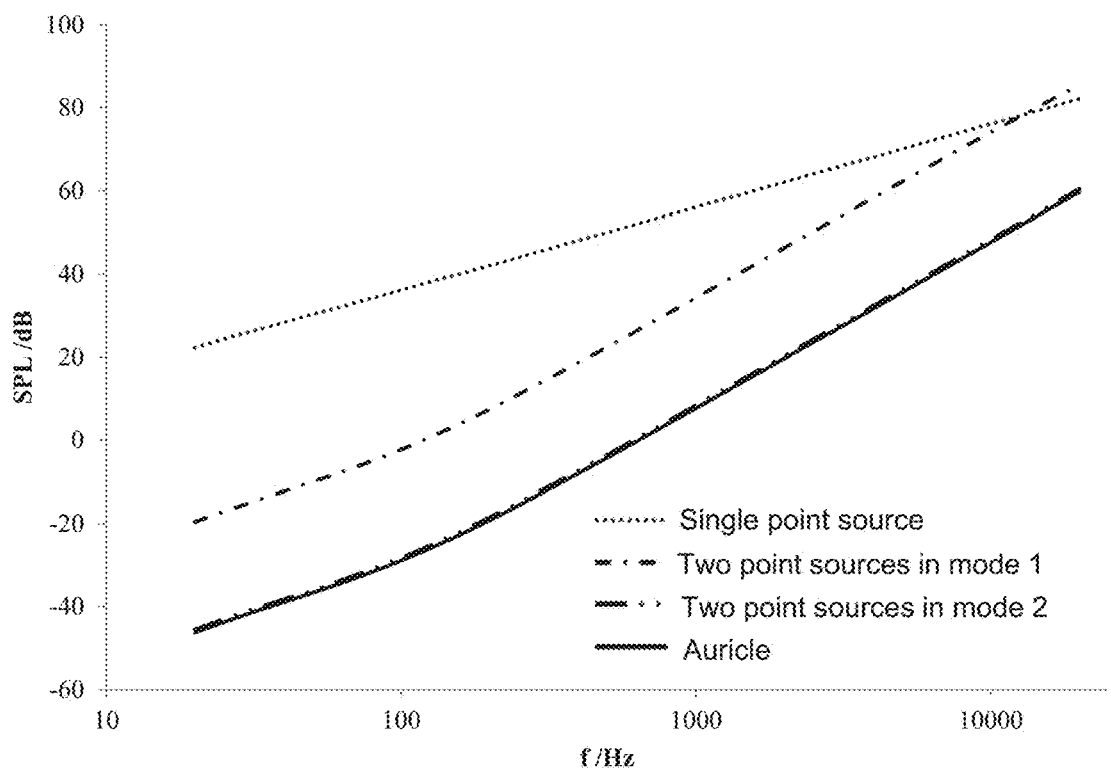
FIG. 19 is a graph illustrating a variation of a volume of leaked sound as a function of frequency when a baffle is located between two point sources according to some embodiments of the present disclosure.

FIG. 18 is a graph illustrating a variation of the volume of a sound heard by a user as a function of the frequency of sound when a baffle is located between two point sources according to some embodiments of the present disclosure. As shown in FIG. 18, when the frequency is low (for example, when the frequency is less than 1000 Hz), the volume at the near-field sound (that is, the sound heard by the user by the user's ear) may basically be the same as that of the near-field sound in mode 1, be greater than the volume of the near-field sound in mode 2, and be close to the volume of the near-field sound of a single point source. As the frequency increases (for example, when the frequency is between 2000 Hz and 7000 Hz), the volume of the near-field sound in mode 1 and the two point sources being distributed on both sides of the baffle may be greater than that of the one point source. It shows that when the baffle is located between the two point sources, the volume of the near-field sound transmitted from the sound source to the user's ear may be effectively enhanced. FIG. 19 is a graph illustrating a variation of the volume of a leaked sound as a function of the frequency of sound when the baffle is located between two point sources according to some embodiments of the present disclosure. As shown in FIG. 19, as the frequency increases, the volume of the far-field leakage may increase. When the two point sources are distributed on both sides of the baffle, the volume of the far-field leakage generated by the two point sources may be basically the same as the volume of the far-field leakage in mode 2, and both of which may be less than the volume of the far-field leakage in mode 1 and the volume of the far-field leakage of a single point source. It shows that when the baffle is located between the two point sources, the sound transmitted from the sound source to the far field may be effectively reduced, that is, the sound leakage from the sound source to the surrounding environment may be effectively reduced.

Figure 20:
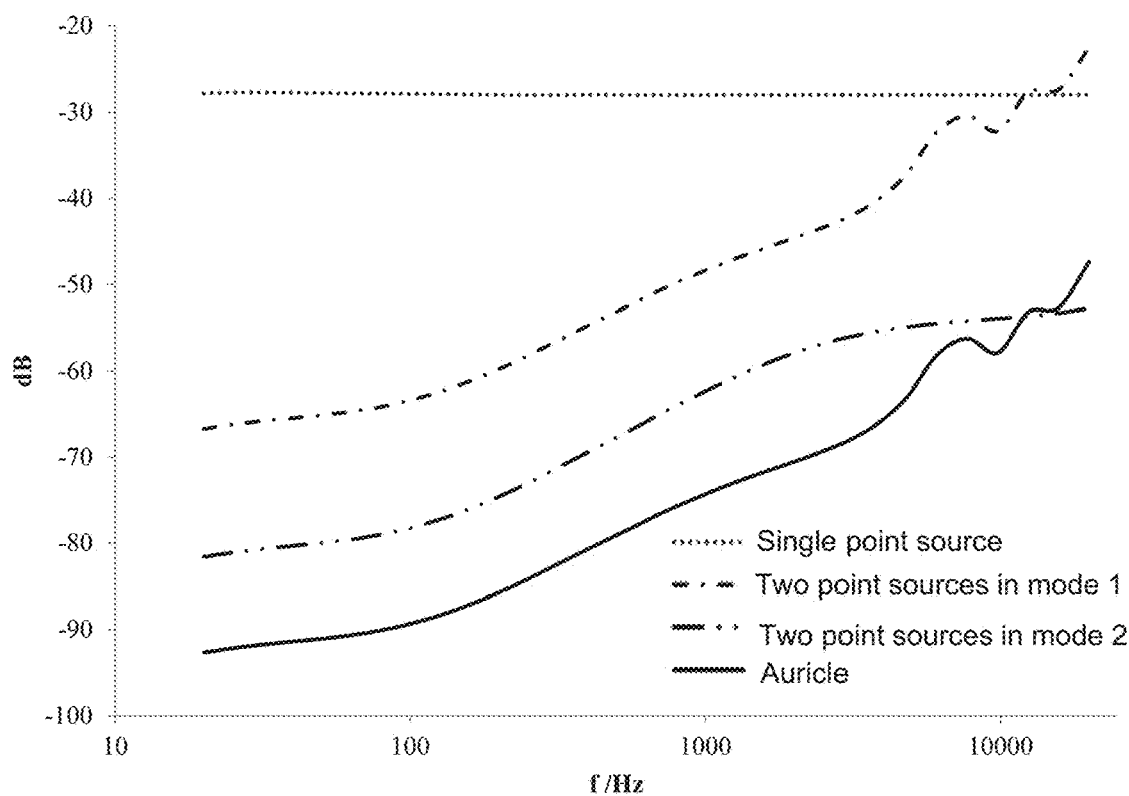
FIG. 20 is a graph illustrating a variation of a normalized parameter as a function of frequency when two point sources of an acoustic device is distributed on both sides of a baffle according to some embodiments of the present disclosure.

FIG. 20 is a graph illustrating a variation of a normalized parameter as a function of the frequency of sound when two point sources of an acoustic device is distributed on both sides of the baffle according to some embodiments of the present disclosure. As shown in FIG. 20, when the frequency is less than 10000 Hz, the normalized parameter of the two point sources being distributed on both sides of the baffle may be less than the normalized parameter in the case of mode 1 (no baffle structure between the two point sources, and the distance is D1), mode 2 (no baffle structure between the two point sources, and the distance is D2), and the single point source, which may show that when the two point sources are located on both sides of the baffle, the acoustic device may have a better capability to reduce the sound leakage.

In order to further explain the effect of the acoustic device with or without a baffle between the two point sources or two sound guiding holes, the volume of the near-field sound at the listening position and/or volume of the far-field leakage under different conditions may specifically be described below.

Figure 21:
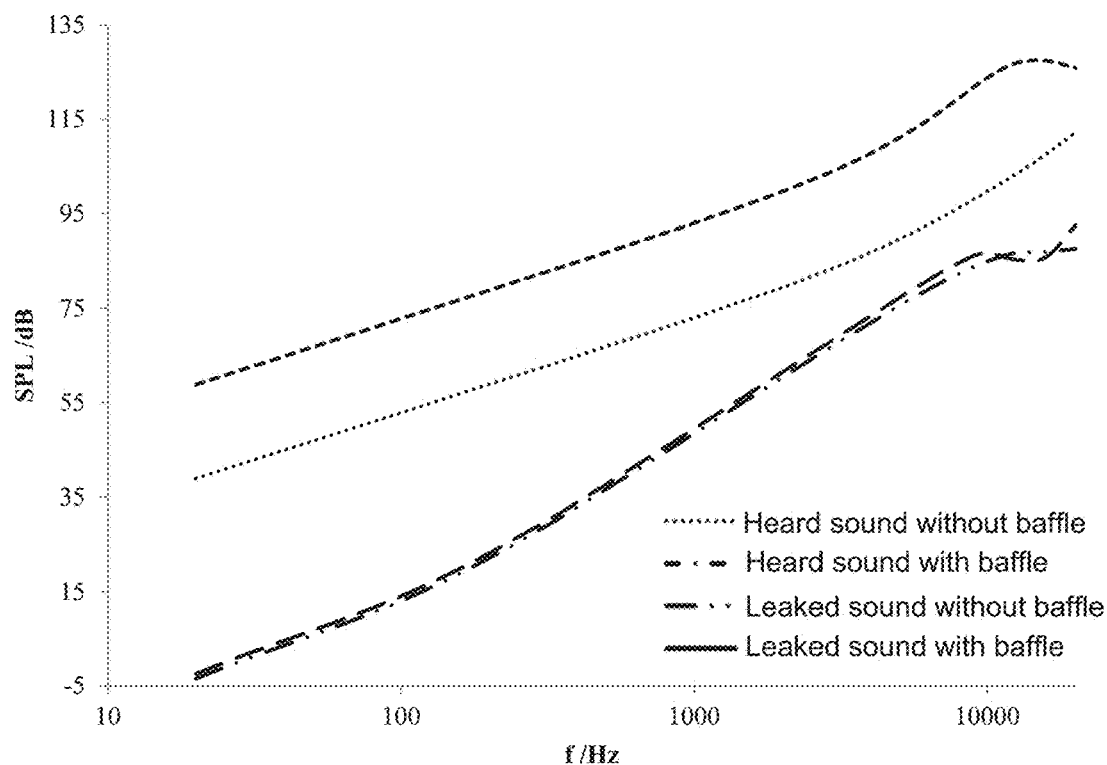
FIG. 21 is a graph illustrating a variation of a volume of sound heard by the user and a volume of leaked sound as a function of frequency with and without a baffle between two point sources according to some embodiments of the present disclosure.

FIG. 21 is a graph illustrating a variation of the volume of a sound heard by the user and volume of a leaked sound as a function of the frequency of sound with and without a baffle between two point sources according to some embodiments of the present disclosure. As shown in FIG. 21, after adding a baffle between the two point sources (i.e., two sound guiding holes) of the acoustic device, in the near field, it may be equivalent to increasing the distance between the two point sources, and the sound volume at the near-field listening position may be equivalent to being generated by a set of two point sources with a large distance. The volume of the near-field sound may be significantly increased compared to the case without a baffle. In the far field, because the interference of the sound waves generated by the two point sources may be rarely affected by the baffle, the sound leakage may be equivalent to being generated by two point sources with a small distance, therefore the sound leakage may not change significantly with or without the baffle. It may be seen that by setting a baffle between two sound guiding holes (i.e., two point sources), the ability of the sound output apparatus to reduce the sound leakage may be effectively improved, and the volume of the near-field sound of the acoustic device may be increased significantly. Therefore, the requirements for sound production components of the acoustic device may be reduced. At the same time, the simple circuit structure may reduce the electrical loss of the acoustic device, so that the working time of the acoustic device may be greatly prolonged under a certain amount of electricity.

Figure 22:
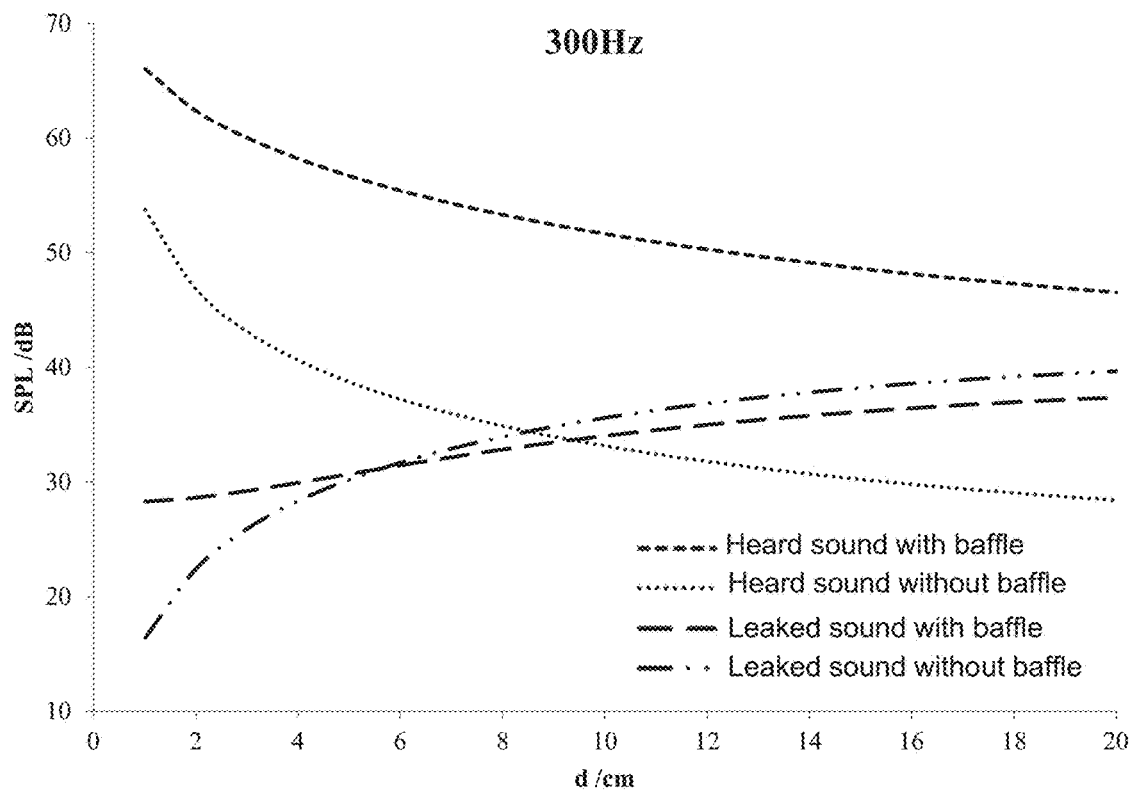
FIG. 22 is a graph illustrating a variation of a volume of sound heard by the user and a volume of leaked sound as a function of distance between two point sources at a frequency of 300 Hz and with or without a baffle according to some embodiments of the present disclosure.
Figure 23:
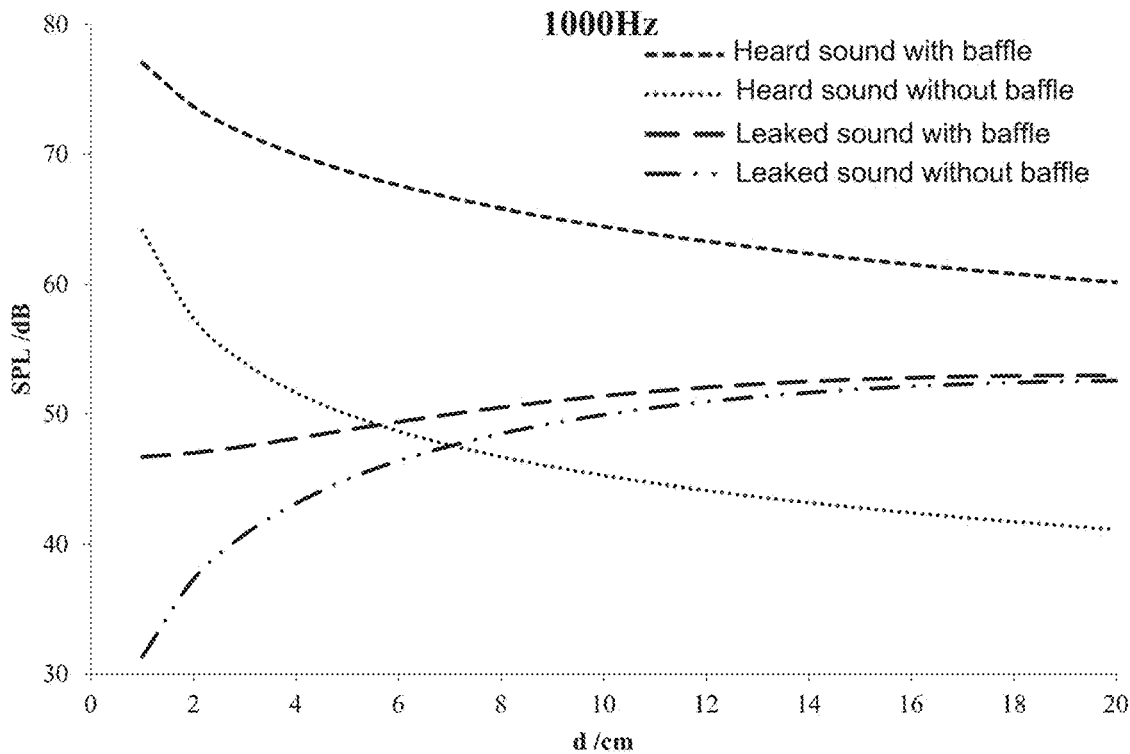
FIG. 23 is a graph illustrating a variation of a volume of sound heard by the user and a volume of leaked sound as a function of distance between two point sources at a frequency of 1000 Hz and with or without a baffle according to some embodiments of the present disclosure.
Figure 24:
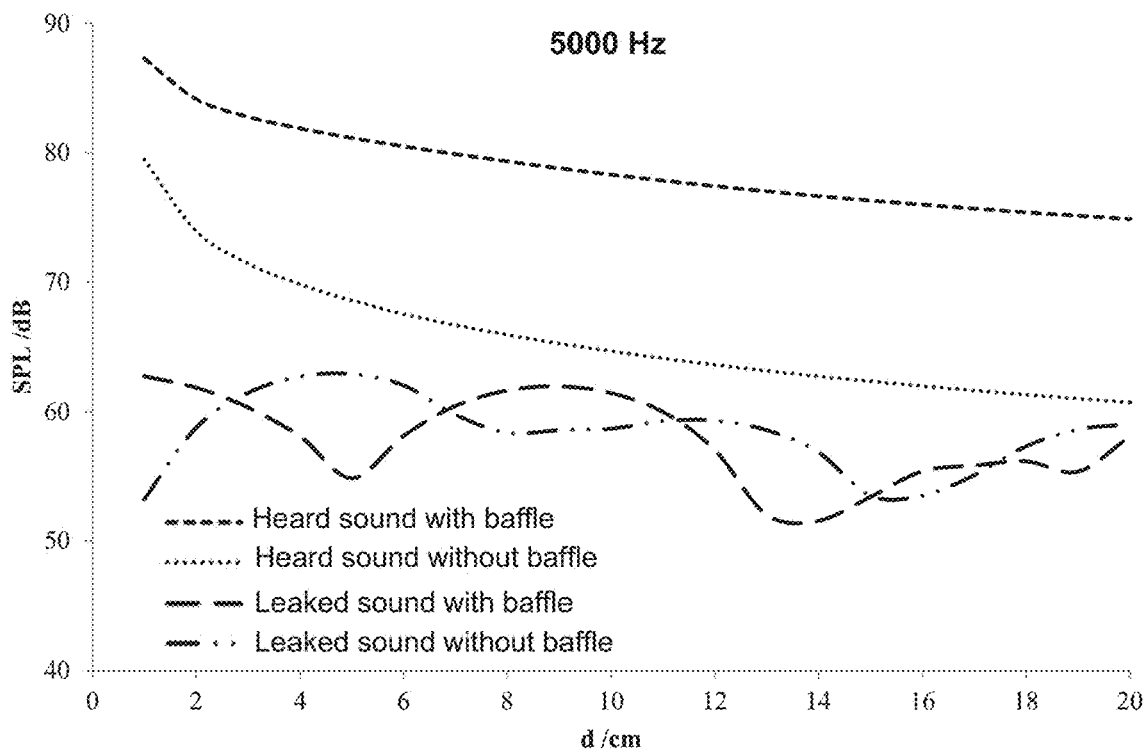
FIG. 24 is a graph illustrating a variation of a volume of sound heard by the user and a volume of leaked sound as a function of distance at a frequency of 5000 Hz and with or without a baffle between the two point sources according to some embodiments of the present disclosure.

FIG. 22 is a graph illustrating a variation of the volume of a sound heard by the user and the volume of a leaked sound as a function of the distance between two point sources when the frequency of the two point sources is 300 Hz according to some embodiments of the present disclosure. FIG. 23 is a graph illustrating a variation of the volume of a sound heard by the user and the volume of a leaked sound as a function of the distance between two point sources when the frequency of the two point sources is 1000 Hz according to some embodiments of the present disclosure. As shown in FIGS. 23 and 24, in the near field, when the frequency is 300 Hz or 1000 Hz, as the increase of the distance d of the two point sources, the volume of the sound heard by the user with a baffle between the two point sources may be greater than that without a baffle between the two point sources, which shows that at this frequency, the baffle structure between the two point sources may effectively increase the volume of the sound heard by the user in the near field. In the far field, the volume of the leaked sound with a baffle between the two point sources may be equivalent to that without a baffle between the two point sources, which shows that at this frequency, with or without a baffle structure arranged between the two point sources has little effect on the far-field sound leakage.

FIG. 24 is a graph illustrating a variation of the volume of a sound heard by the user and the volume of a leaked sound as a function of the distance when the frequency of the two point sources is 5000 Hz according to some embodiments of the present disclosure. As shown in FIG. 24, in the near field, when the frequency is 5000 Hz, as the distance d of the two point sources increases, the volume of the sound heard by the user when there is a baffle between the two point sources may be greater than that when there is no baffle. In the far-field, the volume of the leaked sound of the two point sources with and without baffle may be fluctuant as a function of the distance d. Overall, whether the baffle structure is arranged between the two point sources has little effect on the far-field leakage.

Figure 25:
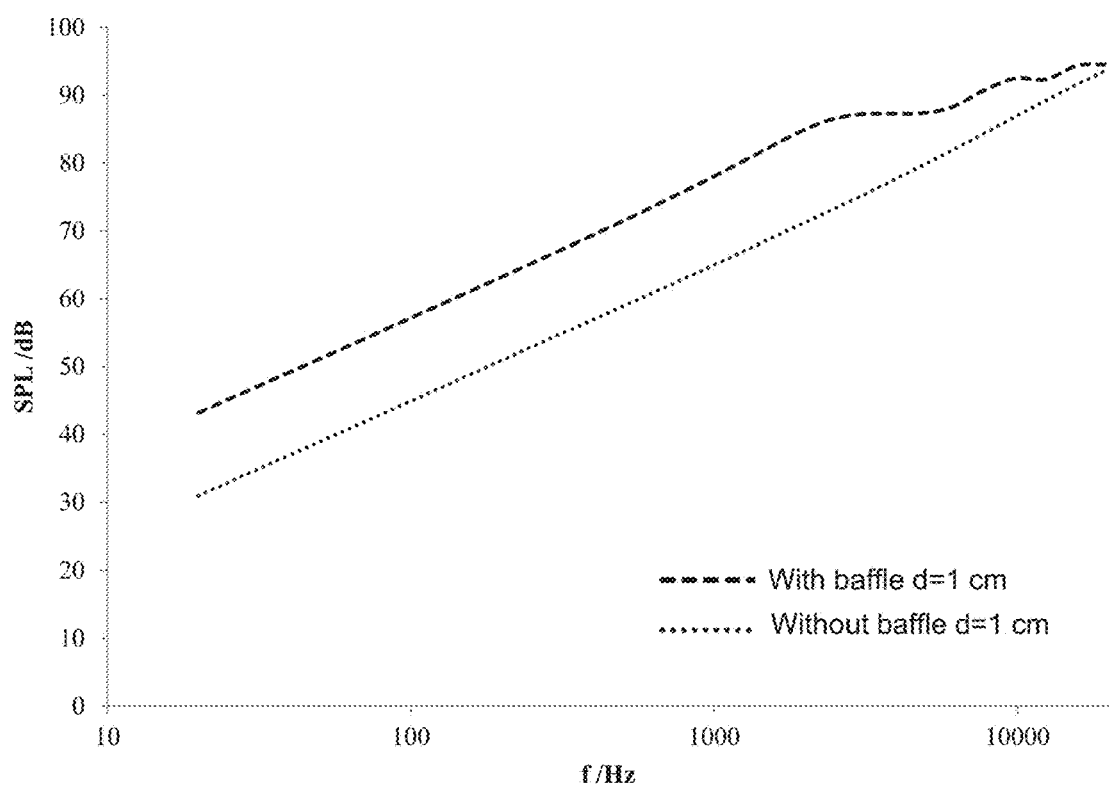
FIGS. 25-27 are graphs illustrating a variation of a volume of sound heard by the user as a function of frequency when a distance d of two point sources is 1 cm, 2 cm, 3 cm, respectively, according to some embodiments of the present disclosure.
Figure 26:
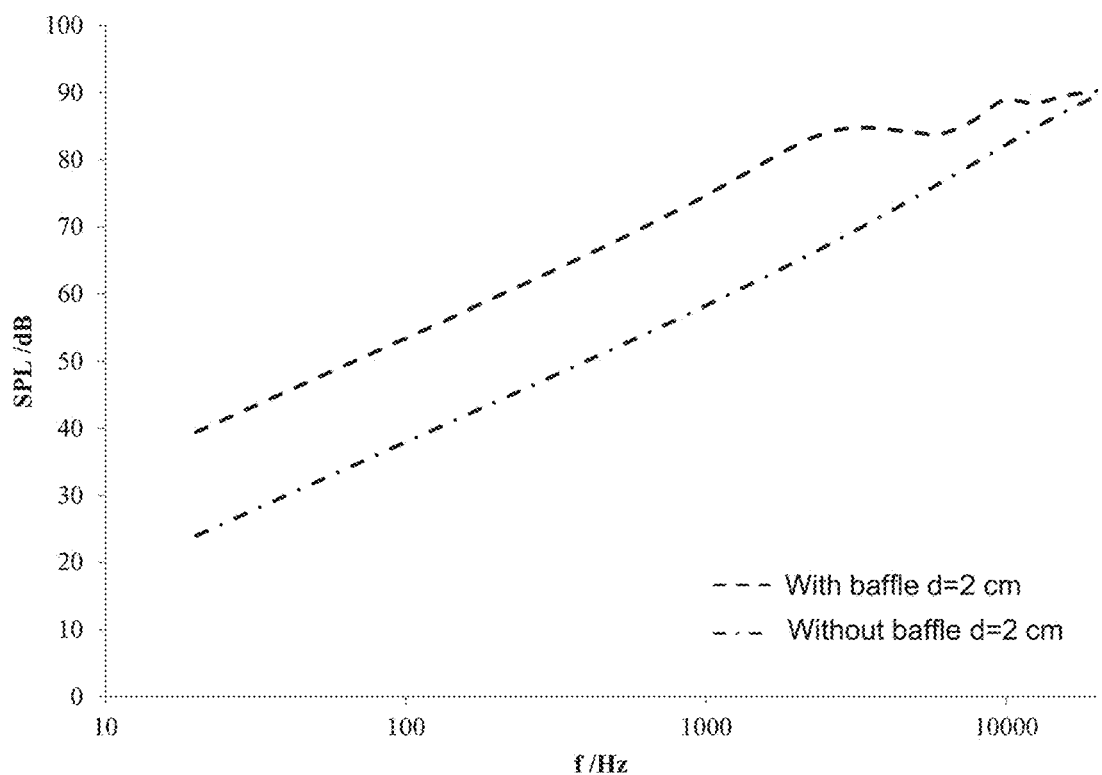
Figure 27:
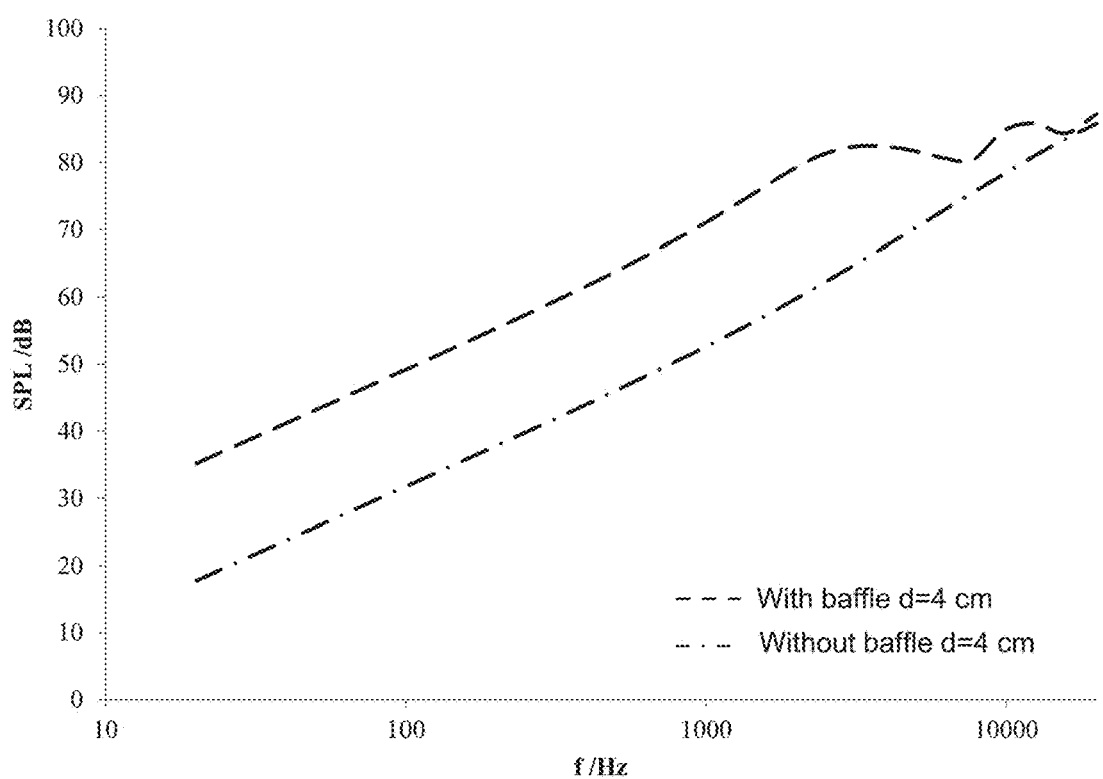
Figure 28:
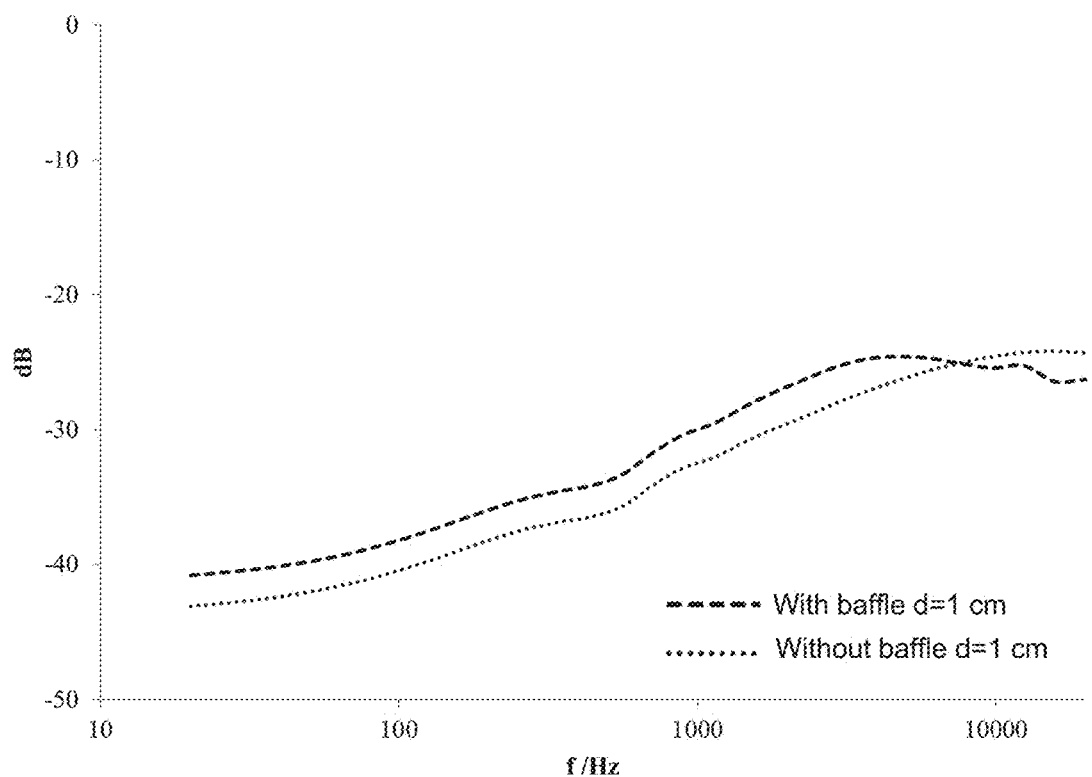
FIG. 28 is a graph illustrating a variation of a normalized parameter as a function of frequency when a distance d of two point sources is 1 cm according to some embodiments of the present disclosure.
Figure 29:
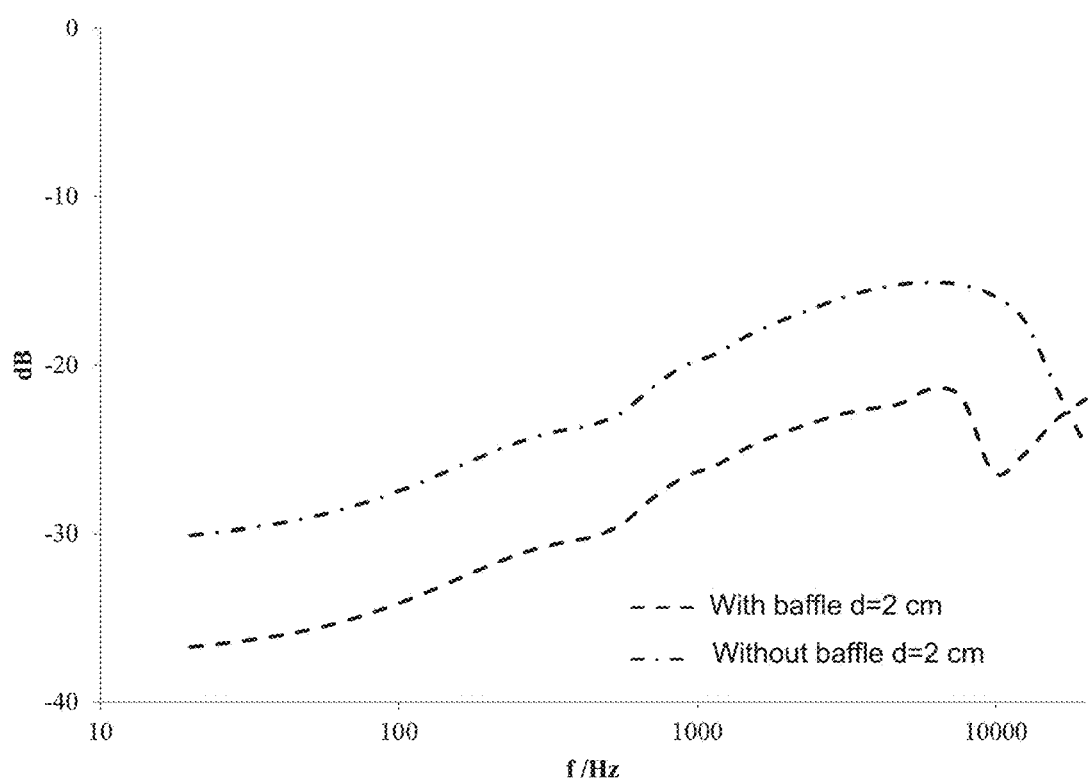
FIG. 29 is a graph illustrating a variation of a normalized parameter as a function of frequency when a distance d of two point sources is 2 cm according to some embodiments of the present disclosure.
Figure 30:
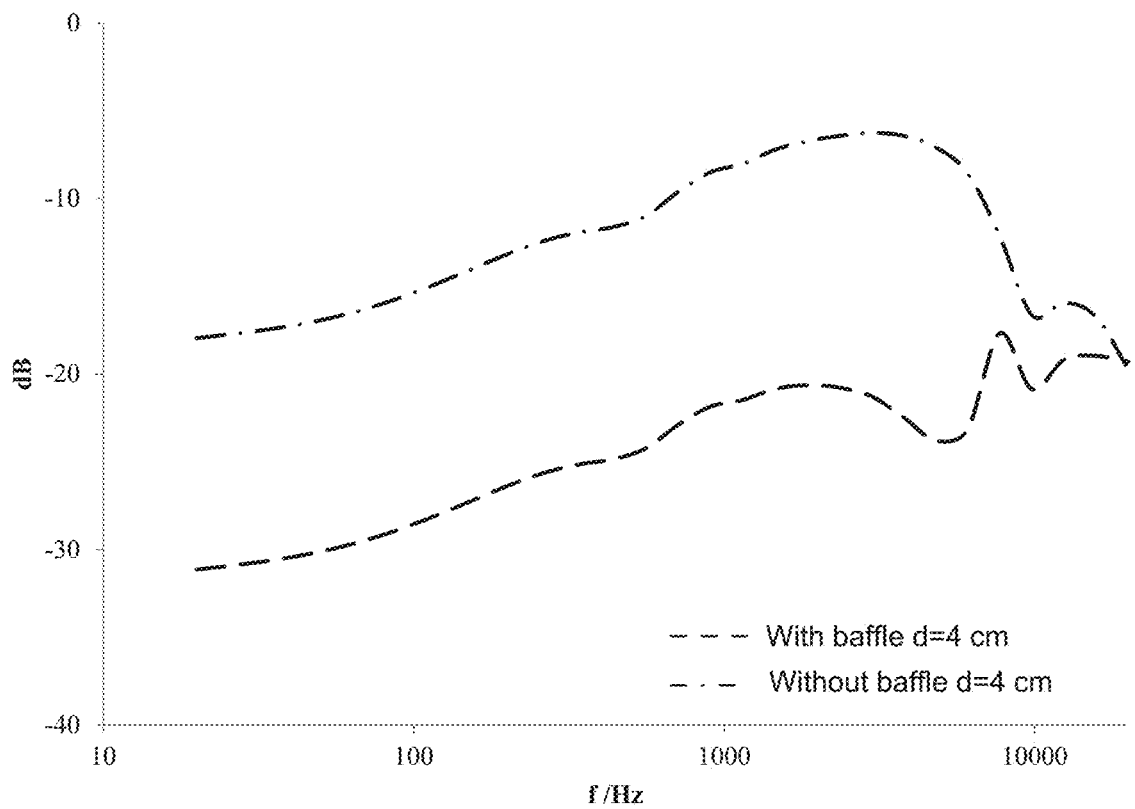
FIG. 30 is a graph illustrating a variation of a normalized parameter as a function of frequency when a distance d of two point sources is 4 cm according to some embodiments of the present disclosure.

FIGS. 25-27 are graphs illustrating a variation of the volume of a sound heard by the user as a function of the frequency of sound when the distance d of two point sources is 1 cm, 2 cm, 3 cm, respectively, according to some embodiments of the present disclosure. FIG. 28 is a graph illustrating a variation of a normalized parameter of a far field as a function of the frequency of sound when the distance d of two point sources is 1 cm according to some embodiments of the present disclosure. FIG. 29 is a graph illustrating a variation of a normalized parameter of a far field as a function of the frequency of sound when the distance d of two point sources is 2 cm according to some embodiments of the present disclosure. FIG. 30 is a graph illustrating a variation of a normalized parameter of a far field as a function of the frequency of sound when the distance d of two point sources is 4 cm according to some embodiments of the present disclosure. As shown in FIGS. 25 through 27, for the different distances d of the sound guiding holes (for example, 1 cm, 2 cm, 4 cm), at a certain frequency, in the near-field listening position (for example, the user's ear), the sound volume of two sound guiding holes located on both sides of the baffle (i.e., the "baffle effect" situation shown in the figure) may be greater than the sound volume of two sound guiding holes located on a same side of the baffle (i.e., the case of "without baffle" as shown in the figures). The certain frequency may be below 10000 Hz, below 5000 Hz, or below 1000 Hz.

As shown in FIGS. 28 to 30, for the different distances d of the sound guiding holes (for example, 1 cm, 2 cm, and 4 cm), at a certain frequency, in the far-field position (for example, the environment position away from the user's ear), the volume of the leaked sound generated when the two sound guiding holes are provided on both sides of the baffle may be smaller than that generated when the two sound guiding holes are not provided on both sides of the baffle. It should be noted that as the distance between two sound guiding holes or two point sources increases, the interference cancellation of sound at the far-field position may weaken, leading to a gradual increase in the far-field leakage and a weaker ability to reduce sound leakage. Therefore, the distance d between two sound guiding holes or the two point sources may not be too large. In some embodiments, in order to keep the output sound as loud as possible in the near field, and suppress the sound leakage in the far field, the distance d between the two sound guiding holes may be set to be no more than, for example, 20 cm, 12 cm, 10 cm, 6 cm, or the like. In some embodiments, considering the size of the acoustic device and the structural requirements of the sound guiding holes, the distance d between the two sound guiding holes may be set to be in a range of, for example, 1 cm to 12 cm, 1 cm to 10 cm, 1 cm to 8 cm, 1 cm to 6 cm, 1 cm to 3 cm, or the like.

It should be noted that the above description is merely for the convenience of description, and not intended to limit the scope of the present disclosure. It may be understood that, for those skilled in the art, after understanding the principle of the present disclosure, various modifications and changes in the forms and details of the acoustic device may be made without departing from this principle. For example, in some embodiments, a plurality of sound guiding holes may be set on both sides of the baffle. The number of the sound guiding holes on both sides of the baffle may be the same or different. For example, the number of sound guiding holes on one side of the baffle may be two, and the number of sound guiding holes on the other side may be two or three. These modifications and changes may still be within the protection scope of the present disclosure.

Figure 31:
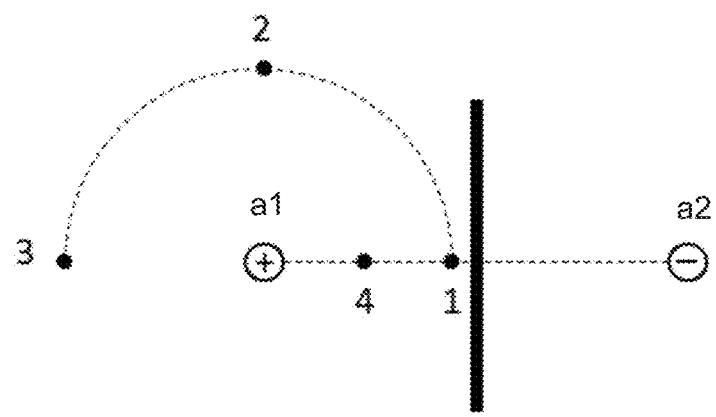
FIG. 31 is a graph illustrating exemplary distributions of different listening positions according to some embodiments of the present disclosure.

In some embodiments, on the premise of maintaining the distance between the two point sources, a relative position of the listening position to the two point sources may have a certain effect on the volume of the near-field sound and the far-field leakage reduction. In order to improve the acoustic output effect of the acoustic device, in some embodiments, the acoustic device may be provided with at least two sound guiding holes. The at least two sound guiding holes may include two sound guiding holes located on the front and back sides of the baffle, respectively. In some embodiments, considering that the sound propagated from the sound guiding hole located on the rear side of the baffle needs to bypass over the baffle to reach the user's ear canal, the acoustic route between the sound guiding hole located on the front side of the baffle (i.e., the acoustic distance from the sound guiding hole to the user's ear canal entrance) is shorter than the acoustic route between the sound guiding hole located on the rear side of the baffle. In order to further explain the effect of the listening position on the acoustic output effect, four representative listening positions (listening position 1, listening position 2, listening position 3, listening position 4) may be selected as shown in FIG. 31. The listening position 1, the listening position 2, and the listening position 3 may have equal distance from the point source a1, which may be r1. The distance between the listening position 4 and the point source a1 may be r2, and r2<r1. The point source a1 and the point source a2 may generate sounds with opposite phases, respectively.

Figure 32:
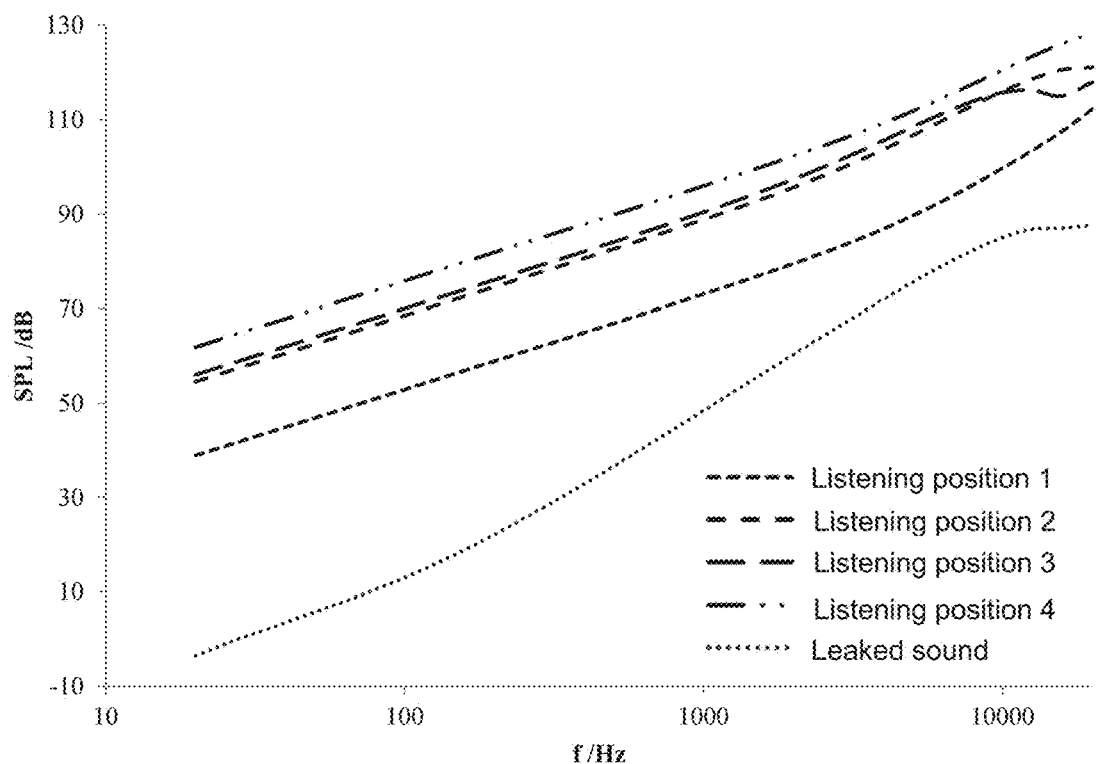
FIG. 32 is a graph illustrating a volume of sound heard by the user from two point sources without baffle at different listening positions in a near field as a function of frequency according to some embodiments of the present disclosure.
Figure 33:
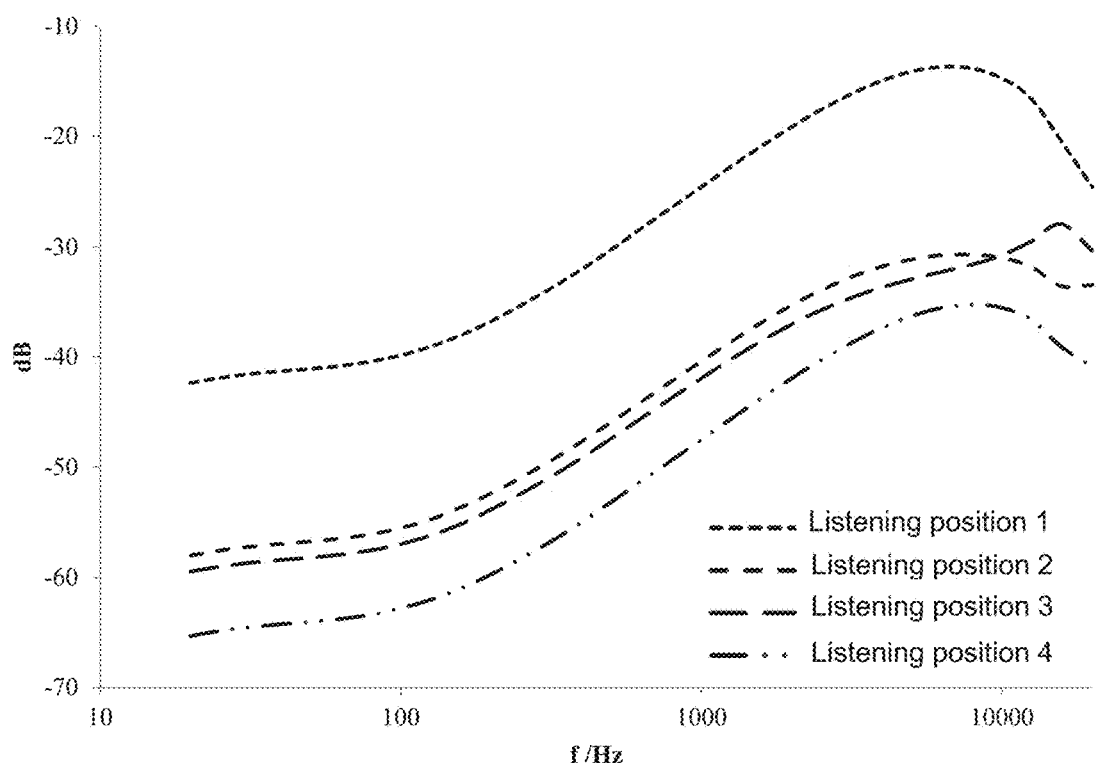
FIG. 33 is a graph illustrating a normalized parameter of two point sources without baffle at different listening positions in a near field according to some embodiments of the present disclosure.

FIG. 32 is a graph illustrating the volume of a sound heard by a user of two point sources without baffle at different listening positions as a function of the frequency of sound according to some embodiments of the present disclosure. FIG. 33 is a graph illustrating a normalized parameter of different listening positions as a function of the frequency of sound. The normalized parameter may be obtained with reference to Equation (4). As shown in FIGS. 32 and 33, for the listening position 1, since the difference between the acoustic routes from the point source a1 and the point source a2 to the listening position 1 is small, the difference in amplitude of the sounds produced by the two point sources at the listening position 1 may be small. Therefore, an interference of the sounds of the two point sources at the listening position 1 may cause the volume of the sound heard by the user to be smaller than that of other listening positions. For the listening position 2, compared with the listening position 1, the distance between the listening position 2 and the point source a1 may remain unchanged, that is, the acoustic route from the point source a1 to the listening position 2 may not change. However, the distance between the listening position 2 and the point source a2 may be longer, and the length of the acoustic route between the point source a2 and the listening position 2 may increase. The amplitude difference between the sound generated by the point source a1 and the sound generated by the point source a2 at the listening position 2 may increase. Therefore, the volume of the sound transmitted from the two point sources after interference at the listening position 2 may be greater than that at the listening position 1. Among all positions on an arc with a radius of r1, a difference between the acoustic route from the point source a1 to the listening position 3 and the acoustic route from the point source a2 to the listening position 3 may be the longest. Therefore, compared with the listening position 1 and the listening position 2, the listening position 3 may have the highest volume of the sound heard by the user. For the listening position 4, the distance between the listening position 4 and the point source a1 may be short. The sound amplitude of the point source a1 at the listening position 4 may be large. Therefore, the volume of the sound heard by the user at the listening position 4 may be large. In summary, the volume of the sound heard by the user at the near-field listening position may change as the listening position and the relative position of the two point sources change. When the listening position is on the line between the two point sources and on the same side of the two point sources (for example, listening position 3), the acoustic route difference between the two point sources at the listening position may be the largest (the acoustic route difference may be the distance d between the two point sources). In this case, the volume of the sound heard by the user at this listening position may be greater than that at other locations. According to Equation (4), when the far-field leakage is constant, the normalization parameter corresponding to this listening position may be the smallest, and the leakage reduction capability may be the strongest. At the same time, reducing the distance r1 between the listening position (for example, listening position 4) and the point source a1 may further increase the volume at the listening position, at the same time reduce the sound leakage, and improve the capability to reduce leakage.

Figure 34:
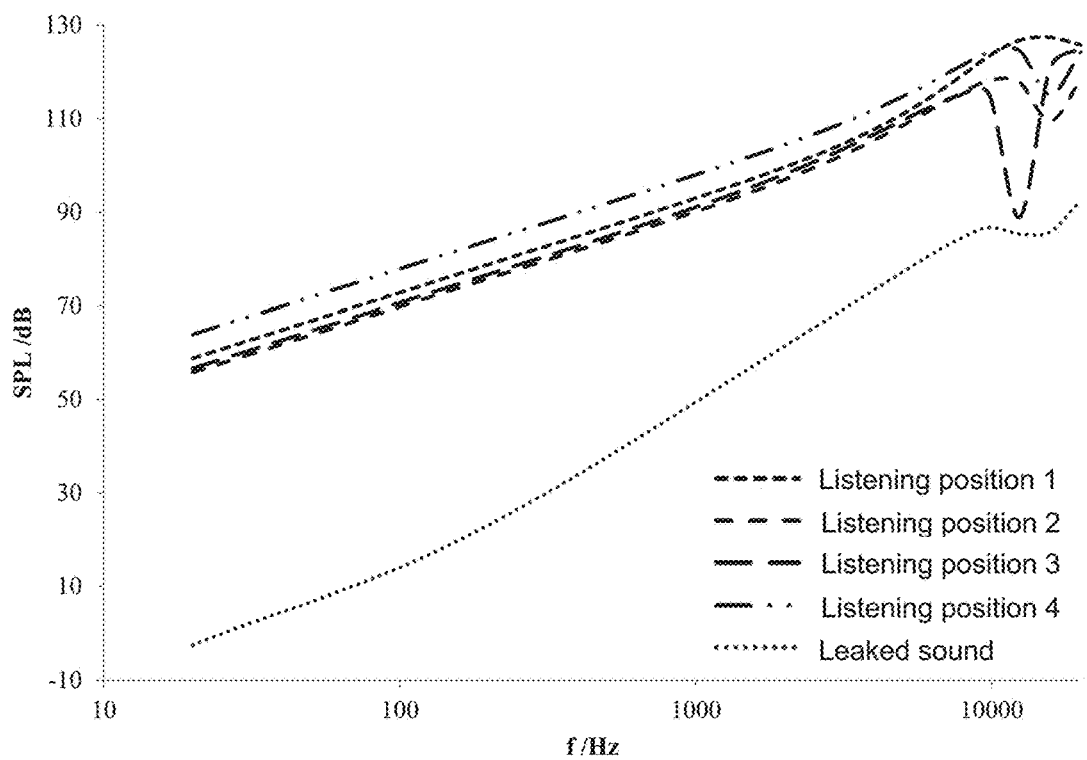
FIG. 34 is a graph illustrating a volume of sound heard by the user from two point sources with a baffle at different listening positions in a near field as a function of frequency according to some embodiments of the present disclosure.
Figure 35:
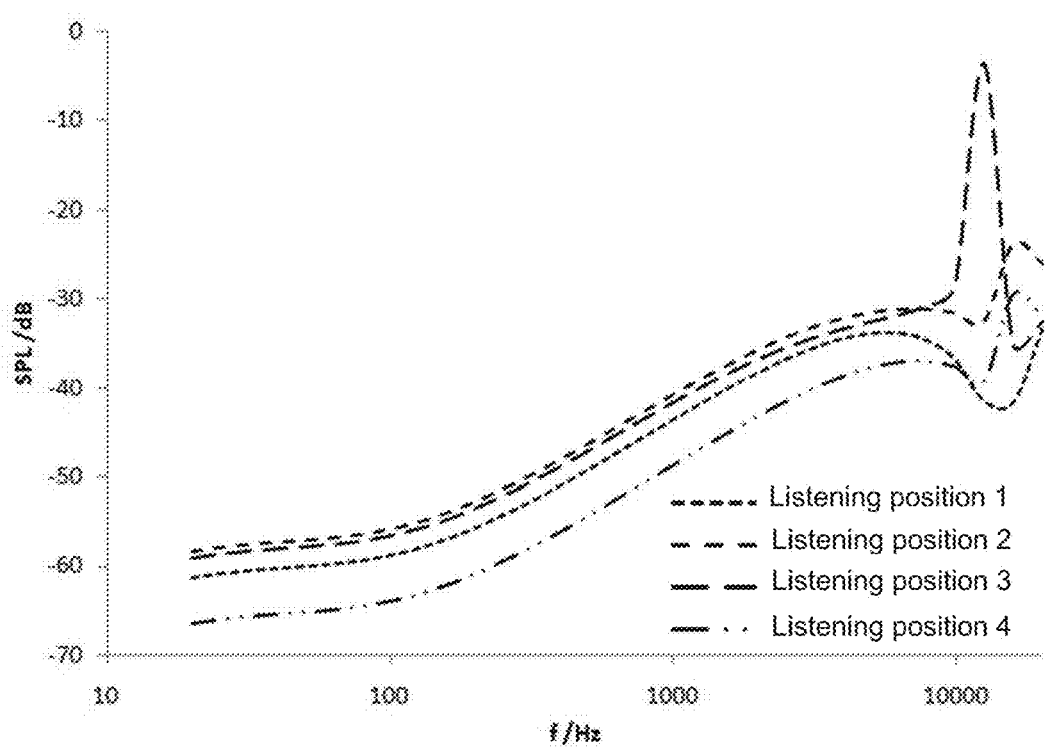
FIG. 35 is a graph illustrating a normalized parameter of two point sources with a baffle at different listening positions in a near field according to some embodiments of the present disclosure.

FIG. 34 is a graph illustrating the volume of the sound heard by the user of two point sources with baffle (as shown in FIG. 31) at different listening positions in the near field as a function of frequency according to some embodiments of the present disclosure. FIG. 35 is a graph of the normalization parameters of different listening positions obtained with reference to Equation (4) based on FIG. 34, as a function of frequency. As shown in FIGS. 34 and 35, compared to the case without a baffle, the volume of the sound heard by the user generated by the two point sources at listening position 1 may increase significantly when there is a baffle. The volume of the sound heard by the user at the listening position 1 may exceed that at the listening position 2 and the listening position 3. The reason may be that the acoustic route from the point source a2 to the listening position 1 may increase after a baffle is set between the two point sources. As a result, the acoustic route difference between the two point sources at the listening position 1 may increase significantly. The amplitude difference between the sounds generated by the two point sources at the listening position 1 may increase, making it difficult to produce sound interference cancellation, thereby increasing the volume of the sound heard by the user generated at the listening position 1 significantly. At the listening position 4, since the distance between the listening position and the point source a1 is further reduced, the sound amplitude of the point source a1 at this position may be larger. The volume of the sound heard by the user at the listening position 4 may still be the largest among the four listening positions. For listening position 2 and listening position 3, since the effect of the baffle on the acoustic route from the point source a2 to the two listening positions is not very obvious, the volume increase effect at the listening position 2 and the listening position 3 may be less than that at the listening position 1 and the listening position 4 which are closer to the baffle.

The volume of the leaked sound in the far field may not change with listening positions, and the volume of the sound heard by the user at the listening position in the near field may change with listening positions. In this case, according to Equation (4), the normalization parameter of the acoustic device may vary in different listening positions. Specifically, a listening position with a large volume of sound heard by the user (e.g., listening position 1 and listening position 4) may have a small normalization parameter and strong capability to reduce sound leakage. A listening position with a low volume of sound heard by the user (e.g., listening position 2 and listening position 3) may have a large normalization parameter and weak capability to reduce leakage.

In this case, the two sound guiding holes on the acoustic device may be arranged on the front side and the back side of the baffle, respectively. In some embodiments, by designing the positions of the two sound guiding holes on the acoustic device, the distance between the sound guiding hole on the front side of the baffle may be smaller than the distance between the sound guiding hole on the back side of the baffle. In this case, the acoustic device may produce a large sound amplitude at the ear canal since the sound guiding hole on the front side of the baffle is close to the ear canal. The sound amplitude formed by the sound guiding hole on the back of the baffle may be smaller at the ear canal, which may avoid the interference cancellation of the sound at the two sound guiding holes at the ear canal, thereby ensuring that the volume of the sound heard by the user at the ear canal is large. In some embodiments, a part of the housing of the acoustic device may be considered as the "baffle". For example, a sound guiding hole on the housing that faces toward the ear canal (or the head) of the user may be considered as the front side of the baffle, and another sound guiding hole on the housing that backs on the ear canal (or the head), i.e., facing toward the direction opposite to that of the ear canal).

Figure 36:
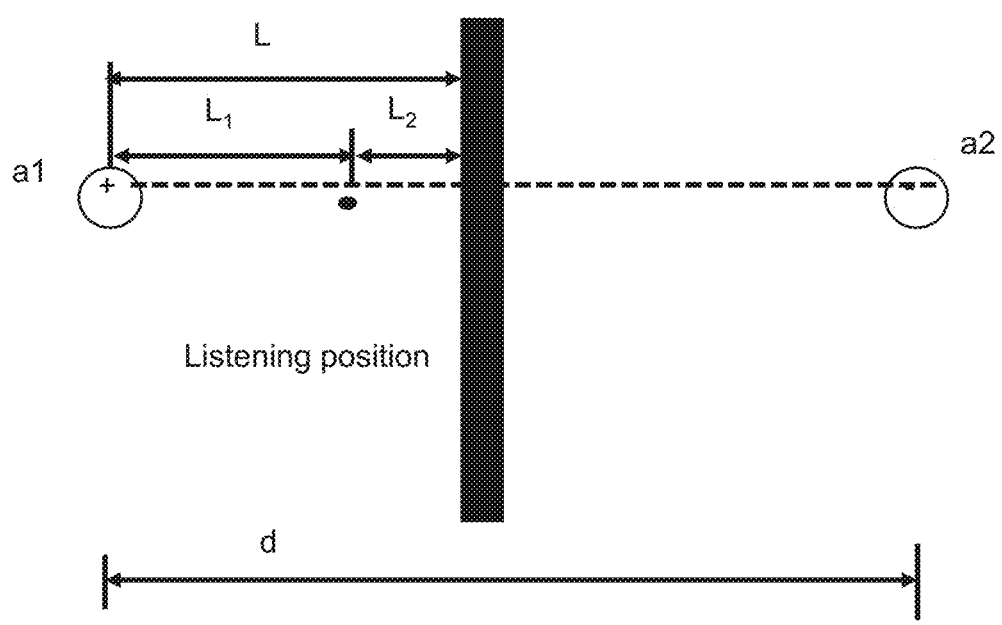
FIG. 36 is a schematic diagram illustrating two point sources and a baffle according to some embodiments of the present disclosure.

FIG. 36 is a schematic diagram illustrating two point sources and a baffle according to some embodiments of the present disclosure. In some embodiments, a position of the baffle between the two sound guiding holes may have a certain influence on the acoustic output effect. Merely by way of example, as shown in FIG. 36, a baffle may be provided between a point source a1 and a point source a2, a listening position may be located on the line connecting the point source a1 and the point source a2. In addition, the listening position may be located between the point source a1 and the baffle. A distance between the point source a1 and the baffle may be L. A distance between the point source a1 and the point source a2 may be d. A distance between the point source a1 and the sound heard by the user may be L1. A distance between the listening position and the baffle may be L2. When the distance L1 is constant, a movement of the baffle may cause different ratios of L to d, thereby obtaining different volumes of the sound heard by the user at the listening position and/or the volumes of the far-field leakage.

Figure 37:
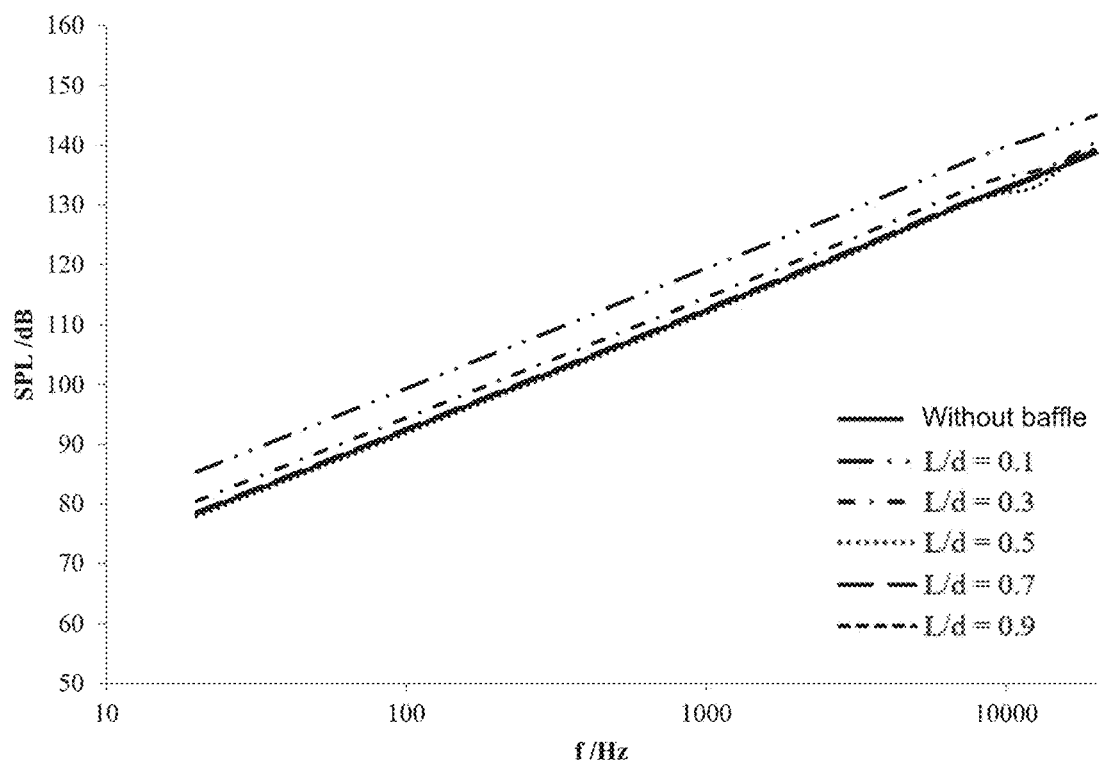
FIG. 37 is a graph illustrating a variation of a volume of the near-field sound as a function of frequency when a baffle is at different positions according to some embodiments of the present disclosure.
Figure 38:
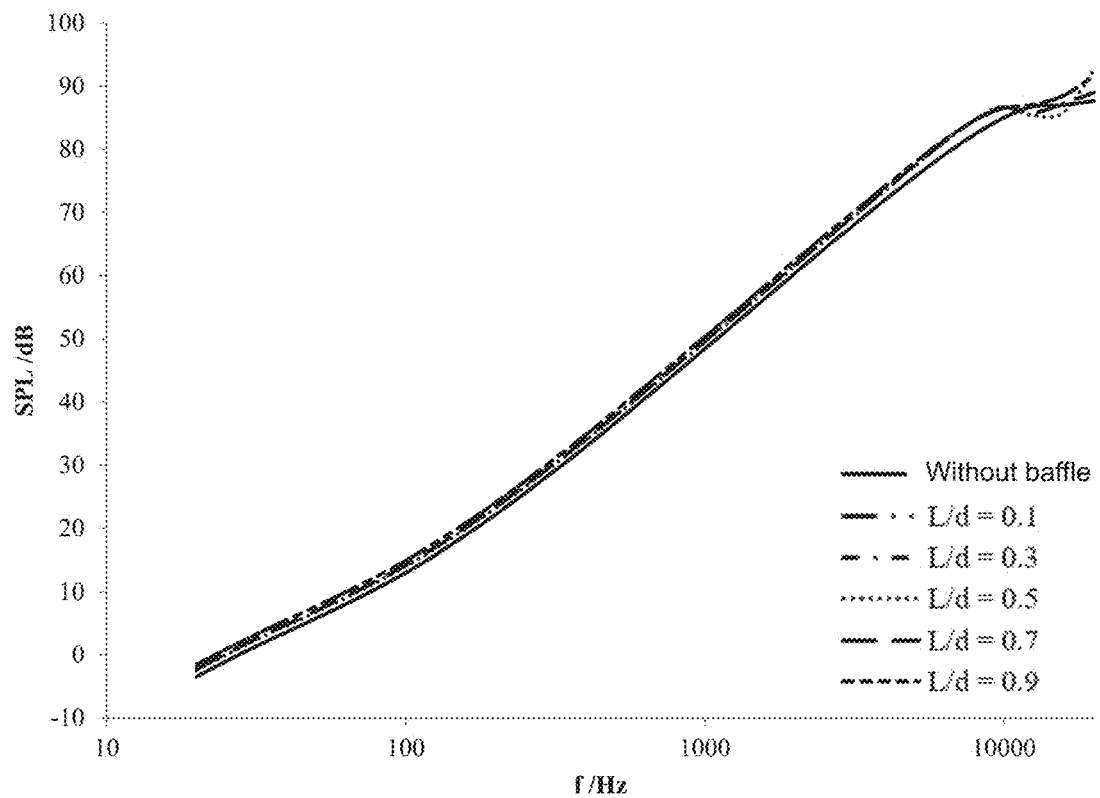
FIG. 38 is a graph illustrating a variation of a volume of the far-field leakage as a function of frequency when a baffle is at different positions according to some embodiments of the present disclosure.
Figure 39:
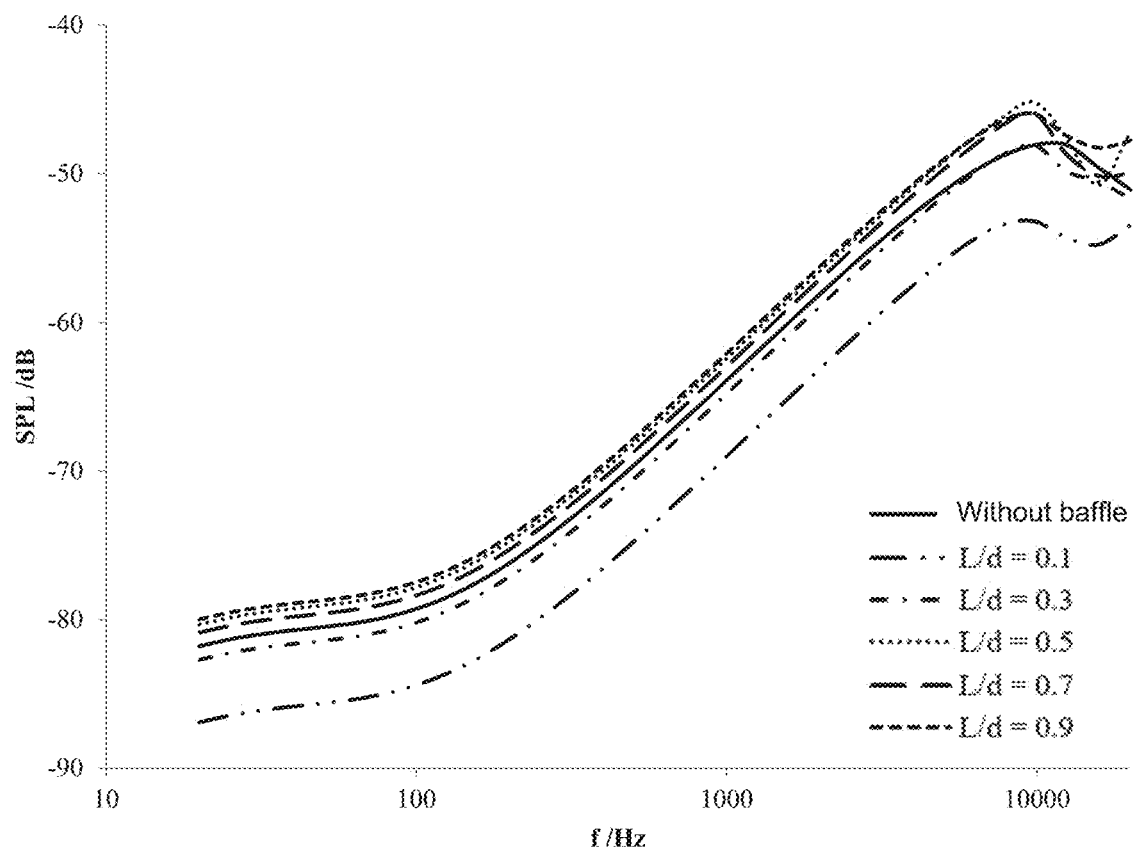
FIG. 39 is a graph illustrating a variation of a normalization parameter as a function of frequency when a baffle is at different positions according to some embodiments of the present disclosure.

FIG. 37 is a graph illustrating a variation of the volume of a near-field sound as a function of the frequency of sound when a baffle is at different positions according to some embodiments of the present disclosure. FIG. 38 is a graph illustrating a variation of the volume of a far-field leakage as a function of the frequency of sound when a baffle is at different positions according to some embodiments of the present disclosure. FIG. 39 is a graph illustrating a variation of a normalization parameter as a function of the frequency of sound when a baffle is at different positions according to some embodiments of the present disclosure. According to FIGS. 37-39, the volume of the far-field leakage may vary little with the change of the position of the baffle between the two point sources. In a situation that the distance d between the point source a1 and the point source a2 remains constant, when L decreases, the volume at the listening position may increase, the normalization parameter may decrease, and the capability to reduce sound leakage may be enhanced. In the same situation, when L increases, the volume at the listening position may increase, the normalization parameter may increase, and the capability to reduce sound leakage may be weakened. A reason for the above result may be that when L is small, the listening position may be close to the baffle, an acoustic route of the sound wave from the point source a2 to the listening position may be increased due to the baffle. In this case, an acoustic route difference between the point source a1 and the point source a2 to the listening position may be increased and the interference cancellation of the sound may be reduced. As a result, the volume at the listening position may be increased after the baffle is added. When L is large, the listening position may be far away from the baffle. The baffle may have a small effect on the acoustic route difference between the point source a1 and the point source a2 to the listening position. As a result, a volume change at the listening position may be small after the baffle is added.

It should be noted that an acoustic route from an acoustic driver to a sound guiding hole in the acoustic device may have a certain effect on the volumes of the near-field sound and far-field sound leakage. The acoustic route may be changed by adjusting a cavity length between a vibration diaphragm in the acoustic device and the sound guiding hole. In some embodiments, the acoustic driver may include a vibration diaphragm. The front and rear sides of the vibration diaphragm may be coupled to two sound guiding holes through a front chamber and a rear chamber, respectively. The acoustic routes from the vibration diaphragm to the two sound guiding holes may be different. In some embodiments, a ratio of the lengths of the acoustic routes between the vibration diaphragm and the two sound guiding holes may be, for example, 0.5-2, 0.6-1.5, or 0.8-1.2.

In some embodiments, on the premise of keeping the phases of the sounds generated at the two sound guiding holes opposite, the amplitudes of the sounds generated at the two sound guiding holes may be changed to improve the output effect of the acoustic device. Specifically, impedances of acoustic routes connecting the acoustic driver and the two sound guiding holes may be adjusted so as to adjust the sound amplitude at each of the two sound guiding holes. In some embodiments, the impedance may refer to a resistance that a medium needs to overcome during displacement when acoustic waves are transmitted. The acoustic routes may or may not be filled with a damping material (e.g., a tuning net, a tuning cotton, etc.) so as to adjust the sound amplitude. For example, a resonance cavity, a sound hole, a sound slit, a tuning net, and/or a tuning cotton may be disposed in an acoustic route so as to adjust the acoustic resistance, thereby changing the impedances of the acoustic route. As another example, an aperture of each of the two sound guiding holes may be adjusted to change the acoustic resistance of the acoustic routes corresponding to the two sound guiding holes. In some embodiments, a ratio of the acoustic impedance of the acoustic route between the acoustic driver (the vibration diaphragm) and one of the two sound guiding holes to the acoustic route between the acoustic driver and the other sound guiding hole may be 0.5-2 or 0.8-1.2.

It should be noted that the above descriptions are merely for illustration purposes, and not intended to limit the present disclosure. It should be understood that, for those skilled in the art, after understanding the principle of the present disclosure, various modifications and changes may be made in the forms and details of the acoustic device without departing from this principle. For example, the listening position may not be on the line connecting the two point sources, but may also be above, below, or in an extension direction of the line connecting the two point sources. As another example, a measurement method of the distance from a point sound source to the baffle, and a measurement method of the height of the baffle may also be adjusted according to different scenarios. These similar changes may be all within the protection scope of the present disclosure.

For human ears, the frequency band of sound that can be heard may be concentrated in a mid-low-frequency band. An optimization goal in the mid-low-frequency band may be to increase a volume of the sound heard by the user. If the listening position is fixed, parameters of the two point sources may be adjusted such that the volume of the sound heard by the user may increase significantly while a volume of leaked sound may be substantially unchanged (an increase in the volume of the sound heard by the user may be greater than an increase in the volume of the sound leakage). In a high-frequency band, a sound leakage reduction effect of the two point sources may be weaker. In the high-frequency band, an optimization goal may be reducing a sound leakage. The sound leakage may be further reduced by adjusting the parameters of the two point sources of different frequencies.

Figure 40:
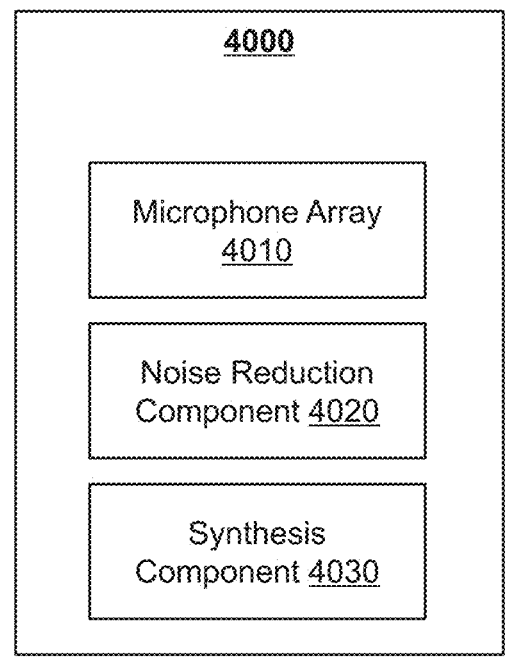
FIG. 40 is a schematic diagram illustrating a noise reduction assembly of an acoustic device according to some embodiments of the present disclosure.

FIG. 40 is a schematic diagram illustrating a noise reduction assembly 4000 of an acoustic device according to some embodiments of the present disclosure. The noise reduction assembly 4000 may be an example of the noise reduction assembly illustrated in FIGS. 1-4. The acoustic device may be configured to receive sound (also referred to as "third sound"). The noise reduction assembly 4000 may also be configured to reduce or eliminate the noise included in the received sound. In some embodiments, the noise may include background noise, sound that is not intended to be collected when a user wears the audio device, for example, a traffic noise, a wind noise, etc. The noise reduction assembly 4000 may be applied to various fields and/or devices, such as a headphone, a smart device (e.g., VR glasses, eyeglasses), a muffler, an anti-snoring device, or the like, or any combination thereof.

As shown in FIG. 40, the noise reduction assembly 4000 may include a microphone array 4010, a noise reduction component 4020, and a synthesis component 4030. In some embodiments, two or more components of the noise reduction assembly 4000 may be connected and/or communicate with each other. For example, the noise reduction component 4020 may be electrically connected to each of the microphones in the microphone array 4010. As used herein, a connection between two components may include a wireless connection, a wired connection, any other communication connection that may enable data transmission and/or reception, or any combination thereof. For example, the wireless connection may include a Bluetooth™ connection, a Wi-Fi™ connection, a WiMax™ connection, a WLAN connection, a ZigBee connection, a mobile network connection (e.g., 3G, 4G, 5G, etc.), or the like, or a combination thereof. For example, the wired connection may include a coaxial cable, a communication cable, a flexible cable, a spiral cable, a non-metal sheathed cable, a metal sheathed cable, a multi-core cable, a twisted pair cable, a ribbon cable, a shielded cable, a double-stranded cable, an optical fiber, a cable, an optical cable, a telephone line, or the like, or any combination thereof.

The microphone array 4010 may include at least one low-frequency microphone and at least one high-frequency microphone. The at least one low-frequency microphone may be used to collect low-frequency sound signal(s). The at least one high-frequency microphone may be used to collect high-frequency sound signal(s). In some embodiments, the low-frequency microphone(s) and/or the high-frequency microphone(s) may be separately arranged in the acoustic device to form a distributed microphone array. For example, the low-frequency microphone(s) and/or the high-frequency microphone(s) may be disposed at various positions of the acoustic device. The microphones at each of the various positions may be wirelessly connected.

Figure 41A:
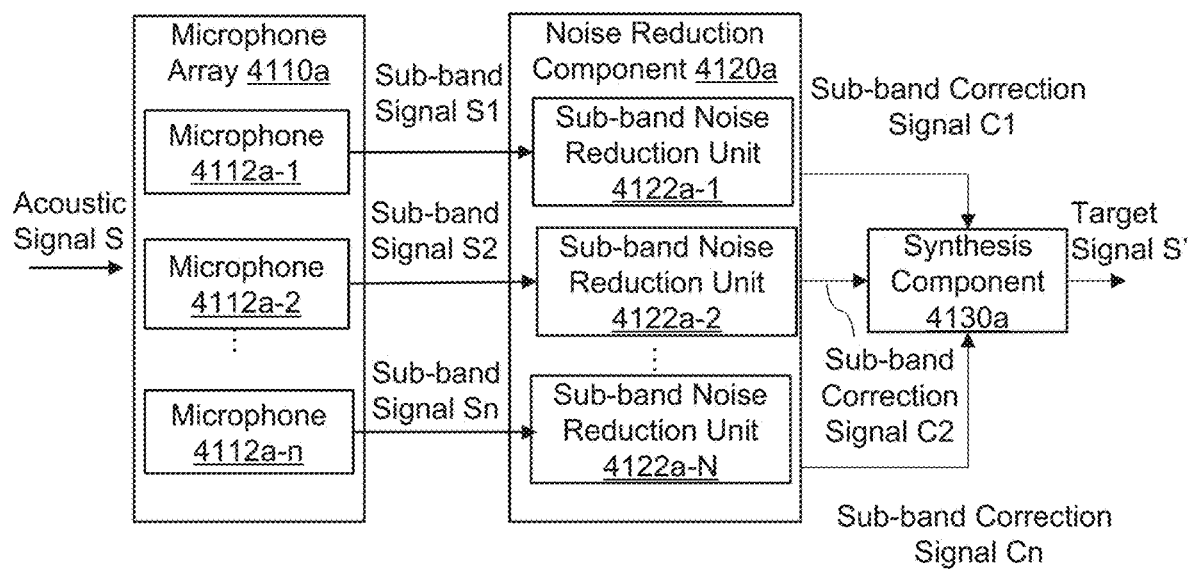
FIG. 41A is a schematic diagram illustrating an exemplary noise reduction assembly according to some embodiments of the present disclosure.
Figure 41B:
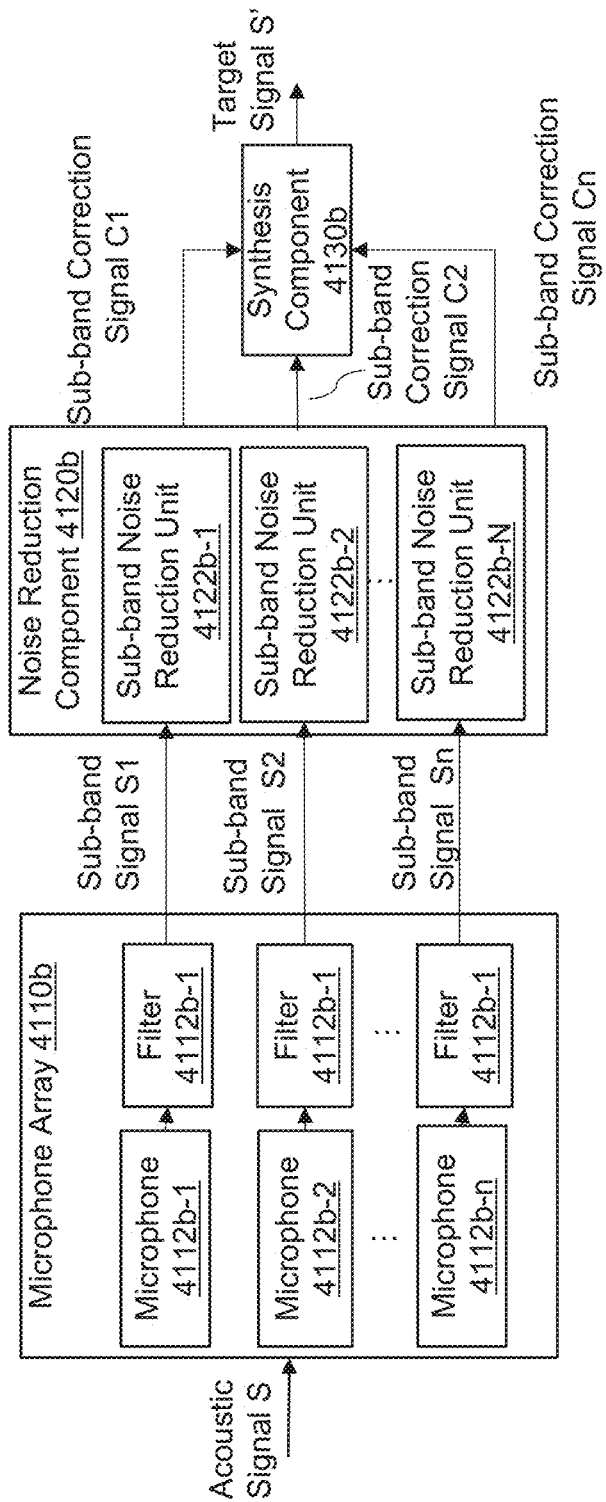
FIG. 41B is a schematic diagram illustrating an exemplary noise reduction assembly according to some embodiments of the present disclosure.

In some embodiments, each microphone in the microphone array 4010 may be used to detect an acoustic signal (e.g., including both target sound and the noise) (e.g., an acoustic signal Si illustrated in FIGS. 41A-41B) and process the detected acoustic signal into at least two sub-band sound signals (also referred to as sub-band signals, e.g., sub-band signals S1, S2, . . . , Sn illustrated in FIGS. 41A-41B) (denoted as $S_i(n)$). In some embodiments, each microphone in the microphone array 4010 may correspond to a filter. The acoustic signal may be processed into the at least two sub-band sound signals via the filter. As used herein, an acoustic signal may be an audio signal having a specific frequency band. The sub-band sound signals generated after processing the acoustic signal may have narrower frequency bands than the frequency band of the acoustic signal. However, the frequency bands of the sub-band sound signals may be within a range of the frequency band of the acoustic signal. For example, an acoustic signal may have a frequency band ranging from 10 Hz to 30 kHz. The frequency bands of the sub-band sound signals may range from 100 Hz to 200 Hz, which is narrower than the frequency range of the acoustic signal but within the frequency range of the acoustic signal. In some embodiments, a combination of the frequency bands of the sub-band sound signals may cover the frequency band of the acoustic signal. Additionally or alternatively, at least two of the sub-band sound signals may have different frequency bands. Optionally, each of the sub-band sound signals may have a feature frequency band different from frequency bands of other sub-band sound signals. Different sub-band sound signals may have a same frequency bandwidth or different frequency bandwidths. In the sub-band sound signals, two sub-band sound signals whose center frequencies are adjacent to each other may be considered to be adjacent to each other in a frequency domain. More descriptions of the frequency bands of a pair of adjacent sub-band sound signals may be found elsewhere in the present disclosure, for example, FIGS. 42A and 42B and the descriptions thereof.

In some embodiments, a signal generated by the microphone array 4010 may include a digital signal or an analog signal. In some embodiments, each of the microphones in the microphone array 4010 may include a micro electro mechanical system (MEMS) microphone. The MEMS microphone may have a low operating current. The performance of the MEMS microphone may be stable. A sound generated by the MEMS microphone may have a high quality. In some embodiments, some or all of the microphones in the microphone array 4010 may include other types of microphones, and be not limited herein.

The noise reduction component 4020 may be configured to perform noise reduction on the sub-band sound signals collected by the microphone array 4010. In some embodiments, the noise reduction component 4020 may perform noise estimation, adaptive filtering, sound enhancement, etc., on the collected sub-band sound signals, thereby implementing the noise reduction on the sound. Specifically, the noise reduction component 4020 may estimate a sub-band noise signal according to a noise estimation algorithm, and then generate a sub-band noise correction signal according to the sub-band noise signal. A target sub-band sound signal (denoted as $C_i(n)$) may be generated based on the sub-band sound signal and the sub-band noise correction signal, thereby reducing the noise in the sub-band sound signal. The sub-band noise correction signal may include an analog signal or a digital signal having a phase opposite to that of the sub-band noise signal. In some embodiments, the noise estimation algorithm may include a time-recursive average noise estimation algorithm, a minimum tracking noise estimation algorithm, or the like, or a combination thereof. In some embodiments, the microphone array 4010 may include at least a pair of low-frequency microphones and at least a pair of high-frequency microphones. Each pair of the microphones may correspond to a sub-band sound signal with a same frequency band. The noise reduction component 4020 may use a sound signal collected by a microphone closer to a main sound source (e.g., a human mouth) in each pair of the microphones as the sub-band sound signal. A sound signal collected by another microphone in the pair of microphones far from the main sound source may be used as the sub-band noise signal. The noise reduction component 4020 may perform the noise reduction on the sub-band sound signal by using a differential sub-band sound signal and the sub-band noise signal. More descriptions of the noise reduction component 4020 and the sub-band noise signal may be found elsewhere in the present disclosure, for example, FIG. 41A, FIG. 43, and FIG. 44 and the descriptions thereof.

The synthesis component 4030 may be configured to combine the target sub-band sound signals to generate a target signal. The synthesis component 4030 may include any component capable of combining at least two signals.

FIG. 41A is a schematic diagram illustrating an exemplary noise reduction assembly 4100A according to some embodiments of the present disclosure. The noise reduction assembly 4100A may be an example of the noise reduction assembly illustrated in FIGS. 1-4. As shown in FIG. 41A, the noise reduction assembly 4100A may include a microphone array 4110a, a noise reduction component 4120a, and a synthesis component 4130a. The microphone array 4110a may include at least two microphones 4112a. The count of the microphones 4112a may equal the count of sub-band sound signals. The count of the sub-band sound signals (e.g., n) may be related to the frequency band of an acoustic signal S and each frequency band of the sub-band sound signal. For example, a certain count of microphones 4112a may be used so that a combination of frequency bands of the sub-band sound signals may cover the frequency band of the acoustic signal. Optionally, an overlap between frequency bands of any pair of adjacent sub-band sound signals in the sub-band sound signals may be avoided.

The microphone 4112a may have different frequency responses to the acoustic signal S, and be used to generate a sub-band sound signal by processing the acoustic signal S. For example, the microphone 4112a-1 may respond to a sound signal at frequencies between 20 Hz and 3 kHz. After the acoustic signal S (for example, 2 Hz to 30 kHz) is processed by the microphone 4112a-1, a sub-band sound signal corresponding to the frequency band ranging from 20 Hz to 3 kHz may be obtained. In some embodiments, the sub-band sound signal generated by the microphone array 4110a may include a digital signal or an analog signal.

In some embodiments, the microphone 4112a may include an acoustic channel element and a sound sensitive element. The acoustic channel element may form a route through which the acoustic signal S is transmitted to the sound sensitive element. For example, the acoustic channel element may include one or more cavity structures, one or more duct structures, or the like, or any combination thereof. The sound sensitive element may convert the acoustic signal S transmitted through the acoustic channel element into an electrical signal. For example, the sound sensitive element may include a diaphragm, a plate, a cantilever, etc. The diaphragm may be used to convert a sound pressure change generated by a sound on a surface of the diaphragm into a mechanical vibration of the diaphragm. The sound sensitive element may be made of one or more materials including, for example, a plastic, a metal, a piezoelectric material, etc., or any composite material.

In some embodiments, the frequency response of the microphone 4112a may relate to an acoustic structure of the acoustic channel element of the microphone 4112a. For example, the acoustic channel element of the microphone 4112a may have a specific acoustic structure that may process the sound before the sound reaches the sound sensitive element of the microphone 4112a. In some embodiments, the acoustic structure of the acoustic channel element may have a specific acoustic impedance so that the acoustic channel element may be used as a filter to filter the sound to generate a sub-band acoustic signal. The sound sensitive element of the microphone 4112a may convert the sub-band acoustic signal into an electrical signal of the sub-band sound signal.

In some embodiments, the acoustic impedance of the acoustic structure may relate to the frequency band of the sound. In some embodiments, an acoustic structure mainly including the cavity structure(s) may be used as a high-pass filter. An acoustic structure mainly including the duct structure(s) may be used as a low-pass filter. For example, the acoustic channel element may have a tube structure. The tube structure may be regarded as a combination of a sound capacity and a sound quality in series and form an inductor-capacitor (LC) resonant circuit. If an acoustic resistance material is used in the tube structure, a resistor-inductor-capacitor (RLC) series circuit may form and the acoustic impedance of the RLC series circuit may be determined according to equation (5) described below:

$$Z = R_a + j\left(\omega M_a - \frac{1}{\omega C_a}\right), \quad (5)$$

wherein Z refers to the acoustic impedance of the acoustic channel element, $\omega$ refers to an angular frequency of the tube structure, j refers to the imaginary unit, $M_a$ refers to the sound quality, $C_a$ refers to the sound capacity, and $R_a$ refers to an acoustic resistance of the RLC series circuit. The tube structure may be used as a band-pass filter (denoted as F1). A bandwidth of the band-pass filter F1 may be adjusted by adjusting the acoustic resistance $R_a$. The center frequency $\omega_0$ of the band-pass filter F1 may be adjusted by adjusting the sound quality $M_a$ and/or the sound capacity $C_a$. For example, the center frequency $\omega_0$ of the band-pass filter F1 may be determined according to equation (6) described below:

$$\omega_0 = \sqrt{M_a C_a}, \quad (6)$$

In some embodiments, the frequency response of the microphone 4112a may relate to the physical characteristics (e.g., a material, a structure) of the sound sensitive element of the microphone 4112a. A sound sensitive element with specific physical characteristics may be sensitive to a certain frequency band of an audio.

For example, the sound sensitive element may include a diaphragm used as a band-pass filter (denoted as F2). A center frequency wo of the band-pass filter F2 may be determined according to equation (7) described below:

$$\omega_0' = \sqrt{\frac{K_m}{M_m}}, \quad (7)$$

wherein $M_m$ refers to the mass of the diaphragm, and $K_m$ refers to an elastic coefficient of the diaphragm. In some embodiments, the bandwidth of the band-pass filter F2 may be adjusted by adjusting a damping of the diaphragm ($R_m$). The center frequency of the band-pass filter F2 may be adjusted by adjusting the mass of the diaphragm and/or the coefficient of elasticity of the diaphragm $\omega_0'$.

As described above, the acoustic channel element or the sound sensitive element of the microphone 4112a may be used as the filter. The frequency response of the microphone 4112a may be adjusted by modifying the parameter (e.g., $R_a$, $M_a$, $C_a$) of the acoustic channel element or the parameter (e.g., $K_m$, $R_m$) of the sound sensitive element. More descriptions of acoustic channel element and/or the sound sensitive elements used as the band-pass filter may be found in, for example, a PCT application with a name "SIGNAL PROCESSING DEVICE HAVING MULTIPLE ACOUSTIC-ELECTRIC TRANSDUCERS" and an application number PCT/CN2018/105161, the contents of which are incorporated herein by reference.

The noise reduction component 4120a may include at least two sub-band noise reduction units 4122a. Each of the sub-band noise reduction units 4122a may correspond to one microphone 4112a. The sub-band noise reduction unit 4122a may be configured to generate a sub-band noise correction signal based on the noise in the sub-band sound signal for reducing the noise in the sub-band sound signal, thereby generating the target sub-band sound signal. For example, a sub-band noise reduction unit 4122a-i (i is a positive integer equal to or less than n) may receive a sub-band sound signal Si from the microphone 4112a-i and generate a sub-band noise correction signal Ci for reducing noise in the sub-band sound signal Si. In some embodiments, the sub-band noise reduction unit 4122a may include a sub-band noise estimation sub-unit (not shown) and a sub-band noise suppression sub-unit (not shown). The sub-band noise estimation sub-unit may be configured to estimate the noise in a sub-band sound signal. The sub-band noise suppression sub-unit may be configured to receive the noise in the sub-band sound signal from the sub-band noise estimation sub-unit, and generate the sub-band noise correction signal to reduce the sub-band noise signal in the sub-band sound signal.

In some embodiments, the sub-band noise reduction unit 4122a-i may first estimate a sub-band noise signal $N_i$, and then perform phase modulation and/or amplitude modulation on the sub-band noise signal $N_i$ to generate a corresponding sub-band noise correction signal $N'_i$. In some embodiments, the phase modulation and the amplitude modulation may be performed subsequently or simultaneously on the sub-band noise signal $N_i$. For example, the sub-band noise reduction unit 4122a-i may first perform the phase modulation on the sub-band noise signal $N_i$ to generate a phase modulation signal, and then perform the amplitude modulation on the phase modulation signal to generate the corresponding sub-band noise correction signal $N'_i$. The phase modulation of the sub-band noise signal $N_i$ may include inverting the phase of the sub-band noise signal $N_i$. In some embodiments, the phase of the noise may shift during transmission from a position of the microphone 4112a-i to a position of the sub-band noise reduction unit 4122a-i. The phase modulation of the sub-band noise signal $N_i$ may also include compensating the phase shift of the sub-band noise signal $N_i$ during the signal transmission. Alternatively, the sub-band noise reduction unit 4122a-i may first perform the amplitude modulation on the sub-band noise signal $N_i$ to generate an amplitude modulation signal, and then perform the phase modulation on the amplitude modulation signal to generate the sub-band noise correction signal $N'_i$. More descriptions of the sub-band noise reduction unit 4122a-i may be found elsewhere in the present disclosure, for example, FIGS. 43 and 44 and the descriptions thereof.

In some embodiments, the noise reduction component 4120a may use two sets of microphones with same configuration (for example, two microphone arrays 4110a) to perform the noise reduction according to a dual microphone noise reduction principle. Each set of the microphones may include microphones corresponding to a plurality of sub-band sound signals of different frequency bands. For brevity, one set of the microphones may be denoted as a first microphone group, and another set of the microphones may be denoted as a second microphone group. As used herein, a distance between the first microphone group and the main sound source (e.g., the human mouth) may be shorter than a distance between the second microphone group and the main sound source. A first microphone in the first microphone group may correspond to a second microphone in the second microphone group. For example, a first microphone corresponding to a frequency band of 20 Hz-3 kHz in the first microphone group may correspond to a second microphone corresponding to a frequency band of 20 Hz-3 kHz in the second microphone group. A signal collected by the first microphone in the first microphone group may be used as the sub-band sound signal. A signal collected by the second microphone in the corresponding second microphone group may be used as the sub-band noise signal. The noise reduction component 4120a may generate the target sub-band sound signal according to the sub-band sound signal and the sub-band noise signal. More descriptions of using the two microphone arrays for the noise reduction may be found elsewhere in the present disclosure, for example, FIGS. 42A and 42B and the descriptions thereof.

The synthesis component 4130a may be configured to combine the target sub-band sound signals to generate a target signal S'.

It should be noted that the microphone array 4110a and/or the noise reduction component 4120a is merely provided for the purposes of illustration, and is not intended to limit the scope of the present disclosure. For persons having ordinary skills in the art, multiple variations or modifications may be made under the teachings of the present disclosure. However, those variations and modifications do not depart from the scope of the present disclosure. For example, the microphone array 4110a and/or the noise reduction component 4120a may include one or more additional components. Additionally or alternatively, one or more components of the microphone array 4110a and/or the noise reduction component 4120a may be omitted. As another example, two or more components of the microphone array 4110a and/or the noise reduction component 4120a may be integrated into a single component.

FIG. 41B is a schematic diagram illustrating an exemplary noise reduction assembly 41001B according to some embodiments of the present disclosure. The noise reduction assembly 41001B may be an example of the noise reduction assembly illustrated in FIGS. 1-4. As shown in FIG. 41B, the noise reduction assembly 41001B may include a microphone array 4110b, a noise reduction component 4120b, and a synthesis component 4130b. The microphone array 4110b may include at least two microphones 4112b and at least two filters 4114b. The count of the microphones 4112b, the count of the filters 4114b, and the count of the sub-band sound signals may be equal. The microphones 4112b may have a same configuration. In other words, each of the microphones 4112b may have a same frequency response to the acoustic signal S. After receiving the acoustic signal S, the microphone 4112b may transmit the acoustic signal S to a corresponding filter 4114b, and generate a sub-band sound signal through the filter 4114b. The filters 4114b corresponding to each microphone 4112b may have different frequency selective characteristics. Exemplary filters 4114b may include a passive filter, an active filter, an analog filter, a digital filter or the like, or any combination thereof.

The noise reduction component 4120b may include at least two sub-band noise reduction units 4122b. Each of the sub-band noise reduction units 4122b may correspond to a filter 4114b (or a microphone 4112b). More descriptions of the noise reduction component 4120b and the synthesis component 4130b may be found elsewhere in the present disclosure, for example, FIG. 41A and the descriptions thereof and not repeat herein.

Figure 42A:
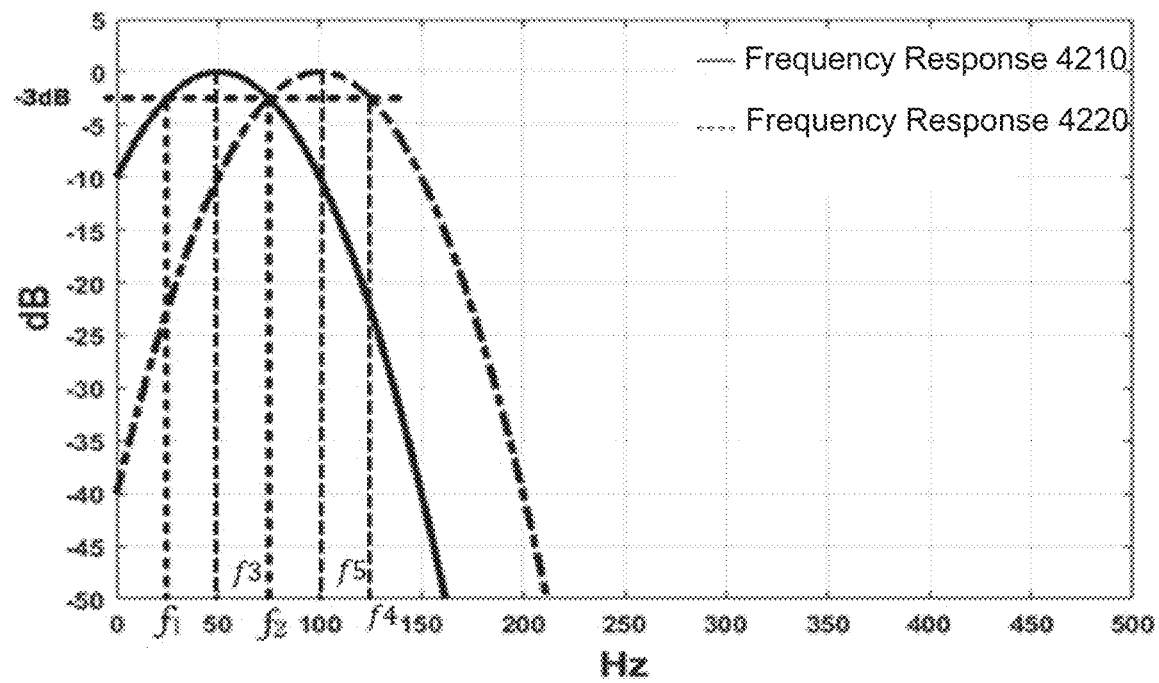
FIG. 42A illustrates an exemplary frequency response of a first microphone and an exemplary frequency response of a second microphone according to some embodiments of the present disclosure.
Figure 42B:
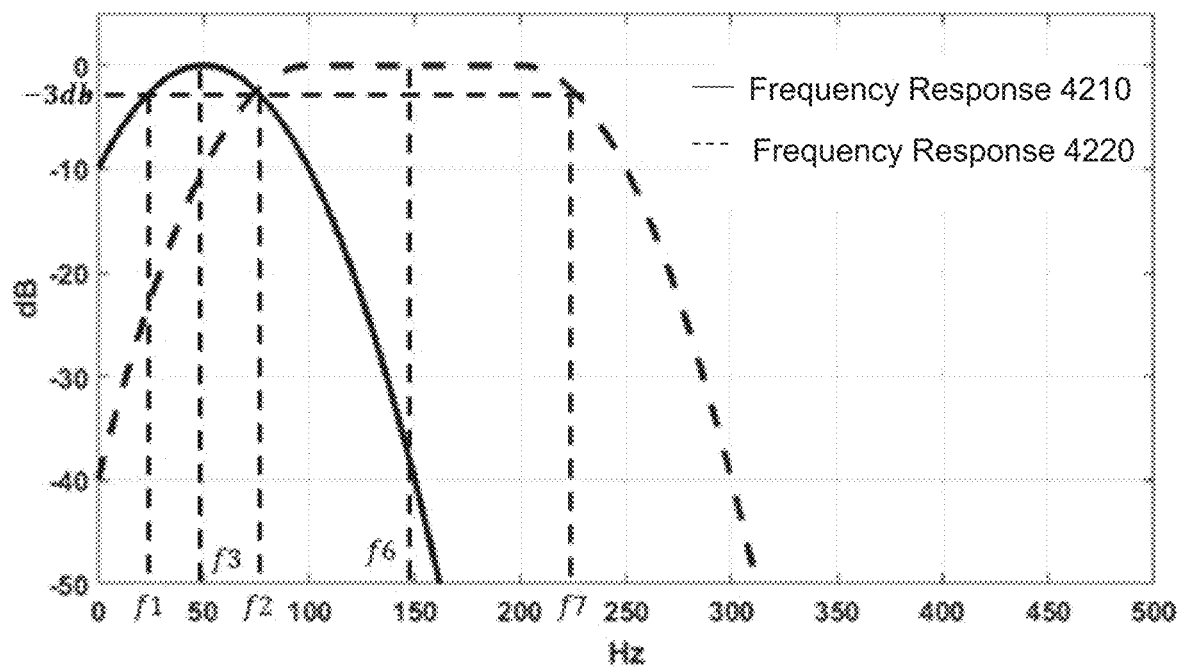
FIG. 42B illustrates an exemplary frequency response of a first microphone and an exemplary frequency response of a second microphone according to some embodiments of the present disclosure.

FIG. 42A illustrates an exemplary frequency response 4210 of a first microphone and an exemplary frequency response 4220 of a second microphone according to some embodiments of the present disclosure. FIG. 42B illustrates another exemplary frequency response 4210 of a first microphone and an exemplary frequency response 4220 of a second microphone according to the present disclosure. The first microphone may be configured to process an acoustic signal to generate a first sub-band sound signal. The second band microphone may be configured to process an acoustic signal to generate a second sub-band sound signal. In the sub-band sound signal, the second sub-band sound signal may be adjacent to the first sub-band sound signal in a frequency domain.

In some embodiments, the frequency response of the first and second microphones may have a same frequency bandwidth. For example, as shown in FIG. 42A, the frequency response 4210 of the first microphone may have a lower half-power point f1, a higher half-power point f2, and a center frequency f3. As used herein, a half-power point of a certain frequency response may refer to a frequency point with a specific power suppression (e.g., −3 dB). A frequency bandwidth of the frequency response 4210 may equal a difference between f2 and f1. The frequency response of the second microphone 4220 may have a lower half-power point f2, a higher half-power point f4, and a center frequency f5. A frequency bandwidth of the frequency response 4220 may equal a difference between f4 and f2. The frequency bandwidths of the first and second microphones may be equal to each other.

In some embodiments, the frequency responses of the first and second microphones may have different frequency bandwidths. For example, as shown in FIG. 42B, the frequency response 4230 of the second microphone may have a lower half-power point f2, a higher half-power point f7 (greater than f4), and a center frequency f6. The frequency bandwidth of the frequency response 4230 of the second microphone may equal a difference between f7 and f2, and the difference may be greater than the frequency bandwidth of the frequency response 4210 of the first microphone. In this manner, fewer microphones may be required in the microphone array 4110a to cover the frequency band of the original acoustic signal.

In some embodiments, the frequency responses of the first microphone and the second microphone may intersect at a specific frequency point. The intersection point of the frequency response may cause a certain overlapping range between the first and second frequency responses. Ideally, there may be no overlap between the frequency responses of the first and second microphones. However, in practice, there may be a certain overlapping range, which may cause an interference range between the first sub-band sound signal and the second sub-band sound signal, and affect the quality of the first sub-band sound signal and the second sub-band sound signal. For example, the larger the overlapping range is, the larger the interference range may be, and the lower the quality of the first and second sub-band sound signals may be.

In some embodiments, the specific frequency point where the frequency responses of the first and second microphones intersect may be close to the half-power point of the frequency response of the first microphone and/or the half-power point of the frequency response of the second microphone. Taking FIG. 42A as an example, the frequency response 4210 and the frequency response 4220 may intersect at the higher half-power point f2 of the frequency response 4210. The intersection point may also be the lower half-power point of the frequency response 4220. As used herein, if a difference between power levels of the frequency point and the half-power point is not greater than a threshold (e.g., 2 dB), it may be determined that the frequency point is close to the half-power point. In this case, there may be few interference in the frequency responses of the first and second microphones, which may result in an appropriate overlapping range between the frequency responses of the first and second microphones. For example, if the half-power point is −3 dB, the threshold is −2 dB, and the frequency responses intersect at a frequency point at a power level greater than −5 dB and/or less than −1 dB, it may be determined that the overlapping range may be relatively small. In some embodiments, the center frequencies and/or bandwidths of the frequency response of the first and second microphones may be adjusted to obtain a narrower or appropriate overlapping range between the frequency responses of the first and second microphones to avoid overlapping between the frequency bands of the first and second sub-band sound signals.

Figure 43:
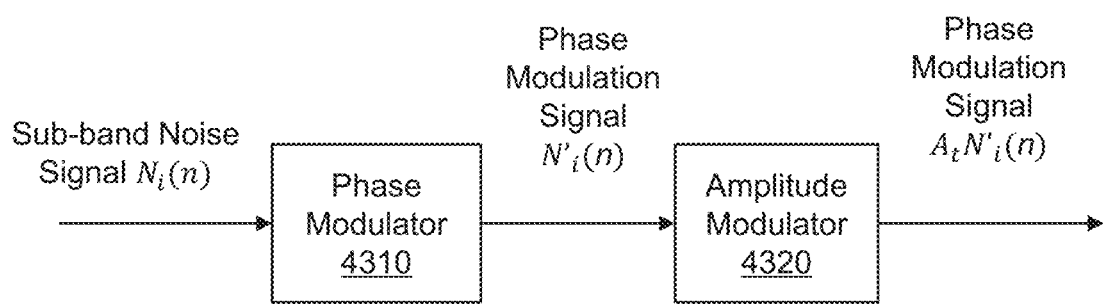
FIG. 43 is a schematic diagram illustrating an exemplary sub-band noise suppression sub-unit according to some embodiments of the present disclosure.

FIG. 43 is a schematic diagram illustrating an exemplary sub-band noise suppression sub-unit 4300 according to some embodiments of the present disclosure. The sub-band noise suppression sub-unit 4300 may be configured to receive a sub-band noise signal from a sub-band noise estimation sub-unit $N_i(n)$ and generate a sub-band noise correction signal $A_t N'_i(n)$ to reduce the sub-band noise signal $N_i(n)$. $A_t$ refers to an amplitude suppression coefficient related to the noise to be reduced.

Figure 44:
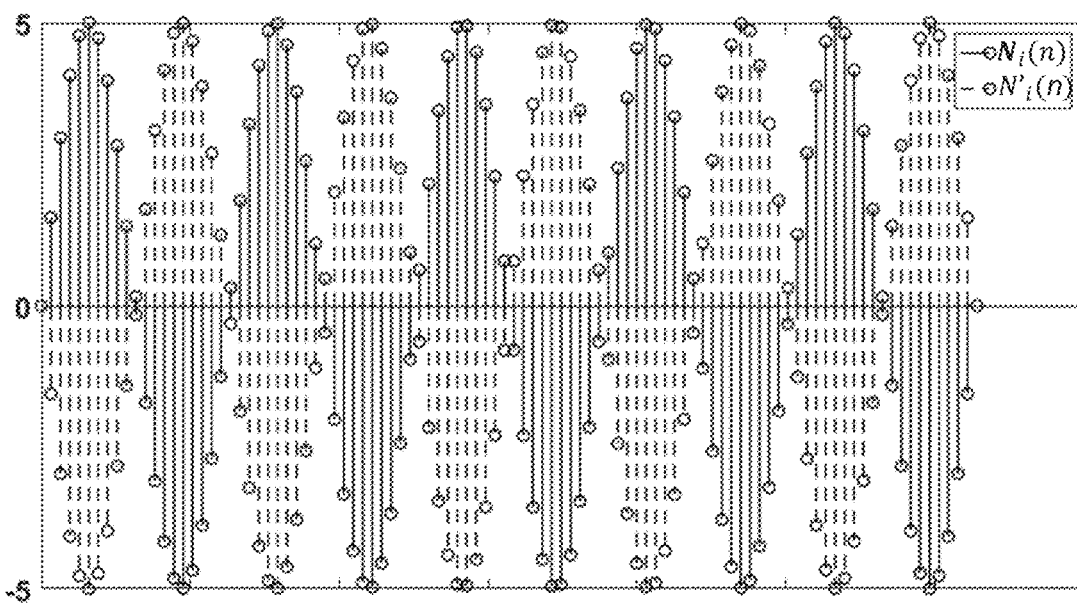
FIG. 44 is a schematic diagram illustrating phase modulation according to some embodiments of the present.

As shown in FIG. 43, the sub-band noise suppression sub-unit 4300 may include a phase modulator 4310 and an amplitude modulator 4320. The phase modulator 4310 may be configured to invert the sub-band noise signal $N_i(n)$ to generate a phase modulation signal $N'_i(n)$. For example, as shown in FIG. 44, the phase modulation signal $N'_i(n)$ may be the inverse of the sub-band noise signal $N_i(n)$. In some embodiments, the phase of the noise may shift during transmission from a position of the microphone 4112$a$-$i$ to a position of the sub-band noise reduction unit 4122$a$-$i$. In some embodiments, the phase shift of the noise may be ignored. For example, if the noise transmits in the form of a plane wave in a single direction while transmitting from the position of the microphone 4112$a$-$i$ to the position of the sub-band noise reduction unit 4122$a$-$i$ (or a part thereof), and the phase shift during the transmission is less than a threshold, it may be determined that the phase of the noise has not shifted. At this time, the phase of the noise may be ignored when the phase modulation signal $N'_i(n)$ is generated. If the phase shift is greater than the threshold, it may be determined that the phase of the noise is shifted. In some embodiments, when the phase shift of the sub-band noise is ignored, the phase modulator 4310 may generate the modulation signal $N'_i(n)$ only by performing a phase inversion on the sub-band noise signal $N_i(n)$.

In some embodiments, when the phase shift of the sub-band noise is not ignored, the phase modulator 4310 needs to consider the phase shift of the sub-band noise when the modulation signal $N'_i(n)$ is generated. For example, the phase of the sub-band noise signal $N_i(n)$ may have a phase shift $\Delta\varphi$ determined according to equation (8) described below:

$$\Delta\varphi = \frac{2\pi f_0}{c} \Delta d, \quad (8)$$

wherein $f_0$ refers to the center frequency of the sub-band noise signal $N_i(n)$, and c refers to the speed of sound. If the noise is a near-field signal, $\Delta d$ refers to a difference between a distance from the sound source to the microphone 4112$a$-$i$ and a distance from the sound source to the sub-band noise reduction unit 4122$a$-$i$ (or a part thereof). If the noise is a far-field signal, $\Delta d$ may equal d cos θ, d refers to a distance between the microphone 4112$a$-$i$ and the sub-band noise reduction unit 4122$a$-$i$ (or a part thereof) and θ represents an angle between the sound source and the microphone 4112$a$-$i$ or the sound source and the sub-band noise reduction unit 4122$a$-$i$ (or a part thereof).

To compensate for the phase shift $\Delta\varphi$, the phase modulator 4310 may perform the phase inversion and the phase compensation on the sub-band noise signal $N_i(n)$ to generate the phase modulation signal. In some embodiments, the phase modulator 4310 may include an all-pass filter. The filtering function of the all-pass filter may be expressed as $|H(w)|$, wherein w represents the angular frequency. In an ideal situation, an amplitude response of the all-pass filter $|H(w)|$ may equal 1, and a phase response of the all-pass filter may equal the phase shift $\Delta\varphi$. The all-pass filter may delay the sub-band noise signal $N_i(n)$ by a delay time $\Delta T$ to perform the phase compensation. $\Delta T$ may be determined according to equation (9) described below:

$$\Delta T = \frac{\Delta\varphi}{2\pi f_0} = \frac{\Delta d}{c}, \quad (9)$$

In this case, the phase modulator 4310 may perform the phase inversion and the phase compensation on the sub-band noise signal $N_i(n)$ to generate the phase modulation signal $N'_i(n)$.

The amplitude modulator 4320 may be configured to receive the phase modulation signal $N'_i(n)$ and generate the target modulation signal $A_t N'_i(n)$ by modulating the phase modulation signal $N'_i(n)$. In some embodiments, the noise may be suppressed during its transmission from the position of the microphone 4112$a$-$i$ to the position of the sub-band noise reduction unit 4122$a$-$i$ (or a part thereof). The amplitude suppression coefficient $\Delta t$ may be determined to measure the amplitude suppression of the noise during the transmission. The amplitude suppression coefficient $A_t$ may relate to one or more factors, including, for example, the material and/or structure of the acoustic channel element for sound transmission, the position of the microphone 4112$a$-$i$ relative to the sub-band noise reduction unit 4122$a$-$i$ (or a part thereof), or any combination thereof.

In some embodiments, the amplitude suppression coefficient $\Delta t$ may be default settings of the noise reduction assembly 4000A, or previously determined through actual or simulated experiments. For example, the amplitude suppression coefficient $\Delta t$ may be determined by comparing an amplitude of the audio signal near the microphone 4112$a$-$i$ (e.g., before entering an audio broadcasting device) with an amplitude after the audio signal is transmitted to the position of the sub-band noise reduction unit 4122$a$-$i$. In some alternative embodiments, the amplitude suppression of the noise may be ignored, for example, when the amplitude suppression during the noise transmission is less than a threshold and/or the amplitude suppression coefficient $\Delta t$ substantially equal 1. The phase modulation signal $N'_i(n)$ may be designated as a sub-band noise signal $N_i(n)$ of the sub-band noise correction signal. (That is, the target modulation signal $A_t N'_i(n)$).

In some embodiments, the sub-band noise suppression sub-unit 4300 may include a sub-band sound signal generator (not shown). The sub-band sound signal generator may generate a target sub-band sound signal $C_i(n)$ according to the sub-band noise correction signal $A_rN'_i(n)$ and the sub-band sound signal $S_i(n)$ and transmit thereof to the synthesis component 4030. The synthesis component 4030 may combine at least two target sub-band sound signals into the target signal S (n) according to the equation (10) described below:

$$S(n) = \sum_{i=1}^{m} C_i(n), \qquad (10)$$

It should be noted that the above descriptions of FIGS. 43 and 44 are merely provided for the purposes of illustration, and are not intended to limit the scope of the present disclosure. For persons having ordinary skills in the art, multiple variations or modifications may be made under the teachings of the present disclosure. However, those variations and modifications do not depart from the scope of the present disclosure. For example, the sub-band noise suppression sub-unit 4300 may include one or more additional units, such as a signal synthesis unit. As another example, one or more components in the sub-band noise suppression sub-unit 4300 may be omitted, such as the amplitude modulator 4320.

What is claimed is:

1. An acoustic device, comprising:
   a housing configured to be rested on a shoulder of a user;
   at least one low-frequency acoustic driver carried by the housing and configured to output first sound from at least two first sound guiding holes; and
   at least one high-frequency acoustic driver carried by the housing and configured to output second sound from at least two second sound guiding holes, wherein:
      the at least one low-frequency acoustic driver is enclosed by a first shell, the first shell defining a front chamber and a rear chamber of the at least one low-frequency acoustic driver,
      the front chamber of the at least one low-frequency acoustic driver is acoustically coupled to one of the at least two first sound guiding holes, and the rear chamber of the at least one low-frequency acoustic driver is acoustically coupled to another of the at least two first sound guiding holes.

2. The acoustic device of claim 1, wherein the at least one high-frequency acoustic driver is enclosed by a second shell, the second shell defining a front chamber and a rear chamber of the at least one high-frequency acoustic driver.

3. The acoustic device of claim 2, wherein the front chamber of the at least one high-frequency acoustic driver is acoustically coupled to one of the at least two second sound guiding holes, and the rear chamber of the at least one high-frequency acoustic driver is acoustically coupled to another of the at least two second sound guiding holes.

4. The acoustic device of claim 2, wherein
   a length of the rear chamber of the at least one low-frequency acoustic driver is different from a length of the front chamber of the at least one low-frequency acoustic driver, and
   a length of the rear chamber of the at least one high-frequency acoustic driver is the same as a length of the front chamber of the at least one high-frequency acoustic driver.

5. The acoustic device of claim 4, wherein a ratio between the length of the rear chamber of the at least one low-frequency acoustic driver and the length of the front chamber of the at least one low-frequency acoustic driver ranges from 0.5 to 2.

6. The acoustic device of claim 2, wherein a ratio between an acoustic impedance of the front chamber of the at least one high-frequency acoustic driver and an acoustic impedance of the rear chamber of the at least one high-frequency acoustic driver is within a second predetermined range, the second predetermined range including at least one of a range from 0.5 to 2, a range from 0.6 to 1.9, a range from 0.7 to 1.8, a range from 0.8 to 1.7, a range from 0.9 to 1.6, or a range from 1.0 to 1.5.

7. The acoustic device of claim 1, wherein a ratio between an acoustic impedance of the front chamber of the at least one low-frequency acoustic driver and an acoustic impedance of the rear chamber of the at least one low-frequency acoustic driver is within a first predetermined range, the first predetermined range including at least one of a range from 0.5 to 2, a range from 0.6 to 1.9, a range from 0.7 to 1.8, a range from 0.8 to 1.7, a range from 0.9 to 1.6, or a range from 1.0 to 1.5.

8. The acoustic device of claim 1, wherein
   the housing includes an intermediate portion, and a first leg portion and a second leg portion connected to the intermediated portion, respectively.

9. The acoustic device of claim 8, wherein the at least one low-frequency acoustic driver and the at least one high-frequency acoustic driver are carried by the first leg portion and the second leg portion.

10. The acoustic device of claim 8, wherein the intermediate portion is configured to allow relative movement of the first leg portion and the second leg portion.

11. The acoustic device of claim 1, wherein the acoustic device further comprises a noise reduction assembly configured to receive third sound and reduce noise of the third sound.

12. The acoustic device of claim 1, wherein the at least one low-frequency acoustic driver includes a first transducer and the at least one high-frequency acoustic driver includes a second transducer, the first transducer and the second transducer having different frequency response characteristics.

13. The acoustic device of claim 12, wherein the first transducer includes a low-frequency loudspeaker, and the second transducer includes a high-frequency loudspeaker.

14. The acoustic device of claim 1, wherein the at least one low-frequency acoustic driver and the at least two first sound guiding holes form a first acoustic route and the at least one high-frequency acoustic driver and the at least two second sound guiding holes form a second acoustic route, the first acoustic route and the second acoustic route having different frequency selection characteristics.

15. The acoustic device of claim 14, the first acoustic route or the second acoustic route is filled with an acoustic impedance material, and an acoustic impedance of the acoustic impedance material ranges from 5MKS Rayleigh to 500MKS Rayleigh.

16. The acoustic device of claim 1, wherein the at least two first sound guiding holes and the at least two second sound guiding holes are located off ears of the user.

17. The acoustic device of claim 16, wherein the at least two first sound guiding holes are nearer to the ears of the user than the at least second first sound guiding holes.

18. The acoustic device of claim 1, wherein the at least one low-frequency acoustic driver and the at least one high-frequency acoustic driver are independent from the housing or detachably connected to the housing.

19. The acoustic device of claim 1, wherein a first frequency range of the first sound and a second frequency range of the second sound partially overlap.

20. The acoustic device of claim 19, wherein
the first frequency range and the second frequency range have an overlapping frequency range; and
at least one of an intensity of a portion of the first sound in the overlapping frequency range or an intensity of a portion of the second sound in the overlapping frequency range is reduced.

* * * * *